(12) United States Patent
Akimoto et al.

(10) Patent No.: US 8,599,446 B2
(45) Date of Patent: Dec. 3, 2013

(54) IMAGE PROCESSING APPARATUS AND IMAGE READING APPARATUS

(75) Inventors: Masao Akimoto, Kunitachi (JP);
Masaki Kakutani, Hiratsuka (JP);
Yasuaki Sugimoto, Hachioji (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 477 days.

(21) Appl. No.: 13/023,655

(22) Filed: Feb. 9, 2011

(65) Prior Publication Data

US 2011/0205601 A1   Aug. 25, 2011

(30) Foreign Application Priority Data

Feb. 19, 2010   (JP) ................................ 2010-034298
Jul. 16, 2010   (JP) ................................ 2010-162319

(51) Int. Cl.
*H04N 1/04*   (2006.01)

(52) U.S. Cl.
USPC ........... 358/475; 358/1.9; 358/1.15; 358/452; 358/462; 358/474

(58) Field of Classification Search
USPC ......... 358/1.9, 1.15, 402, 448, 452, 462, 474, 358/475, 498, 537
See application file for complete search history.

(56) References Cited

U.S. PATENT DOCUMENTS

| | | | |
|---|---|---|---|
| 4,931,642 A * | 6/1990 | Hosoi et al. | 250/586 |
| 5,196,883 A * | 3/1993 | Takagi et al. | 355/401 |
| 5,510,908 A * | 4/1996 | Watanabe et al. | 358/448 |
| 5,781,822 A * | 7/1998 | Nishiyama et al. | 399/1 |
| 6,552,778 B1 * | 4/2003 | Konagaya | 355/71 |
| 2003/0038984 A1 * | 2/2003 | Ohkawa | 358/462 |
| 2008/0013970 A1 * | 1/2008 | Kikuchi | 399/45 |
| 2009/0073507 A1 | 3/2009 | Fukuda | |

FOREIGN PATENT DOCUMENTS

| | | |
|---|---|---|
| CN | 101394456 A | 3/2009 |
| JP | 05-069675 A | 3/1993 |
| JP | 09-109510 A | 4/1997 |
| JP | 2008-009312 A | 1/2008 |

OTHER PUBLICATIONS

Chinese Office Action dated Mar. 28, 2013 (and English translation thereof) in counterpart Chinese Application No. 201110039153.3.

* cited by examiner

*Primary Examiner* — Allen H Nguyen
(74) *Attorney, Agent, or Firm* — Holtz, Holtz, Goodman & Chick, PC

(57) ABSTRACT

An image processing apparatus including, a light source for reading for applying light onto an original to read, a light source for erasing for applying light of specific wavelength onto the original to decolorize image area, having been printed with color-changing agent having characteristic to become colorless by the light, a reading section for receiving reflected light from the original, an output section for outputting image data of the original, and a control section configured to compare first image data obtained by applying light from the light source for reading to the original, and second image data obtained by applying light from the light source for reading again to the original after applying light from the light source for erasing to the original, to determine whether the agent has been used in the image, and control at least either the reading operation or the output operation based on that determination.

28 Claims, 28 Drawing Sheets

FIG. 9a
ORIGINAL
IMAGE: Im

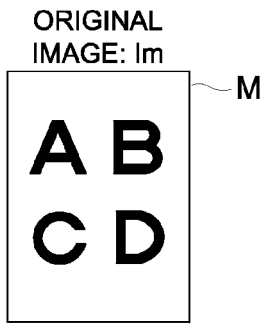
M

FIG. 9b
FIRST IMAGE   −   SECOND IMAGE   =   DIFFERENT
DATA: I1           DATA: I2           PORTIONS OF    ⇒   DETERMINATION
                                       IMAGE DATA: I3        RESULT

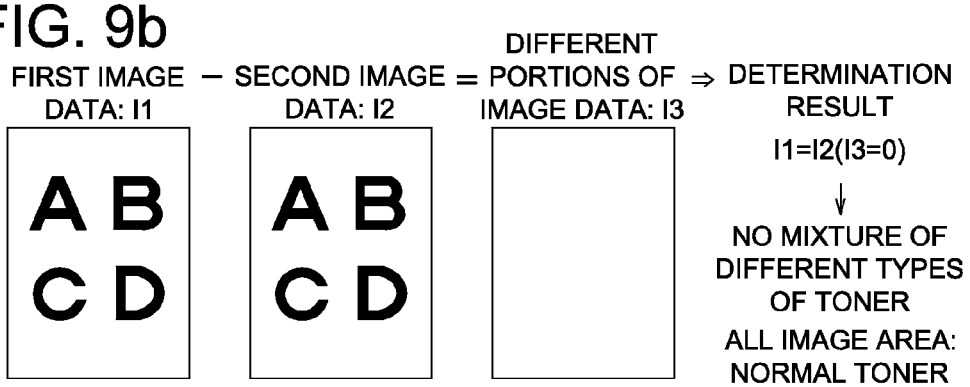

I1=I2(I3=0)
↓
NO MIXTURE OF
DIFFERENT TYPES
OF TONER

ALL IMAGE AREA:
NORMAL TONER

FIG. 9c

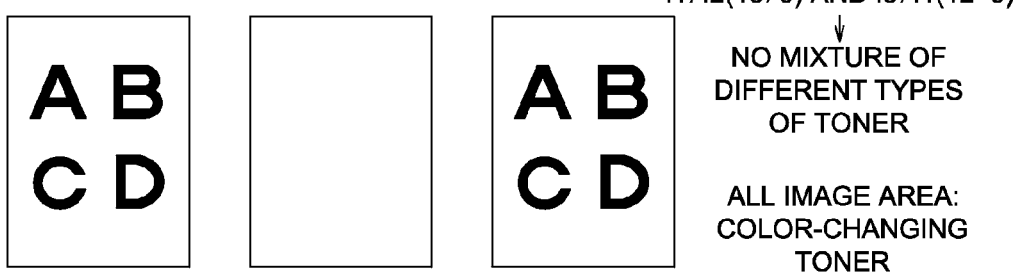

I1≠I2(I3≠0) AND I3≠I1(I2=0)
↓
NO MIXTURE OF
DIFFERENT TYPES
OF TONER

ALL IMAGE AREA:
COLOR-CHANGING
TONER

FIG. 9d

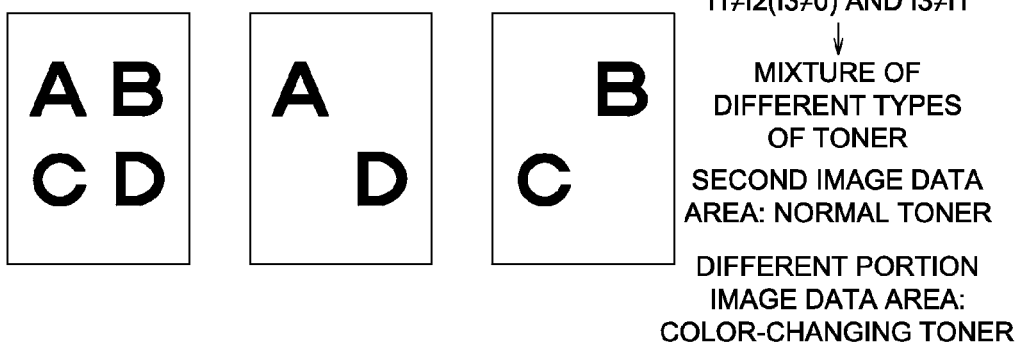

I1≠I2(I3≠0) AND I3≠I1
↓
MIXTURE OF
DIFFERENT TYPES
OF TONER

SECOND IMAGE DATA
AREA: NORMAL TONER

DIFFERENT PORTION
IMAGE DATA AREA:
COLOR-CHANGING TONER

FIG. 16
EXAMPLES OF SUBSTITUTION FOR COLOR-CHANGING TONER AREA (DIFFERENT PORTIONS OF IMAGE AREA)
(BLANK)
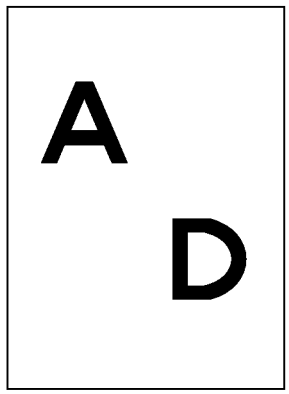
(SHADED)
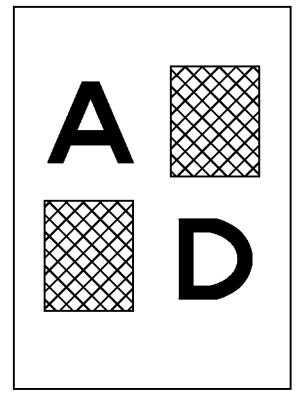
(ATTENTION-SEEKING MARK)
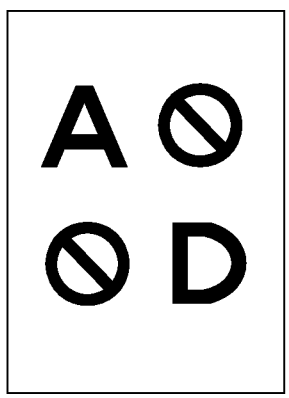
(ATTENTION-SEEKING TEXT INFORMATION)
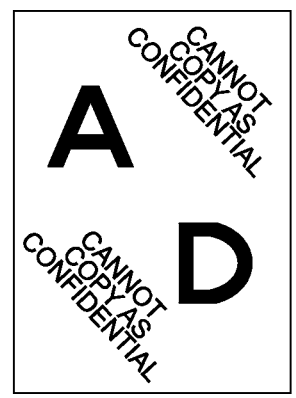

IMAGE PROCESSING APPARATUS AND IMAGE READING APPARATUS

This application is based on Japanese Patent Application No. 2010-034298 filed on Feb. 19, 2010, and No. 2010-162319 filed on Jul. 16, 2010 with the Japanese Patent Office, the entire content of which is hereby incorporated by reference.

TECHNICAL FIELD

The present invention relates to an image processing apparatus and an image reading apparatus capable of discriminating an original document which has been printed with printing agent containing color-changing printing agent.

BACKGROUND OF THE INVENTION

As a toner for printing, a color-changing toner, which usually exhibits a specific color and is changed to become colorless or transparent after being irradiated by near-infrared rays, is known, and there are suggested several kinds of image processing apparatuses using the toner for printing. For example, Unexamined Japanese Patent Application Publication No. 1993-69675 (hereinafter referred to as Patent Document 1) discloses a copying machine utilizing a color-changing toner to copy an original document. Also, Unexamined Japanese Patent Application Publication No. 2008-9312 (hereinafter referred to as Patent Document 2) discloses an image forming apparatus and the like utilizing normal toner and color-changing toner to form an image, wherein a prescribed identification mark is printed on a sheet on which an image is formed by color-changing toner, and discriminates the sheet on which an image is formed by color-changing toner by detecting existence or nonexistence of the identification mark, in order to recycle the sheet printed with that color-changing toner.

The above mentioned color-changing toner may be used to print a confidential document in order to prevent confidential information from leaking by making it possible to erase the content of documents. However, even though a copying machine disclosed in Patent Document 1 is used to make a copy of a confidential document by utilizing color-changing toner, for example, if the document, which is duplicated by color-changing toner, is copied by a copying machine which uses a normal toner, then a non-erasable document is reproduced from the document and it becomes possible to compromise the information.

Also, if a technique disclosed by Patent Document 2, in which a sheet on which an image has been formed by a color-changing toner is discriminated by detecting existence or nonexistence of an identification mark, is used to prevent a confidential document, which has been printed with color-changing toner, from being duplicated, in other words, if a technique by which document duplication by normal toner is prohibited in case an identification mark is detected is used, it is still difficult to prevent information leakage because duplication with normal toner is possible by covering up or erasing the identification mark.

SUMMARY OF THE INVENTION

The present invention has been achieved in consideration of the above problems, and it is one of the main objects to provide an image processing apparatus and an image reading apparatus capable of preventing information on a document, which has been printed with color-changing toner, from being compromised.

The above object of the present invention can be attained by the following image processing apparatus to which one aspect of the present invention is reflected.

[1] An image processing apparatus reflecting one aspect of the present invention may include, but is not limited to: a light source for reading, configured to apply an illuminating light onto a surface of an original document to read the original document; a light source for erasing, configured to apply a light of a specific wavelength which decolorizes a color-changing printing agent having the characteristic that the agent usually exhibits a specific color and is changed to become colorless or transparent after being irradiated with the light of the specific wavelength; a reading section, configured to receive a reflected light from the original document onto which the illuminating light has been applied by the light source for reading; an output section configured to output image data of the original document having been read by the reading section; and a control section, wherein, the control section is configured: (1) to obtain a first image data from the reading section, by applying the illuminating light from the light source for reading onto an area of the surface of the original document; (2) to apply the light of the specific wavelength from the light source for erasing onto that area of the surface of the original document onto which the illuminating light from the light source for reading has been irradiated; (3) to obtain a second image data from the reading section, by applying the illuminating light, from the light source for reading, onto that area of the surface of the original document where it is presumed that any image formed by the color-changing printing agent is expected to have been changed to become colorless or transparent after being irradiated with the light of the specific wavelength; (4) to determine whether or not the color-changing printing agent has been used in the image of the original document based on the first image data and the second image data; and (5) to change at least one of (a) a reading operation of the reading section to read the original document, and (b) an output operation of the output section to output the image data, being read, of the original document, based on the result of determination.

[2] The image processing apparatus of [1] reflecting another aspect of the present invention, wherein the reading section is configured to read a partial area by partial area, successively, of an original document, in a reading area of a prescribed size; the light source for reading and the light source for erasing are configured to apply the lights onto the partial area, of the original document, in the reading area of the prescribed size; the image processing apparatus further comprises a moving section configured to move the light source for reading and the light source of erasing relatively, both applying the lights onto the partial area, of the original document, in the reading area of the prescribed size; and the control section is configured: (1) to obtain a first image data of the partial area of the original document from the reading section, by applying the illuminating light from the light source for reading to the original document disposed in the reading area in the prescribed size; (2) to apply the light of the specific wavelength from the light source for erasing onto the partial area onto which the illuminating light from the light source for reading has been irradiated; and (3) to obtain a second image data from the reading section, by applying the illuminating light, from the light source for reading, onto the partial area where it is presumed that any image formed by the color-changing printing agent is expected to have been changed to become colorless or transparent after being irradiated with the light of the specific wavelength.

[3] The image processing apparatus of [1] reflecting still another aspect of the present invention, wherein, in a case in which the control section determined, while reading operation is activated to read the original document, that the color-changing printing agent has been used in an image of the original document, the control section is configured to control to deactivate the reading operation.

[4] The image processing apparatus of [1] reflecting still another aspect of the present invention, wherein, in a case in which the control section determined, while reading operation is activated to read the original document, that the color-changing printing agent has been used in an image of the original document, the control section is configured to control to deactivate the reading operation for the second image data and continue the reading operation for the first image data and application of the light of the specific wavelength, by the light source for erasing until the completion of the reading operation.

[5] The image processing apparatus of [1] reflecting still another aspect of the present invention, wherein, in a case in which the control section determined, while reading operation is activated to read the original document, that the color-changing printing agent has been used in image of the original document, or it is determined that the color-changing printing agent has not been used in image of the original document, the control section is configured to deactivate the reading operation for the second image data and application of the light of the specific wavelength, by the light source for erasing, and continue the reading operation for the first image data until the completion of the reading operation.

[6] The image processing apparatus of [1] reflecting still another aspect of the present invention, wherein, in a case in which the control section determined that the color-changing printing agent has been used in image of the original document, the control section is configured to prohibit an output operation.

[7] The image processing apparatus of [1] reflecting still another aspect of the present invention, wherein, the output operation comprises a printing operation to print an image onto a recoding medium with printing agent, the printing agent comprises the color-changing printing agent and a non-color-changing printing agent, and in a case in which the control section determined that the color-changing printing agent has been used in an image of the original document, the control section is configured to control of carrying out a limited output operation of printing the image data of the original document onto a recording medium by using the color-changing printing agent.

[8] The image processing apparatus of [1] reflecting still another aspect of the present invention, further comprising: a platen on which an original document to be read by the reading section is set; and a holding section which is switchable between a first holding state in which the original document is removable, and a second holding state in which the original document is not removable, wherein the control section is configured to switch to the second holding state in reading operation to read the original document, and to switch to the first holding state when the reading operation is completed.

[9] The image processing apparatus of [1] reflecting still another aspect of the present invention, further comprising: a platen on which a original document to be read by the reading section is set; and a holding section which is switchable between a first holding state in which the original document is removable, and a second holding state in which the original document is not removable, wherein the control section is configured to control: (1) to initiate reading operation to read the original document in the first holding state; (2) to switch to the second holding state when the control section determines that the color-changing printing agent has been used in the image of the original document; and (3) to switch to the first holding state when the reading operation is completed.

[10] The image processing apparatus of [1] reflecting still another aspect of the present invention, further comprising a non-volatile storage unit, wherein the control section is configured to control to store the first image data into the non-volatile storage unit.

BRIEF DESCRIPTION OF THE DRAWINGS

The preferred embodiments of the present invention are shown by way of example, and not limitation, in the accompanying figures, in which:

FIGS. 9a to 9d each is a diagram schematically showing an example of a mixture of normal toner and color-changing toner having been used to print the image of the original document and determination of the image area of each toner.

FIG. 16 is a diagram schematically showing an example of a case in which the image area of color-changing toner is substituted by a prescribed image data when original document is copied.

DETAILED DESCRIPTION OF THE PREFERRED EMBODIMENTS

Figure 1:
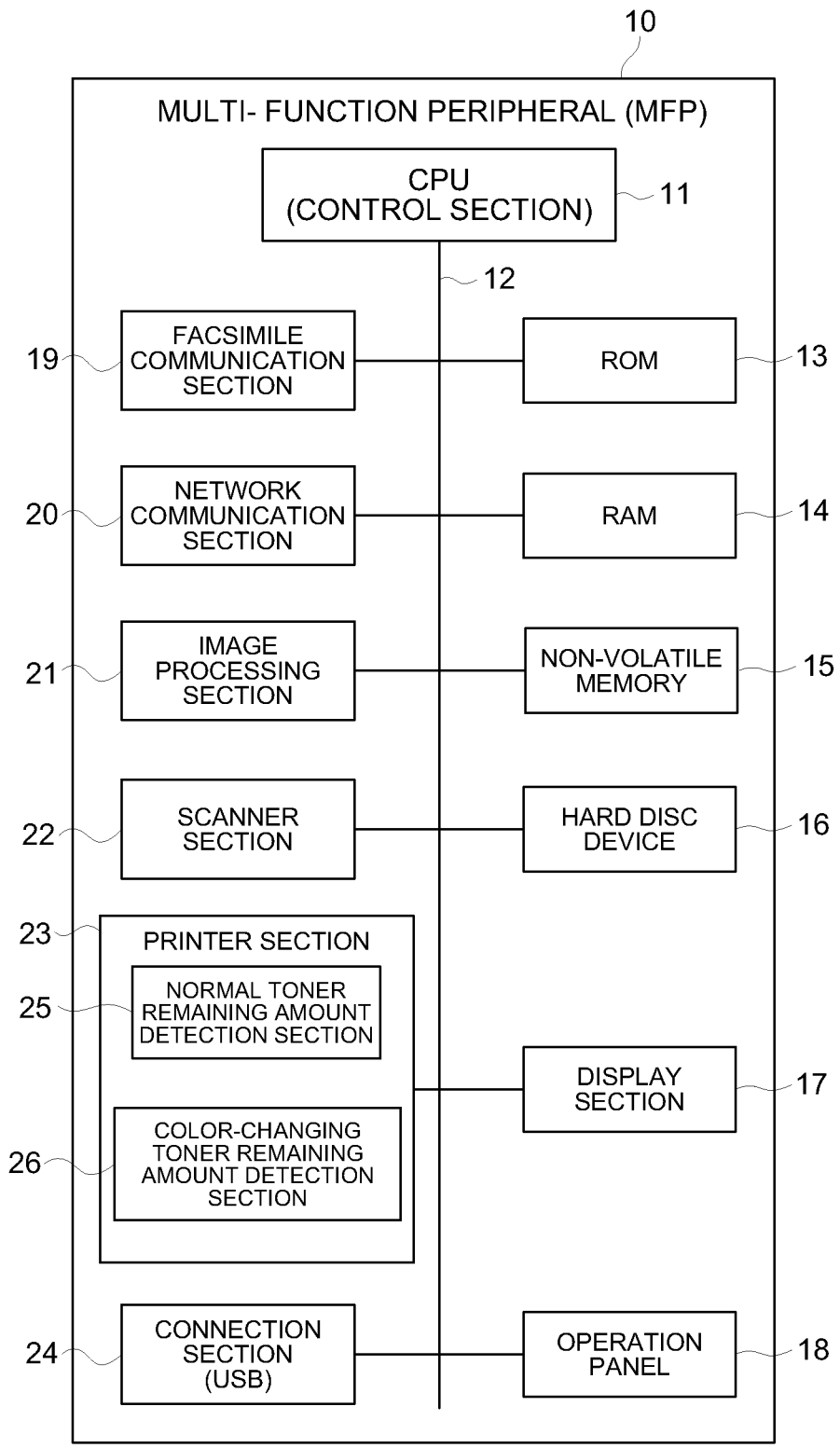
FIG. 1 is a block diagram schematically showing an example of a multi-function peripheral as an image processing apparatus according to a first embodiment of the present invention.

Referring to the drawings, preferred embodiments of the present invention will be detailed in the following.
First Embodiment FIG. 1 is a block diagram schematically showing an example of multi-function peripheral (hereinafter, referred to as MFP) 10 as an image processing apparatus according to a first embodiment of the present invention.

MFP 10 is provided with functions such as the copying function of optically reading out an original document and printing out the duplicated image on a recording medium, the scanning function of storing the image data of a document that has been read out in the form of a file or transmitting the image data of a document that has been read out to an external terminal, such as another MFP 10 and USB (Universal Serial Bus) memory and the like, the printer function of forming and outputting on a recording medium the image data (file) stored in MFP 10 and the image data received from an external terminal, the facsimile function of transmitting and receiving an image data, and the electronic mail function of transmitting and receiving an electronic mail, and the like.

Also, MFP 10 is provided with a function of determining whether color-changing toner, having the characteristic that the toner is to become colorless or transparent after being irradiated with a light of the specific wave length, has been used in the image on original document, a function of changing reading operation to read the original document based on the result of determination, and a function of changing the output operation of the image data, which is read, of the original document. The types of the output operations include, for example, but are not limited to, printing operation by copying function, storing operation and transferring operation to external terminal (terminal device, server, external memory device, another MFP 10, and the like) by scanning function, and a transferring operation by electronic mailing function (mail attaching and sending operation). Also, output operations such as storing an image data of original document internally (box storage) and printing and transferring of the stored image data are examples of output operations.

MFP 10 is configured by connecting ROM (read only memory) 13, RAM (random access memory) 14, nonvolatile memory 15, hard disc device 16, display section 17, operation section 18, facsimile communication section 19, network communication section 20, image processing section 21, scanner section 22, printer section 23, and connection section 24, via bus 12 to CPU (central processing unit) 11, as a control section that comprehensively controls the operations of this MFP 10.

The CPU 11 controls operations of MFP 10 based on the program stored in ROM 13. RAM 14 is used as a work memory, which temporarily stores various data when the CPU 11 executes a program. Further, RAM 14 is used as an image memory for temporarily storing the image data.

Non-volatile memory 15 is a rewritable memory whose stored contents are retained even when the power supply to the memory has been switched off. Non-volatile memory 15 memorizes peculiar information and various setting information of MFP 10. Hard disc device 16 stores various types of stored data, inputted image data, and the like. These non-volatile memory 15 and hard disc device 16 constitute a non-volatile storage unit.

Display section 17 consists of a liquid crystal display (LCD) or the like, and displays various screens such as operation screens, setting screens, confirmation screens, notification screens, and the like. Operation section 18 consists of a touch panel, that is provided on top of the surface of the liquid crystal display and that detects the coordinate positions which have been pressed, and various types of buttons such as a start button, a stop button, a numerical keypad, and other buttons. Operation panel 18 carries out the function of receiving various operations that a user performs on multi-function peripheral 10.

Facsimile communication section 19 communicates via a public line with an external apparatus that is provided with a facsimile function. Network communication section 20 communicates with a terminal, a server, another MFP 10, and other devices, via a network, such as LAN (local area network), and the like.

Image processing section 21 is provided with image processing functions such as image correction, image rotation, image enlargement and reduction, compression and decompression of image data, and other processing.

Scanner section 22 carries out the function of obtaining the image data by optically reading out an original document. The configuration of the section will be described later.

Printer section 23 forms an image on a recording medium based on image data through an electrophotographic process. Printer section 23 is configured, for example, but is not limited to, a so-called laser printer provided with a conveyance device for recording mediums, a photoconductive drum, a charging device, an LD (laser diode) controlled to be tuned on and off in accordance with the inputted image data, a scanning unit to scan the laser light radiated from the LD onto the photoconductive drum, a developing device, a transfer separating device, a cleaning device and a fixing device. Another method of the printer such as a LED printer, in which LEDs (light emitting diodes) radiate the photoconductive drum instead of the laser light, can be used.

Printer section 23 is also provided with a function with which the printer forms an image on a recording medium selectively by using color-changing toner having the characteristic that the toner is changed to become colorless or transparent after being irradiated with a light of a specific wavelength, or by using normal toner (non-color-changing toner). For printer section 23, the above described photoconductive drum, charging device, LD (or LED), scanning unit, developing device, transfer separating device, cleaning device, and fixing device are separately provided for each of color-changing toner and normal toner, and color-changing toner and normal toner can be selectively used to form an image by unit of a recording medium (by a unit of printing surface) or by a unit of area within a recording medium (by unit of area within a printing surface). Also, printer section 23 is provided with normal toner remaining quantity detection section 25, and color-changing toner remaining quantity detection section 26.

An example of color-changing toner, but is not limited to, toner having the characteristic that the toner is changed to become colorless or transparent after being irradiated with near-infrared rays. For example, a toner which contains a cyanine dye as a coloring agent, and an organic boron ammonium salt as an auxiliary erasing agent and the dye is changed to a leuco compound, which is substantially colorless or transparent, when near-infrared rays irradiate the toner.

Connecting section 24 is connected to an external memory device such as USB memory, and the like.

MFP 10 is capable of printing by selectively using normal toner and color-changing toner via the above described printer section 23. In case of copying an original document, a user of the MFP can select the toner type for printing while the user is setting various conditions related to the copy operation via display section 17 and operation section 18. MFP 10 prints out copy of the original document with normal toner, if normal toner is selected. MFP 10 prints out copy of the original document with color-changing toner if color-changing toner is selected.

A terminal device, which requests MFP 10 to print out a document, is equipped with a driver program (printer driver) of MFP 10. The driver program is provided with functions such as a function of receiving the type of the toner to be used for printing the document, a function of receiving the designation of area of use of color-changing toner if the toner is selected, and other functions. In the designation of area of use, the area of a document to be printed with color-changing toner can be appropriately designated. If an area of use is not designated, then all areas of the document will be printed with color-changing toner.

When MFP 10 receives image data, which is to be printed with normal toner, from a terminal device, MFP 10 is configured to select normal toner and use the toner to print out the document (single application of normal toner). When MFP 10 receives image data, which is to be printed with color-changing toner, from a terminal device, MFP 10 is configured to select color-changing toner and use the toner to print out the document (single application of color-changing toner). When MFP 10 receives image data, which is to be printed with color-changing toner and with a designation of the area of use, from a terminal device, MFP 10 is configured to select color-changing toner and use the toner to print out the designated area of the document, and selects normal toner and uses the normal toner for the area other than the designated area (combined application of both toners). In this case, the area printed with color-changing toner and the area printed with normal toner are mixed on a single sheet of the printed document.

A user who requests a print job of MFP 10 from a terminal device, may print a document having low confidentiality (normal document) by selecting normal toner for printing, and print a highly confidential document (secret document) by selecting color-changing toner for printing. Also, in a case in which highly confidential information is included as a part of document, the user is also capable of designating an area, which covers the part including confidential information, to be printed only with color-changing toner.

Scanner section 22 of MFP 10 consists of, for example, but is not limited to,: a light source for reading configured to apply illuminating light onto the surface of an original document in order to read the original document; a light source for erasing, configured to apply a light of a specific wavelength (near-infrared) to decolorize a color-changing toner; a reading section, configured to receive reflected light from the original document to which the illuminating light has been applied by the light source for reading. In addition to the functions of reading an original document, scanner section 22 is also provided with a function of decolorizing the image of the original document having been printed with the color-changing toner.

Figure 2A:
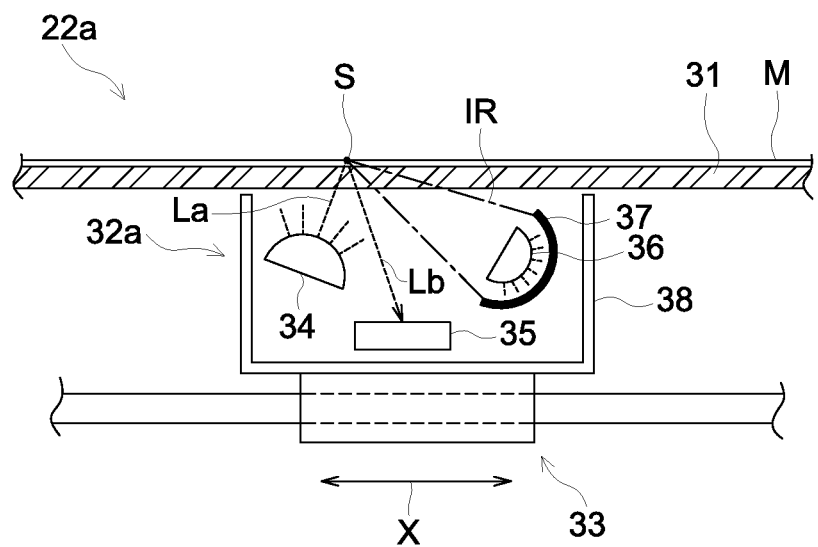
FIG. 2a is a diagram schematically showing an example of a scanner section equipped in the multi-function peripheral.
Figure 2B:
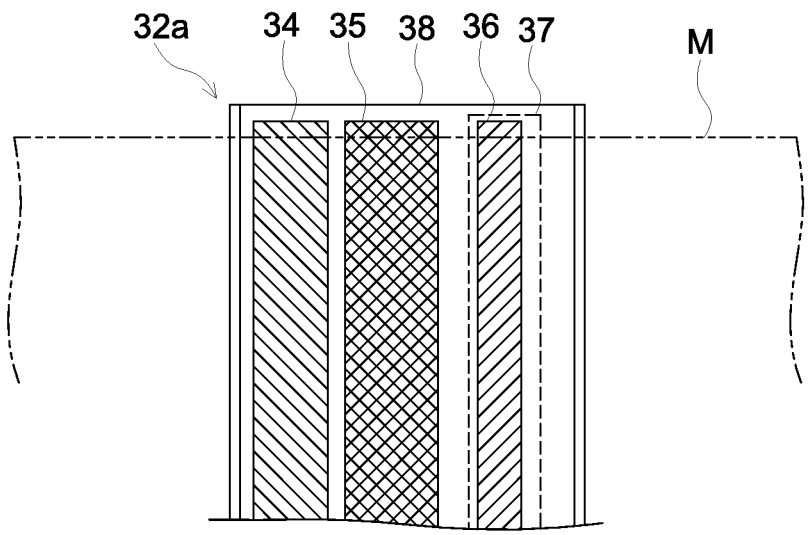
FIG. 2b is a plain view of an example of a reading section of the scanner section equipped in the multi-function peripheral, viewed from the top.

FIGS. 2a and 2b each is a diagram schematically showing scanner section 22a according to an embodiment of the present invention. Scanner section 22a, according to this embodiment, is configured as a scanner of a so-called flat-bed type (a type in which the original document is fixed in place). As shown in FIG. 2a, scanner section 22 consists of a platen 31 (original document table) on which original document M is set, reading section 32a for reading original document M set on platen 31, and shifting mechanism 33 for shifting reading section 32a along the length direction of original document M (reading direction X).

Reading section 32a consists of, but is not limited to, light source 34 for reading for applying illuminating light La onto original document M set on platen 31, line image sensor 35 (photoelectric conversion element) for receiving reflected light Lb from original document M in order to read one line of original document M along the width direction, light source 36 for erasing for applying light IR of the specific wavelength onto original document M, reflection plate 37 for reflecting and conversing light IR of the specific wavelength from light source 36 for erasing onto reading area (reading position) S of original document M to be read by line image sensor 35, and holding member 38, which is fixed onto shifting mechanism 33, for holding the above described component parts. FIG. 2b is a plain view of reading section 32a, viewed from the top.

Reading area S, of a prescribed size to be read by line image sensor 35, is a line shape (one-dimensional shape). Illuminating light La from light source 34 for reading, and light IR of the specific wavelength from light source 36 for erasing, are irradiated onto reading area S to be read by image sensor 35. Line sensor 35 is sequentially moved by shifting mechanism 33 along the length direction of original document M, and reads (scan-reads) original document M in reading area S, which is a line shape, line by line of the designated area. Scanner section 22a is also provided with, but is not limited to, a conversion section which converts analog image data, outputted from line image sensor 35, into digital image data.

Scanner section 22a according to this embodiment is capable of applying illuminating light La and light IR of the specific wavelength onto reading area S to be read by line image sensor 35, without moving reading section 32a. Namely, light source 34 for reading and light source 36 for erasing, provided in reading section 32a, are so arranged that illuminating light La from light source 34 and light IR of the specific wavelength from light source 36 are irradiated onto the same line (on the same scanning line) of original document M set on platen 31. When light IR of the specific wavelength is irradiated onto original document M set on platen 31, if image of original document M has been printed with color-changing toner, then the image within the area, when light IR of the specific wavelength is irradiated, is decolorized, and if image of original document M has been printed with normal toner, then the image is not decolorized.

Generally, decolorizing time (decolorizing speed) of color-changing toner varies depending on irradiation intensity (light quantity). In this embodiment, reflection plate 37 with light condensing function is provided to condense light IR of the specific wavelength from light source 36 for erasing onto reading area S, to be read by image sensor 35, to increase light quantity in order to shorten the decolorizing time.

Also, scanner section 22a according to this embodiment is capable of obtaining the first image data and the second image data, by either a one time scan-reading operation or a scan-reading operation divided into 2 times. In a case in which the first image data and the second image data are obtained by scan-reading operation divided into 2 times by the reciprocation movement of reading section 32a, it is explained, in FIG. 2a, that the first image data is obtained via first scan-reading operation by turning on light source 34 for reading and moving the light source in the direction from right to left in the figure. Then, the second image data can be obtained via second scan-reading operation in which light source 36 for erasing and light source 34 for reading are turned on and off one after the other while moving scanner section 32a in the direction from left to right in the figure.

Now, the operation of MEP 10 will be described.
(Reading Mode Setting)

First, the setting operation for setting reading mode of original document of scanner section 22a of MFP 10 is described.

Figure 3:
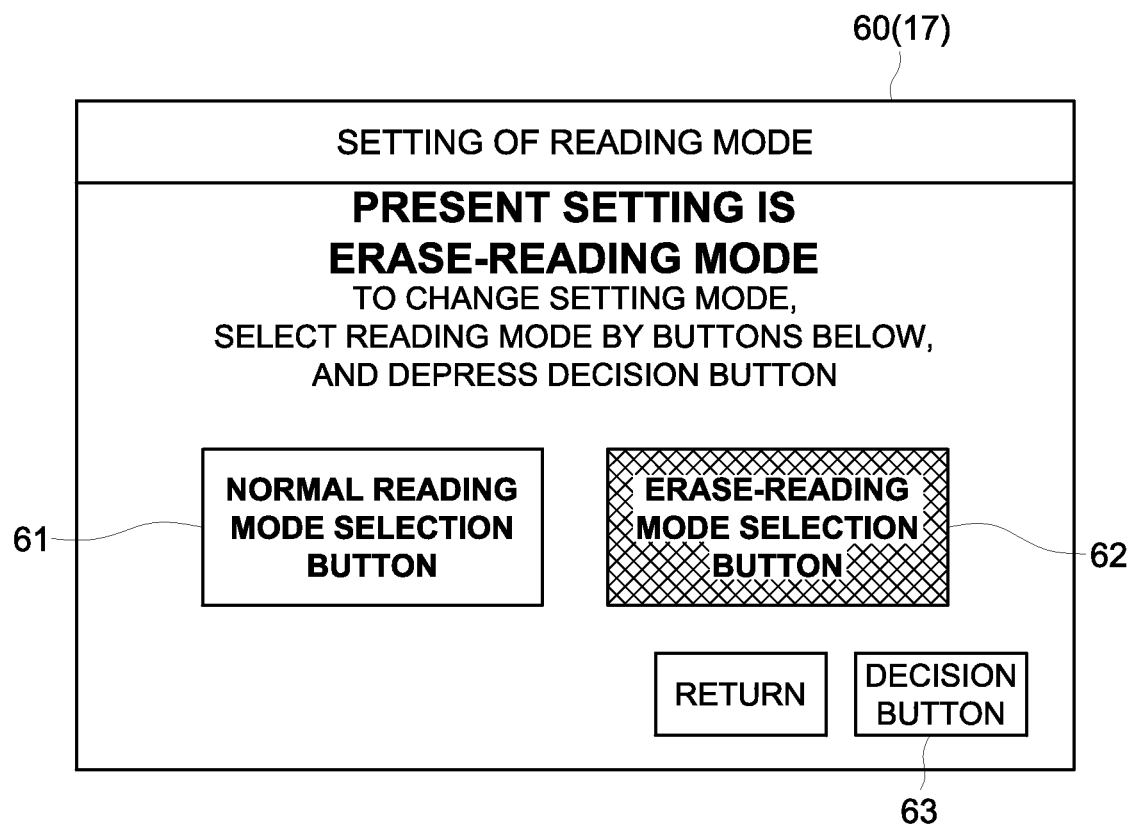
FIG. 3 is a diagram schematically showing an example of a reading mode setting screen, displayed on the display section of the multi-function peripheral.

FIG. 3 is a diagram schematically showing reading mode setting screen 60, displayed on the display section 17 of MFP 10. This setting screen 60 is displayed as an administrator setting screen. The screen may also be displayed as a user setting screen.

MFP 10 is provided with a normal reading mode and an erase-reading mode as a reading mode of the original document. The normal reading mode is a reading mode in which an original document is read by irradiating illuminating light La by turning on light source 34 for reading while light source 36 for erasing in scanner section 22a is turned off. The erase-reading mode is a reading mode in which an original document is read by irradiating illuminating light La and light IR of the specific wavelength one after the other by turning on and off light source 34 for reading and light source 36 for erasing one after the other at a prescribed timing.

The administrator (or user) is capable of selecting either one of the reading modes by depressing either normal reading mode selection button 61 or erase-reading mode selection button 62, both being displayed on reading mode setting screen 60, and then by setting the reading mode, which has been selected, by depressing decision button 63. When the setting of reading mode is carried out via reading mode setting screen 60, the set value of reading mode is stored in non-volatile memory 15. Note that the default value of setting mode is the normal reading mode in this embodiment.

Figure 4:
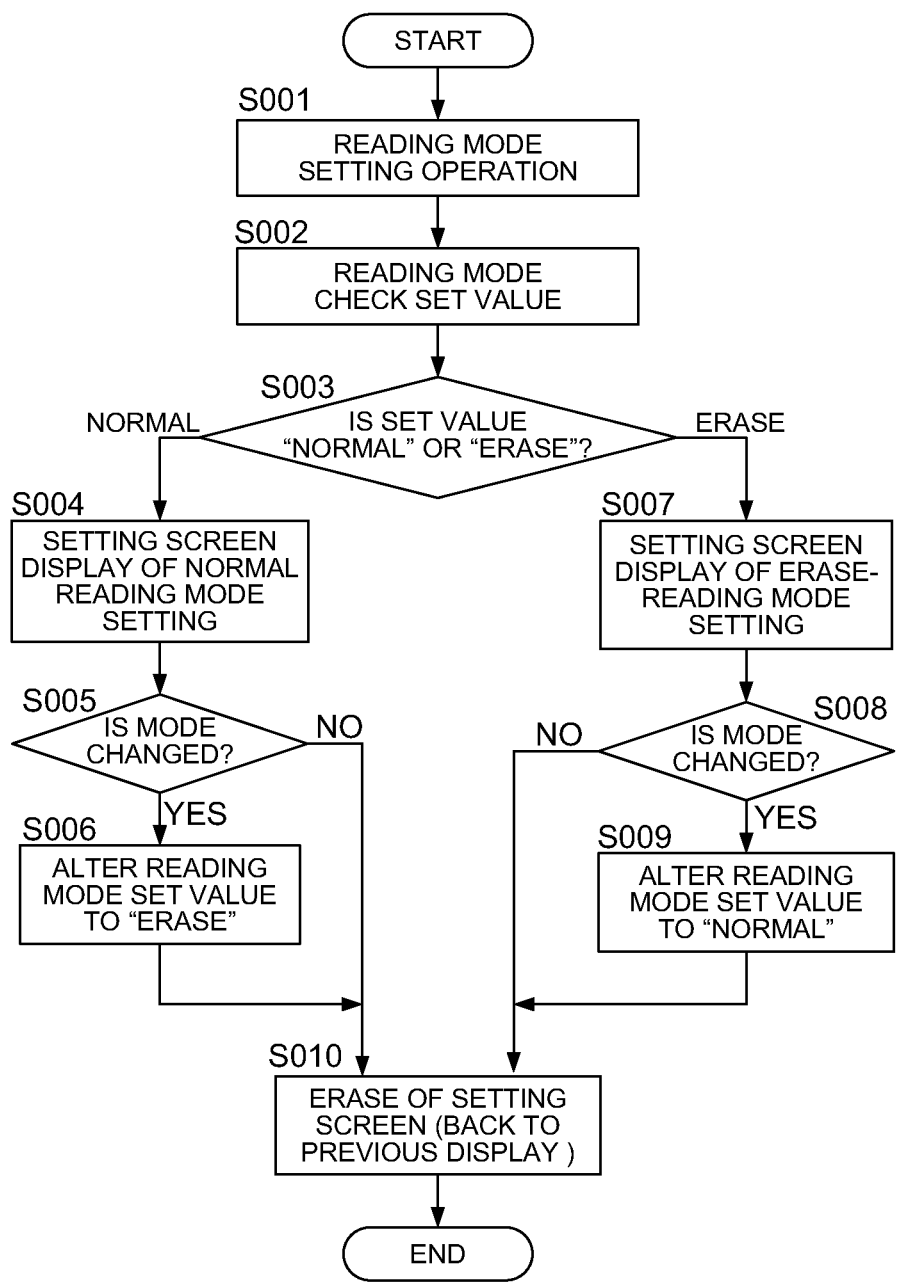
FIG. 4 is a flow chart showing an example of the setting operation of the reading mode of the multi-function peripheral.

FIG. 4 is a flow chart showing an example of the setting operation of the reading mode of MFP 10. When MFP 10 receives operation (display operation on reading mode setting screen 60) for setting reading mode by an administrator (or user) (step S001), CPU 11 checks the set value for reading mode stored in non-volatile memory 15 (step S002), and displays reading mode setting screen 60, which indicates the setting status of reading mode corresponding to the current set value, on display section 17.

In case that the set value is the normal reading mode (step S003: NORMAL), CPU 11 displays reading mode setting screen 60, which indicates the setting status of the normal reading mode, on display section 17 (step S004). For example, reading mode setting screen 60, which highlights normal reading mode selection button 61, and the like, is displayed. In case that no operation to change the reading mode is made via reading mode setting screen 60 (step S005: NO), CPU 11 erases reading mode setting screen 60 and displays the previous screen, which was displayed before reading mode setting screen 60, on display section 17 (step S010 to END). In case that the operation, to change the reading mode to the erase-reading mode, is made (step S005: YES), CPU 11 rewrites the set value of reading mode stored in non-volatile memory 15 from the normal reading mode to the erase-reading mode (step S006), and erases reading mode setting screen 60, and displays the previous screen on display section 17 (step S010 to END).

In case that the set value of reading mode is the erase-reading mode (step S003: ERASE), CPU 11 displays reading mode setting screen 60, which indicates the setting status of the erase-reading mode, on display section 17 (step S007). For example, reading mode setting screen 60, which highlights erase-reading mode selection button 62, and the like, is displayed (the status shown in FIG. 3). In case that no operation to change the reading mode is made via reading mode setting screen 60 (step S008: NO), CPU 11 erases reading mode setting screen 60 and displays the previous screen on display section 17 (step S010 to END). In case that an operation to change the reading mode to the normal reading mode is made (step S005: YES), CPU 11 rewrites the set value of reading mode stored in non-volatile memory 15 from the erase-reading mode to the normal reading mode (step S009), and erases reading mode setting screen 60, and displays the previous screen on display section 17 (step S010 to END).
(Determination of Toner Type)

Next, the determination operation, to determine whether color-changing toner has been used in image on an original document while reading the original document in the erase-reading mode, will be described.

This determination is carried out by comparing the first image data, which is the image data obtained, via scanner section 22a, before irradiating original document M by light IR of the specific wavelength from light source 36 for erasing, and the second image data, which was obtained after irradiating original document M by light IR (refer to FIG. 2a). After comparing, to see if both image data are identical, then it is determined that color-changing toner has not been used and normal toner has been used. If the image data are not identical, it is determined that color-changing toner has been used. As for the way of comparison, there is a way in which comparison is carried out for a partial area of image of the original document, and the other way in which comparison is carried out for all the areas of image of the original document. It is preferable to compare a partial area if productivity (performance) has a higher priority. If it is to determine the mixture of normal toner and color-changing toner more definitely, it is preferable to compare all the areas of image of the original document.

Figure 5:
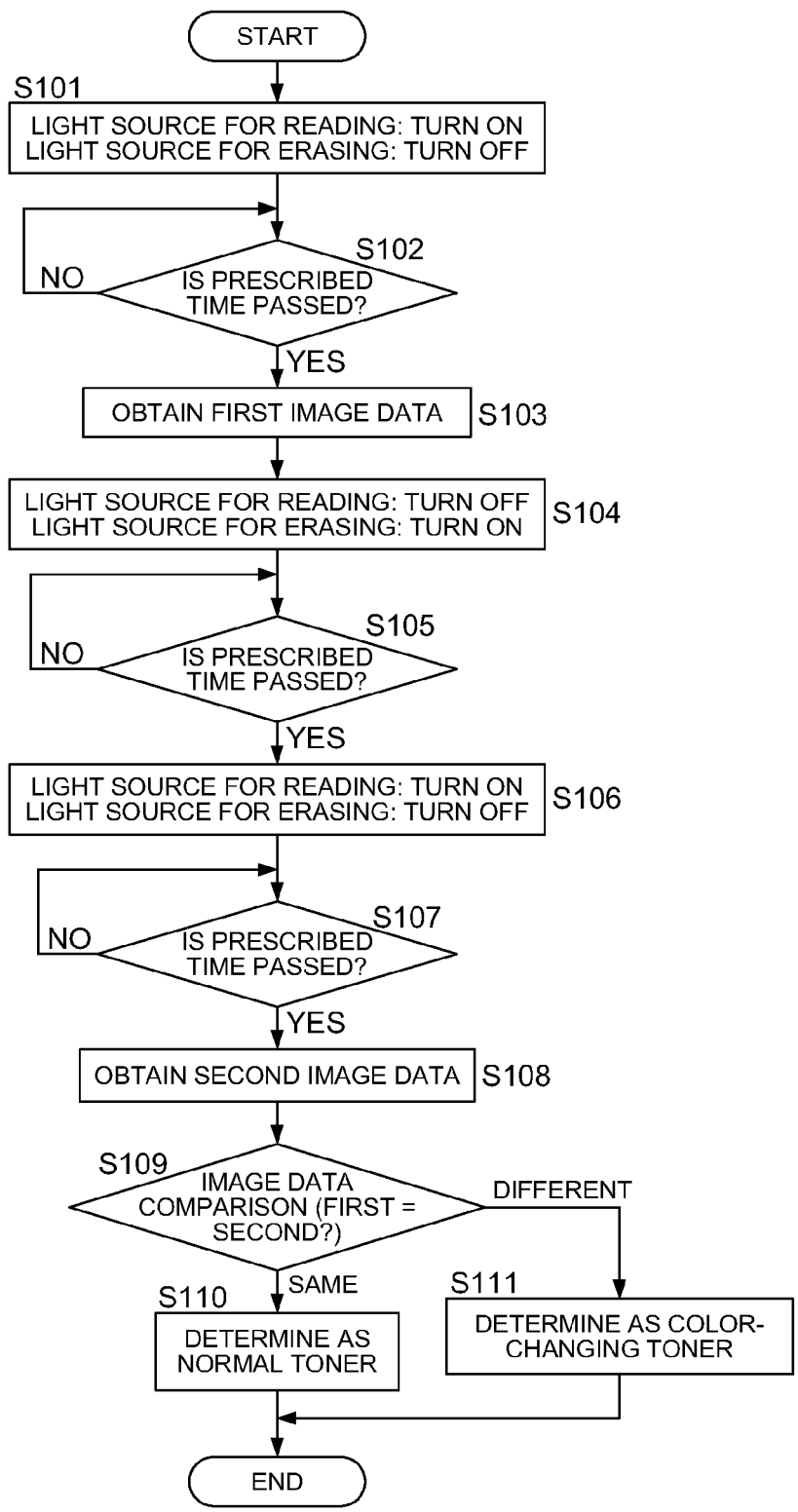
FIG. 5 is a flow chart showing an example of the determining operation, of the multi-function peripheral, to determine whether color-changing toner has been used in an image in the original document.
Figure 6:
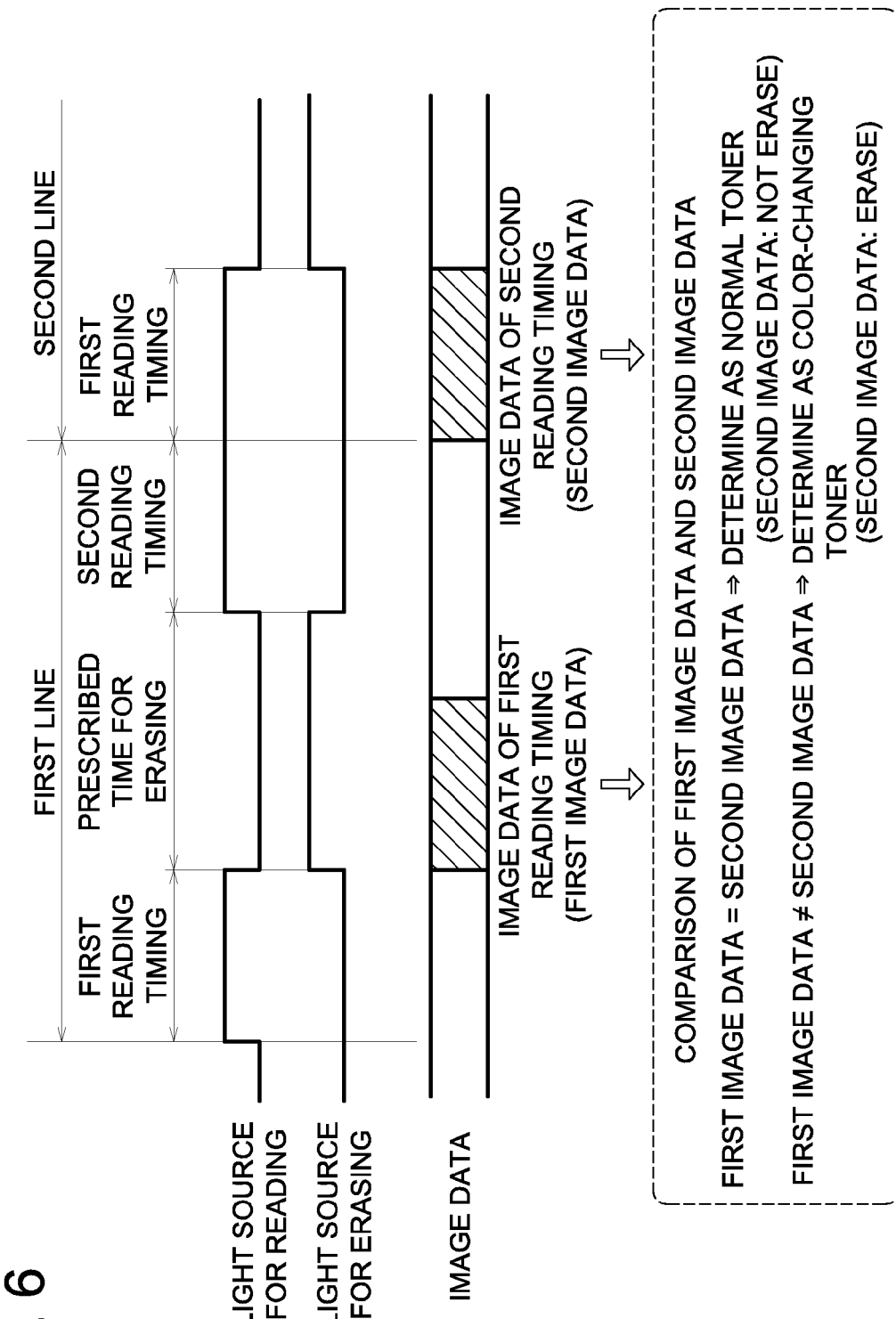
FIG. 6 is a timing chart showing an example of the timing of reading of the original document and the timing of turn-on and turn-off of the light source based on the determining operation of FIG. 5.

FIG. 5 is a flow chart showing an example of the above described determining operation of MFP 10. FIG. 6 is a timing chart showing an example of the timing of turn on and off of light source 34 for reading and light source 36 for erasing, and the timing of reading of the original document (the timing of obtaining image data) based on the determining operation. Basic operation for comparing a partial area of the image on an original document and for comparing all the areas of image of the original is the same, and is shown in FIGS. 5 and 6.

When reading operation by scanner section 22a, to read original document M, is initiated (START), CPU 11 of MFP 10 turns on only light source 34 for reading, of the two light sources, light source 34 for reading and light source 36 for erasing both of which are turned off before reading operation is initiated (steps S101 to S102: NO, also, refer to FIG. 6). Line image sensor 35 receives and stores reflected light Lb from reading area S of original document M, reading area S which is irradiated by illuminating light La from light source 34 for reading, and reads the image (line image) in reading area S.

CPU 11 keeps turned on light source 34 for reading for a prescribed time which is necessary for reading by light accumulation in line image sensor 35 (step S102: YES, also refer to FIRST READING TIMING in FIG. 6). Then, CPU 11 obtains image data, which is outputted as image data from scanner section 22a, as first image data (step S103, also refer to IMAGE DATA OF FIRST READING TIMING (FIRST IMAGE DATA) in FIG. 6), and turns off light source 34 for reading and turns on light source 36 for erasing (steps S104 to S105: NO). CPU 11 keeps turned on light source 36 for erasing for the prescribed time necessary to decolorize color-changing toner (step S105, also refer to PRESCRIBED TIME FOR ERASING in FIG. 6), and then, turns off light source 36 for erasing and turns on light source 34 for reading again (steps S106 to S107: NO). CPU 11 keeps turned on light source 34 for reading for the prescribed time necessary for reading by light accumulation in line image sensor 35 (step S107: YES, also refer to SECOND READING TIMING in FIG. 6), and then obtains image data, which is outputted as image data from scanner section 22a, as second image data (step S108, also refer to IMAGE DATA OF SECOND READING TIMING (SECOND IMAGE DATA) in FIG. 6).

CPU 11 compares first image data and second image data which were obtained (step S109), and if both are identical (step S109: SAME), then, CPU 11 determines that normal toner has been used in the image of original document M (step S110 to END). If they are not identical (step S109: DIFFERENT), then CPU 11 determines that color-changing toner has been used in image on original document M (step S111 to END). Here, blank areas which exist in the edge portions of original document are ignored, and only the first image data and second image data which were read from image area of original document are compared.

The basic operation has been described above. In the case in which the determination is to be made by the first line of image data in the image area (image area excluding the blank areas at the edge portions of the original document), the determination is made by comparing the first and second image data of the first line, which have been obtained by carrying out one cycle from step S101 to step S108. In the case in which the determination is to be made by plural lines (the first line to the N-th line), the determination is made by comparing the first and second image data of plural lines (N lines), which were obtained by carrying out plural cycles (N cycles) from step S101 to step S108. In the case in which the determination is to be made by comparing image data of all the areas of the image of the original document, the determination is made by comparing the first and second image data of all the areas of image of the original document, which were obtained by repeating the cycle (step S101 to step S108) until the completion of the reading of the original document.

Also, as shown in FIG. 6, light source 34 for reading is controlled to be kept turning on after the second lighting time for the same one line (after the light source is turned on again to read the original document to obtain the second image data) in order to shift to the first lighting operation for the next line by maintaining the lighting state. In this embodiment, by maintaining the lightning state of light source 34 for reading between lines as described above, light source 34 for reading and light source 36 for erasing are controlled to be turned on and off one after the other.

In the case in which the determination is to be made by comparing a partial area of the image of the original document (by first line or by plural lines), the reading operation to obtain the second image data (SECOND READING TIMING in FIG. 6) is skipped, after the determination is made, and only the reading operation to obtain the first image data is to be continued.

When it is determined that color-changing toner has been used, and the image of the original document is to be erased, then, it is controlled that only the reading operation to obtain the second image data is terminated and the ON/OFF control operation of light source 36 for erasing is continued. When it is determined that normal toner has been used, then it is controlled that the ON/OFF control operation of light source 36 for erasing is also terminated because it is no longer necessary to irradiate light IR of the specific wavelength onto the original document Also, when it is determined that color-changing toner has been used, and image on the original document is not to be erased, then also the ON/OFF control operation of light source 36 for erasing is terminated.

Figure 7:
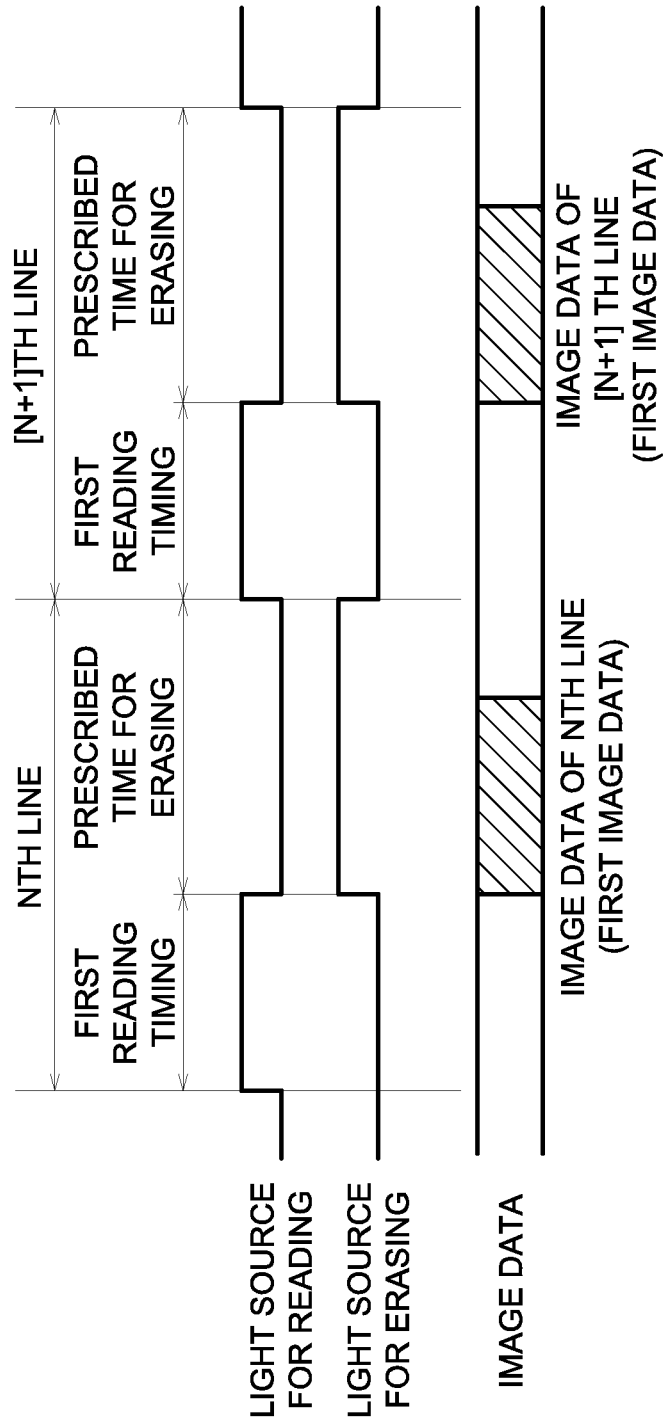
FIG. 7 is a timing chart showing an example of a case in which only the reading operation for the second image data is terminated after the determination.

FIG. 7 is a timing chart showing an example of a case in which only the reading operation for the second image data is terminated after the determination. As shown in the figure, if the reading operation is terminated at the N-th line, for example, only the lighting of light source 34 for reading (SECOND READING TIMING in FIG. 6) is skipped in reading operation after the N-th line. Compared to FIG. 6, because the necessary time for the second reading timing is deleted, that amount of time is shortened from the reading operation per line.

Figure 8:
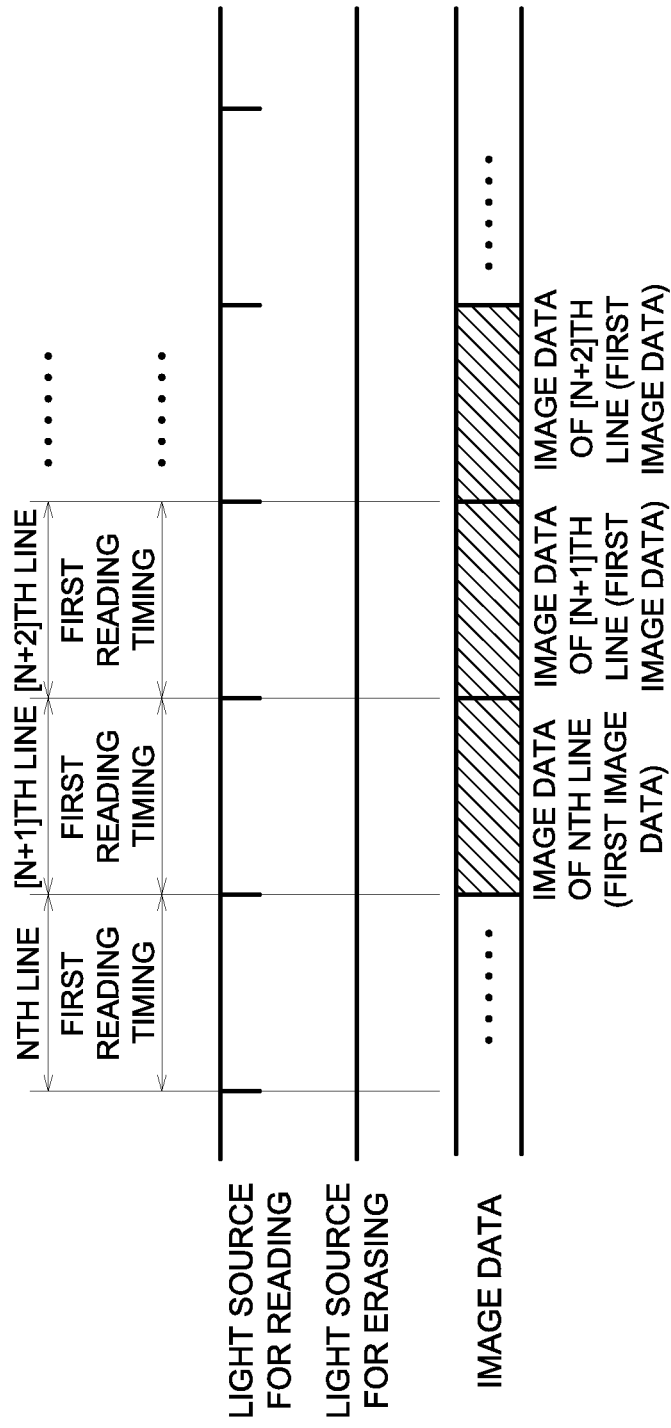
FIG. 8 is a timing chart showing an example of a case in which both reading operation for the second image data and turn-on/off control of the light source for erasing are terminated after the determination.

FIG. 8 is a timing chart showing an example of a case in which both reading operations for the second image data and ON/OFF control of light source 36 for erasing are terminated after the determination. As shown in the figure, in case the operation for light source 36 for erasing is changed at the N-th line, the duration of the prescribed time for erasing for lighting light source 36 for erasing is omitted, and the first reading timing is continuously repeated (light source 34 for reading is in a continuously activated state). Therefore, the time necessary for reading is further shortened.

FIGS. 9a to 9d each is a diagram schematically showing an example of a mixture of normal toner and color-changing toner having been used to print the original image and determination of the image area of each toner (namely, determination of the mixture of toner types).

This determination is carried out by extracting the difference between the first image data and second image data both of which were obtained by reading all of the image areas of the original document, and comparing the different portions of image data. In the figures, original image is set as "Im" as shown in FIG. 9a, and as shown in FIG. 9b, first image data, second image data, and the different portions of image data are set as "I1", "I2", and "I3", respectively ("I1"–"I2"="I3").

First image data "I1", which is read and obtained before light IR of the specific wavelength is irradiated, is the same as original image "Im" regardless of the type of toner. As shown in FIG. 9b, in case in which first image data "I1" and second image data "I2" are identical in all of the image areas and there is no different portion of image data "I3" ("I1"="I2" ("I3"=0)), it is determined that there is no mixture of the type of toner, and that normal toner has been used in all the image areas of original image "Im". As shown in FIG. 9c, if first image data "I1" and second image data "I2" are not identical and there exist different portions of image data "I3", and, if different portions of image data "I3" are the same as first image data "I1", then it is determined that there is no mixture of the type of toner, and that color-changing toner has been used in all the image area of original image "Im". As shown in FIG. 9d, if first image data "I1" and second image data "I2" are not identical and there exist different portions of image data "I3", and, if different portions of image data "I3" are not the same as first image data "I1", then it is determined that there is a mixture of the types of toner, and that color-changing toner has been used in all the image area which is corresponding to different portions of image data "I3".

(Content of Operation Change)

Subsequently, the content of operation change will now be described. In this embodiment, control of operation change is carried out in terms of the following three points. A brief overview of the content of each operation change is as follows. Note that (2) and (3) are the controls in which it is considered that a document having been printed with color-changing toner used is a highly confidential document (secret document).

(1) Control for Reading Operation for Improvement of the Performance a. If it is determined during the reading operation that color-changing toner has been used, the reading operation for second image data is terminated (refer to FIG. 7). Hereinafter, this control is referred to as "Control 1a".

b. If it is determined during the reading operation that color-changing toner has been used, the reading operation for second image data and lighting of light source 36 for erasing are terminated (refer to FIG. 8). Hereinafter, this control is referred to as "Control 1b".

(2) Control for Output Operation for Transfer of Contents a. If it is determined that color-changing toner has been used in the original image, the image data (the read image), which is to be stored inside MFP 10 temporarily or continuously, is memorized together with identification information which indicates that color-changing toner has been used in the original image. Hereinafter, this control is referred to as "Control 2a". (The identification information is also considered as information indicating that the image data linked with the identification information is to be printed with color-changing toner.)

b. When the image data (the read image), which has been stored inside MFP 10 temporarily or continuously, is to be printed out, output operation is controlled to be limited to output operation of printing out the image data with color-changing toner if the image data is linked with identification information (limited output operation). Hereinafter, this control is referred to as "Control 2b".

b1. In the case in which the type of output operation is a printing (such as copy, box to print, and the like), the image data is printed out by color-changing toner compulsorily regardless of user setting.

b2. In the case in which the type of output operation is a transfer to other apparatus (such as scan to print, and the like), the capability of the other apparatus (transfer destination), to which the image data is transferred, is confirmed, and if the other apparatus is capable of printing the image data with color-changing toner, then the transfer operation is allowed, but if the other apparatus is not capable of printing the image data with color-changing toner, then the transfer operation is disallowed.

b3. In the case in which the type of output operation is a transfer to an external memory device (such as USB memory, and the like), the transfer operation is prohibited.

c. After the completion of a printing or transfer operation, the stored image data (the read image data) and the identification information are erased. Hereinafter, this control is referred to as "Control 2c".

(3) Control for Improvement of Security and Effect of Energy Conservation a. If it is determined that color-changing toner has been used in the original image, an output operation (output processing) is prohibited (namely, prohibition of duplication of a confidential document). Hereinafter, this control is referred to as "Control 3a". Examples of output operations: copy output, scan to XXX (examples of XXX: e-mail, SMB (server message block), FTP (file transfer protocol), USB, print (printing by another MFP 10), and the like), facsimile transmission, and other output operations.

b. If it is determined during the reading operation that color-changing toner has been used in the original image, the reading operation is terminated and output operation is also prohibited (namely, termination of the unnecessary reading operation and prohibition of duplication of confidential document). Hereinafter, this control is referred to as "Control 3b".

c. In the case in which the remaining amount of color-changing toner is not more than a prescribed amount, the above described prohibition control of "Control 3a" or "Control 3b" is carried out (namely, suppression of consumption of various kinds of resources used for printing and effects of energy conservation). Hereinafter, this control is referred to as "Control 3c".

The above described controls will now be explained specifically.

Figure 10:
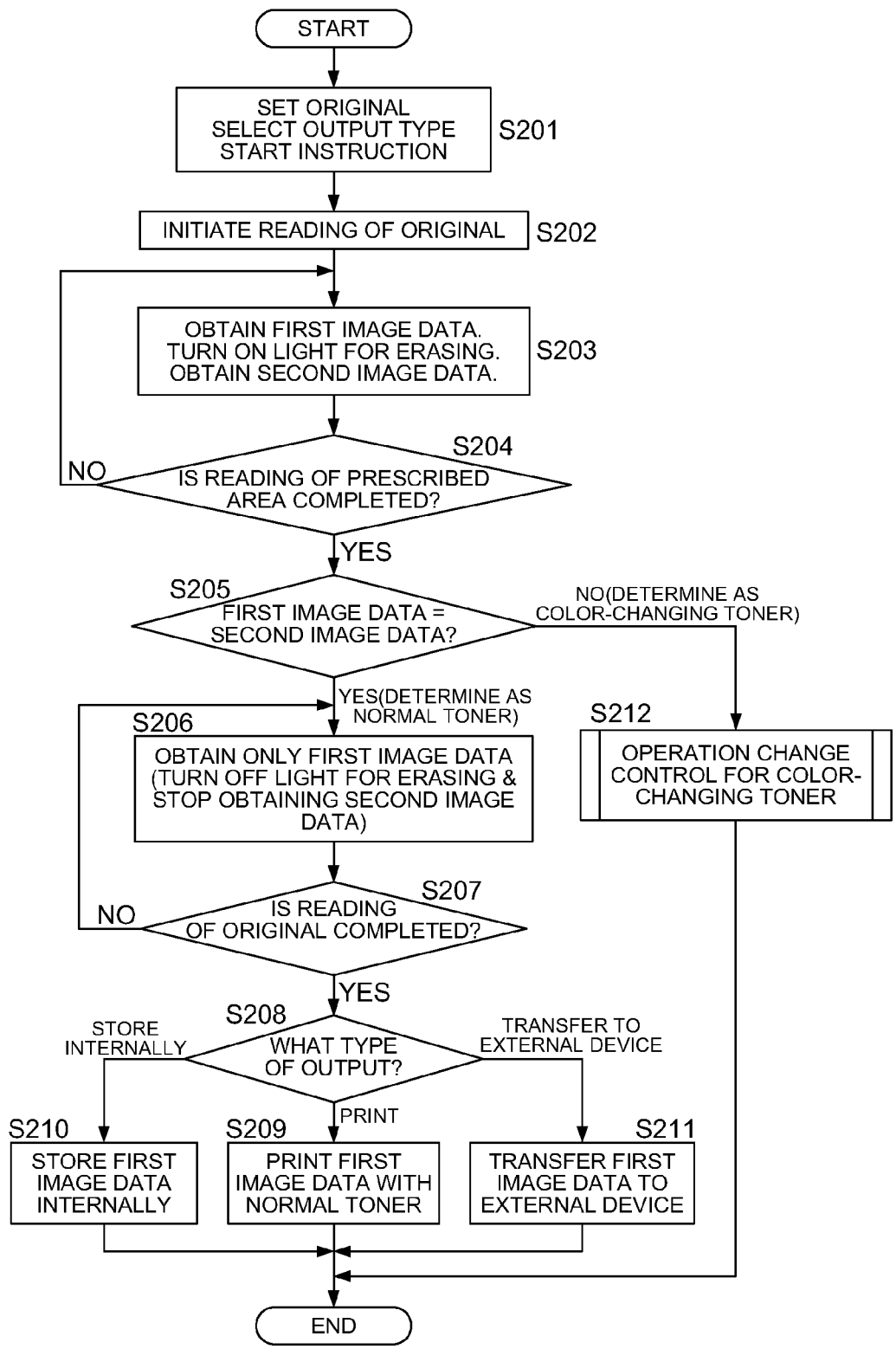
FIG. 10 is a flow chart showing an example of the reading operation change control of the multi-function peripheral.

FIG. 10 is a flow chart showing an example of the reading operation change control of MFP 10 by "Control 1a".

In MFP 10, when an original document is set on scanner section 22a, the type of output is selected on operation section 18, and CPU 11 receives start instruction (depression of START BUTTON) (step S201), CPU 11 operates scanner section 22a so as to initiate the reading operation to read the original document (step S202 (initiation of reading operation)). Selectable types of output are printing (copying), internal storage (scan to box (hard disc drive)), transfer to an external device, and the like.

In case of printing (copying), the type of toner can be selected. Here, the printing operation is described by a case in which normal toner is selected. In case of transfer to an external device, as the types of transfer operation, facsimile transmission, scan to e-mail, scan to SMB (server message block), scan to FTP P (file transfer protocol), scan to USB, scan to print (printing by another MFP 10), and the like, are designated.

As shown in FIGS. 5 and 6, CPU 11 controls scanning section 22 to scan and read the original document to obtain the first and second image data, and stores the first image data temporarily into a first prescribed memory area in RAM 14 and stores the second image data temporarily into a second prescribed memory area in RAM 14 (steps S202 to S204: NO). When CPU 11 obtains the first and second image data of a prescribed area of original document (first line of the image of the original document, or a prescribed plural number of lines, from the first line, of the original document) (step S204: YES), CPU 11 compares the first and second image data (step S205). If CPU 11 determines that normal toner has been used in the image (step S205: YES), CPU 11 changes the operation of scanning section 22 to the operation in which only the first image data of the original document is obtained and light source 36 for reading is not activated (steps S206 to S207: NO (refer to FIG. 8)). When original document reading operation is completed (step S207: YES), CPU 11 carries out the output operation according to the type of output.

If the selected type of output is to be printed (step S208: PRINT), the read image data of the original document (the first image data) is printed out on a recording medium with normal toner via printer section 23 (step S209), and the original document reading and output operations are completed (END). If the selected type of output is to store the image data internally (step S208: STORE INTERNALLY), then the read image of the original document (the first image data) is stored into hard disc device 16 (step S210), and the original document reading and output operations are completed (END). If the selected type of output is to transfer the image data to an external device (step S208: TRANSFER TO EXTERNAL DEVICE), the read image of the original document (the first image data) is transferred to the external device (step S211), and the original document reading and output operations are completed (END).

If CPU 11 determines that color-changing toner has been used in the image of the original document based on comparison of the first and second image data obtained by scanning and reading the original document (step S205: NO), CPU 11 carries out operation change control for color-changing toner in subroutine (step S212).

Figure 11:
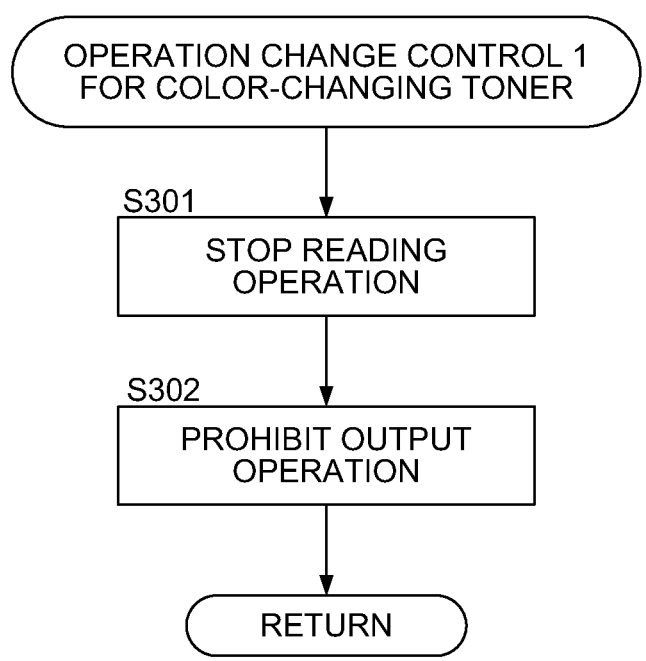
FIG. 11 is a flow chart showing an example of a first pattern of the subroutine for operation change control (Step S212) for color-changing toner in FIG. 10.

FIG. 11 is a flow chart showing an example of a first pattern of the subroutine for operation change control (Step S212) for color-changing toner in FIG. 10. This subroutine corresponds to the above described "Control 3*c* ".

In this subroutine, CPU 11 terminates the reading operation by scanner section 22 (step S301) and prohibits output operation (step S302), after which the process returns to the main routine (RETURN of FIG. 11 to END of FIG. 10). In this case, the reading operation is finished at the point when the prescribed area of original document has been read through.

Figure 12:
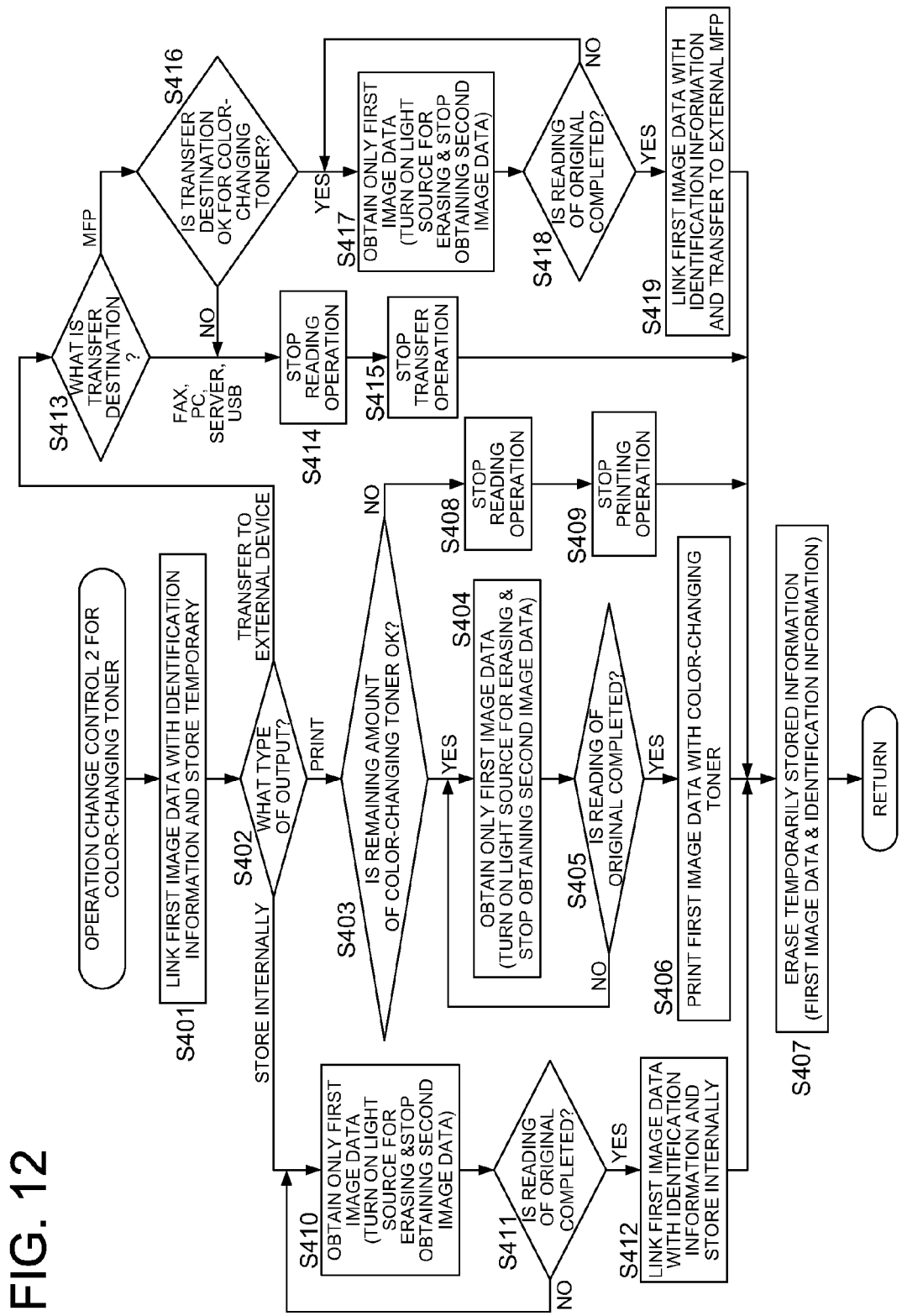
FIG. 12 is a flow chart showing an example of a second pattern of the subroutine for operation change control (Step S212) for color-changing toner in FIG. 10.

FIG. 12 is a flow chart showing an example of a second pattern of the subroutine for operation change control (Step S212) for color-changing toner in FIG. 10. This subroutine corresponds to the above described "Control 1*a*", "Controls 2*a* to 2*c*", and "Control 3*c* ".

In the main routine, CPU 11 memorizes the first image data, which has been temporarily stored into the first prescribed memory area of RAM 14, together with identification information (step S401). If the selected type of output is a printing (step S402: PRINT), CPU 11 checks the remaining amount of color-changing toner via color-changing toner remaining amount detection section 26 (step S403). If the remaining amount of color-changing toner is more than the prescribed amount (step S403: YES), CPU 11 changes the operation of scanning section 22 to the operation in which only the first image data of the original document is obtained and light source 36 for reading is turned on to erase the image data (steps S404 to S404: NO (refer to FIG. 7)), and completes the original document reading operation (step S405: YES).

When the original document reading operation is completed, CPU 11 prints out the read image of the original document (the first image data) on a recording medium with color-changing toner via printer section 23 (step S406). When printing is completed, CPU 11 erases the first image data and identification information (step S407), which have been temporarily stored in RAM 14, and the process returns to the main routine (RETURN in FIG. 12 to END in FIG. 10).

If the remaining amount of color-changing toner is not more than the prescribed amount (step S403: NO), CPU 11 terminates the original document reading operation via scanner section 22 (step S408) and prohibits the printing operation via printer section 23 (step S408). Then, CPU 11 erases the first image data and identification information (step S407), which have been temporarily stored in RAM 14, and the process returns to the main routine (RETURN in FIG. 12 to END in FIG. 10).

If the selected type of output is to store the image data internally (step S402: STORE INTERNALLY), then CPU 11 changes the operation of scanning section 22 to the operation in which only the first image data of the original document is obtained and light source 36 for reading is turned on to erase the image data (steps S410 to S411: NO (refer to FIG. 7)). When the original document reading is completed, CPU 11 stores the first image data into hard disc device 16 by linking with identification information (step S412). When storing of the first image data and identification information is completed, CPU 11 erases the first image data and identification information, which have been temporarily stored in RAM 14 (step S407), and the process returns to the main routine (RETURN in FIG. 12 to END in FIG. 10).

If the selected type of output is to transfer the image data to an external device (step S402: TRANSFER TO EXTERNAL DEVICE) and if the transfer destination is other than another MFP 10, in other words, such as facsimile transmission, scan to e-mail, scan to SMB (PC), scan to HP (server), scan to USB, and the like (step S413: FAX or other devices), CPU 11 terminates the original document reading operation via scanner section 22 (step S414) and prohibits transfer operation via facsimile communication section 19, network communication section 20*m* and connection section 24 (step S415). CPU 11 erases the first image data and identification information, which have been temporarily stored in RAM 14 (step S407), and the process returns to the main routine (RETURN in FIG. 12 to END in FIG. 10).

If the selected type of output is to transfer the image data to an external device (step S402: TRANSFER TO EXTERNAL DEVICE) and if the transfer destination is another MFP 10 (step S413: MFP), CPU 11 checks the transfer destination of the multi-function peripheral whether printing with color-changing toner is possible (step S416). If CPU 11 receives the response that the printing in not possible (step S416: NO), then CPU 11 terminates the original document reading operation via scanner section 22 (step S414), and prohibits transfer operation via network communication section 20 (step 415). Then, CPU 11 erases the first image data and identification information, which have been temporarily stored in RAM 14 (step S407), and the process returns to the main routine (RETURN in FIG. 12 to END in FIG. 10).

If CPU 11 receives the response that the transfer destination is capable of printing with the toner (step S416: YES), then CPU 11 changes the operation of scanning section 22 to the operation in which only the first image data of the original document is obtained and light source 36 for reading is turned on to erase the image data (steps S417 to S418: NO (refer to FIG. 7)) and completes the original document reading operation (step S418: YES). When the original document reading is completed, CPU 11 transfers the read image data (the first image data) and the linked identification information to the transfer destination of multi-function peripheral via network communication section 20 (step S419). When the transfer operation is completed, CPU 11 erases the first image data and identification information, which have been temporarily stored in RAM 14 (step S407), and the process returns to the main routine (RETURN in FIG. 12 to END in FIG. 10).

When MFP 10 of the transfer destination receives the image data (the read image data) and identification information, MFP 10 of the transfer destination selects color-changing toner because of the existence of identification information, and prints out the received image on a recording medium with color-changing toner.

In the printing of the image data (the read image) with color-changing toner at MFP 10 (including the transfer destination), a dummy image may be printed at least either in an upper edge area (an upper end area) or in a lower edge area (a lower end area) of the recording medium. It is preferable to print the dummy image in an upper edge area, but it is more preferable to print the dummy image in both an upper and a lower edge area.

Figure 13:
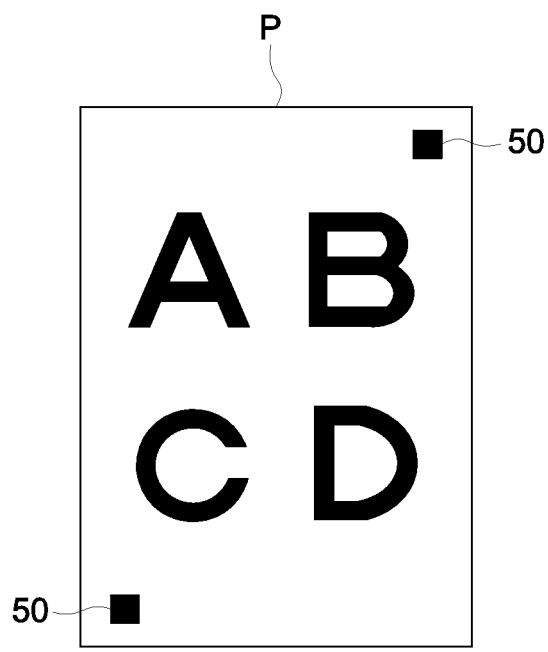
FIG. 13 is a diagram schematically showing an example of a case in which a dummy image has been printed with color-changing toner in the upper edge and lower edge of a recording medium.

FIG. 13 is a diagram schematically showing an example of a case in which the dummy image has been printed with color-changing toner in an upper and a lower edge area of recording medium P. In this example, dummy image 50 is printed in the vicinity of the upper right corner and the lower left corner of recording medium P.

The dummy image is printed compulsorily. Or, whether or not the dummy image is printed compulsorily may be chosen by an initial setting (namely, administrator setting) or a sequential selection (namely, user selection). Furthermore, shape, type, position, quantity, and the like, of the dummy image may be selected from prescribed plural kinds of choices in the initial setting or sequential selection. If that recording medium is to be copied by MFP 10 as an original document, CPU 11 determines whether color-changing toner has been used or not by comparing first and second image data which were obtained by reading the dummy image, without reading the content of the recording medium. In this case, the operation change control, as shown in FIG. 11 or FIG. 12, is carried out.

Figure 14:
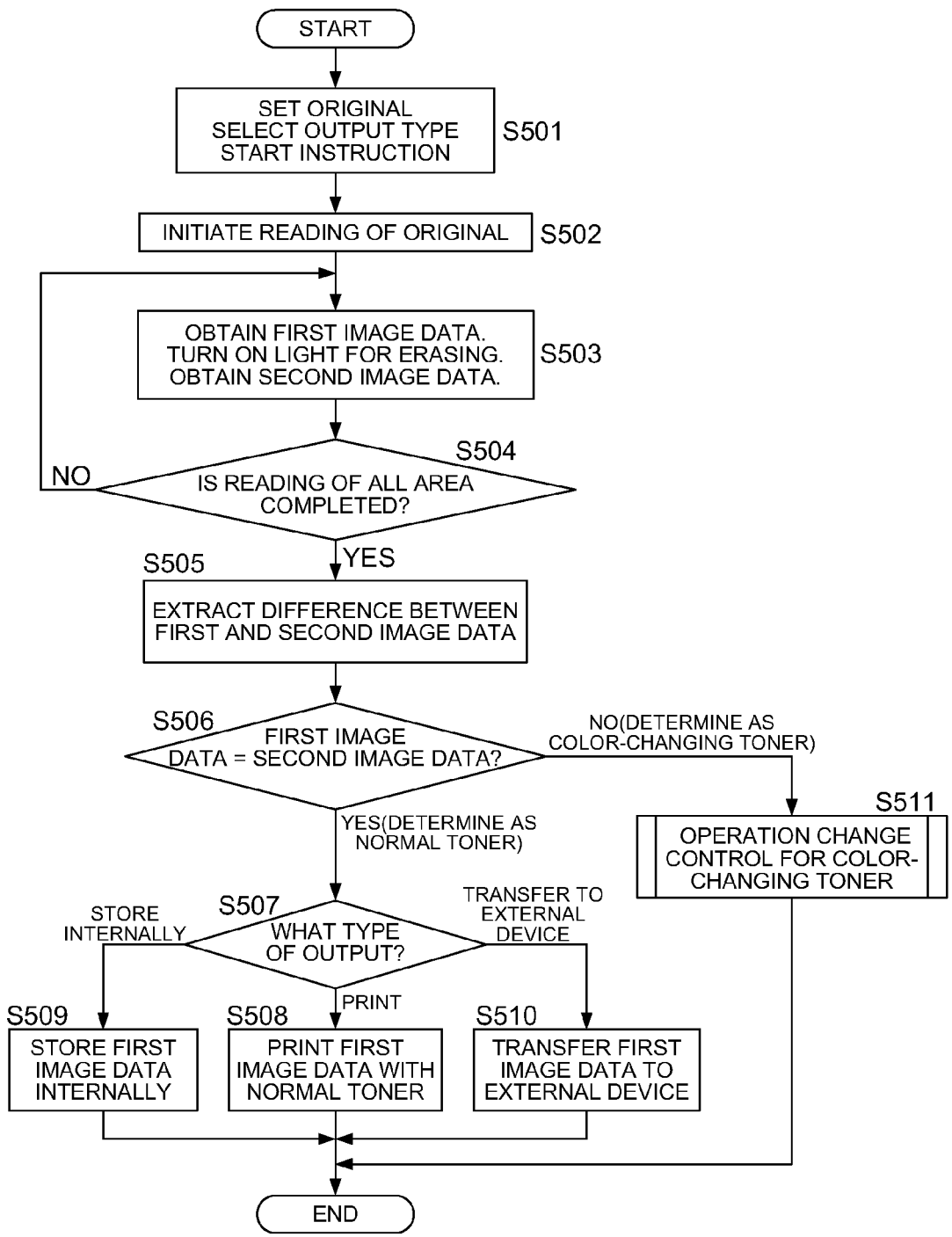
FIG. 14 is a flow chart showing an example of a case of control in which the mixture of normal toner and color-changing toner is determined by reading all the area of the image of the original document.

FIG. 14 is a flow chart showing an example of a case of control in which the mixture of normal toner and color-changing toner is determined by reading all the areas of the image of the original document.

As an overview of the flow has been described by using FIGS. 9a to 9d, the determination on the mixture of normal toner and color-changing toner and determination on each toner area is carried out by extracting the difference between the first image data and second image data which were obtained by reading all of the image areas of the original document and comparing the different portions of the image data. In this comparison, there are: (1) the case in which the first and second image data are identical (only normal toner has been used) as shown in FIG. 9b; (2) the case in which the first image data is identical to the different portion of the image data (only color-changing toner has been used) as shown in FIG. 9c; and (3) the case in which the first image data is not identical to either one of them (a mixture of the toners, namely, both toners have been used) as shown in FIG. 9d.

After the determination based on the comparison, in the case in which the read image of the original document is to be outputted (stored internally, printed, stored externally), if the first image data is identical to the second image data or identical to the different portions of the image data, either one of the identical image data may be printed out. In this embodiment, the first image data is printed out preferentially (as the read image of the original document). As a substitute for the first image data, it may be controlled that either the second image data or the different portions of the image data, both of which are identical to the first image data, is printed out Also, in the case in which both normal toner and color-changing toner have been used, it is so controlled that both the second image data, which corresponds to normal toner, and the different portions of the image data, the different portions which corresponds to color-changing toner, are printed out as the read image of the original document.

In MFP 10, when an original document is set on scanner section 22, the type of output is selected in operation section 18, and CPU 11 receives start instruction (depression of START BUTTON) (step S501), CPU 11 operates scanner section 22 so as to initiate the reading operation to read the original document (step S502 (initiation of reading operation)).

CPU 11 controls scanning section 22 to scan and read the original document to obtain the first and second image data, and stores the first image data temporarily into the first prescribed memory area in RAM 14 and stores the second image data temporarily into the second prescribed memory area in RAM 14 (steps S503 to S504: NO). When CPU 11 obtains the first and second image data of all the areas of original document (step S504: YES (the reading operation is completed), CPU 11 extracts the different portions of the first and second image data, and temporarily stores them into a third prescribed image area of RAM 14 (step S505). If CPU 11 determined, based on the comparison of the first and second image data, that the first and second image data are identical in all the areas of the original document, and only normal toner has been used in the image of the original document (step S506: YES (in case of FIG. 9b)), CPU 11 carries out output operation according to the determined type of output.

If the selected type of output is to be printed (step S507: PRINT), the first image data is printed out, as the read image data of original document, on a recording medium with normal toner via printer section 23 (step S508), and the original document reading and output operations are completed (END). If the selected type of output is to store the image data internally (step S507: STORE INTERNALLY), then the first image data is stored, as the read image of the original document, on hard disc device 16 (step S509), and the original document reading and output operations are completed (END). If the selected type of output is to transfer the image data to an external device (step S507: TRANSFER TO EXTERNAL DEVICE), the first image data is transferred, as the read image of the original document, to the external device (step S510), and the original document reading and output operations are completed (END).

If CPU 11 determines that color-changing tone has been used in the image of the original document based on the comparison of the first and second image data and the result of comparison is that the image data are not identical (step S506: NO (also, refer to FIGS. 9c and 9d)), CPU 11 carries out operation change control in the subroutine illustrated in FIG. 15 (step S511).

Figure 15:
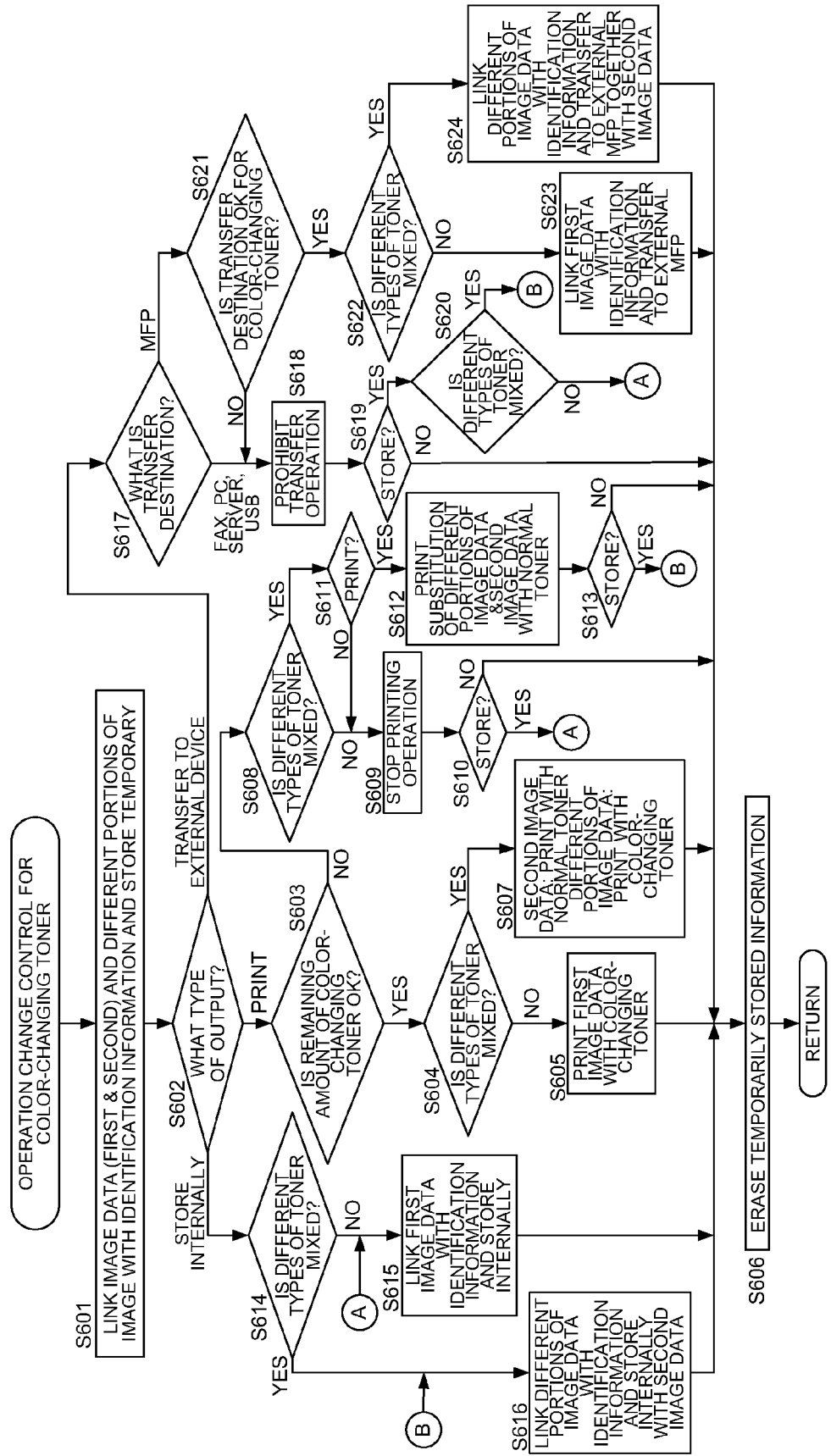
FIG. 15 is a flow chart showing an example of a subroutine for operation change control (Step S511) for color-changing toner in FIG. 14.

FIG. 15 is a flow chart showing an example of the subroutine for operation change control (Step S511) for color-changing toner in FIG. 14. This subroutine corresponds to the above described "Controls 2a, 2b, 2c", "Controls 3a", and "Control 3c".

In this subroutine, CPU 11 memorizes the first and second image data and the different portions of the image data, all of which have been temporarily stored in RAM 14, by linking with identification information (step S601).

If the selected type of output is to be stored internally (step S602: STORE INTERNALLY), and if only color-changing toner has been used in the image of the original document (step S614: NO (in the case of FIG. 9c), then CPU 11 stores the first image data as the read image data of the original document on hard disc device 16 by linking them together with identification information (step S615). When the storing of the first image data and identification information is completed, CPU 11 erases the first and second image data, the different portions of the image data, and identification information, all of which have been temporarily stored in RAM 14 (step S606), and the process returns to the main routine (RETURN in FIG. 15 to END in FIG. 14).

If the selected type of output is to be stored internally (step S602: STORE INTERNALLY), and if both normal toner and color-changing toner have been used in printing the image of the original document (step S614: YES (in the case of FIG. 9d), then CPU 11 stores the second image data and different portions of the image data, as the read image data of the original document, on hard disc device 16 by linking together with identification information (step S616). When the storing of the image data and identification information is completed, CPU 11 erases the first and second image data, the different portions of the image data, and identification information, all of which have been temporarily stored in RAM 14 (step S606), and the process returns to the main routine (RETURN in FIG. 15 to END in FIG. 14).

If the selected type of output is to be printed (step S602: PRINT), CPU 11 checks the remaining amount of color-changing toner via color-changing toner remaining amount detection section 26 (step S603). If the remaining amount of color-changing toner is more than the prescribed amount (step S603: YES), CPU 11 carries out printing with color-changing toner.

If only color-changing toner has been used in the image of the original document (step S604: NO (also, refer to FIG. 9c), CPU 11 prints out the first image data, as the read image date of the original document, on recording medium with color-changing toner via printer section 23 (step S605). When printing is completed, CPU 11 erases the first and second image data, the different portions of the image data, and identification information, all of which have been temporarily stored in RAM 14 (step S606), and the process returns to the main routine (RETURN in FIG. 15 to END in FIG. 14).

If both normal toner and color-changing toner have been used in the image of the original document (step S604: YES (also, refer to FIG. 9d), CPU 11 prints out the second image data and the different portions of the image data, as the read image date of the original document, on recording medium with normal toner for the second image data and with color-changing toner for the different portions of the image data via printer section 23 (step S607). When printing is completed, CPU 11 erases the first and second image data, the different portions of the image data, and identification information, all of which have been temporarily stored in RAM 14 (step S606), and the process returns to the main routine (RETURN in FIG. 15 to END in FIG. 14).

If the remaining amount of color-changing toner is not more than the prescribed amount (step S603: NO), and if only color-changing toner has been used in the image of the original document (step S608: NO), CPU 11 prohibits the printing operation via printer section 23 (step S609), and displays a storage confirmation screen on display section 17 to confirm whether the user will store the read image data inside MFP 10 or not (step S610). If CPU 11 receives instruction that the read image data is not to be stored (step S610: NO), CPU 11 erases the first and second image data, the different portions of the image data, and identification information, all of which have been temporarily stored in RAM 14 (step S606), and the process returns to the main routine (RETURN in FIG. 15 to END in FIG. 14). If CPU 11 receives instruction that the read image data is to be stored (step S610: YES), the process advances to step S615.

If the remaining amount of color-changing toner is not more than the prescribed amount (step S603: NO), and if both normal toner and color-changing toner have been used in the image of the original document (step S608: YES), CPU 11 displays a print confirmation screen on display section 17 to confirm whether the user prints out the read image data (step S611). If CPU 11 receives instruction that the read image data is not to be printed out (step S611: NO), the process advances to step S610. If CPU 11 receives instruction that the read image data is to be printed out (step S611: YES), CPU 11 substitutes the different portions of the image data with a prescribed image data, and prints out the prescribed image data and the second image data with normal toner on a recording medium via printer section 23 (step S612).

FIG. 16 is a diagram schematically showing an example of a case in which the image area of color-changing toner is substituted by a prescribed image data when original document is copied. Examples of the prescribed image data are blank image, shaded image, attention-seeking mark, and attention-seeking text information, and the like.

If CPU 11 receives instruction that the read image data is to be printed, CPU 11 displays a print confirmation screen on display section 17 to confirm whether the user stores the read image data of original document inside MFP 10 (step S613). If CPU 11 receives instruction that the read image data is not to be stored (step S613: NO), CPU 11 erases the first and second image data, the different portions of the image data, and identification information, all of which have been temporarily stored in RAM 14 (step S606), and the process returns to the main routine (RETURN in FIG. 15 to END in FIG. 14). If CPU 11 receives instruction that the read image data is to be stored (step S613: YES), the process advances to step S616.

If the selected type of output is to be transferred to an external device (step S602: TRANSFER TO EXTERNAL DEVICE) and if the transfer destination is other than another MFP 10 (step S617: FAX or other devices), CPU 11 prohibits the transfer operation (step S618), and displays a storage confirmation screen on display section 17 to confirm whether the user stores the read image data inside MFP 10 or not (step S619). If CPU 11 receives instruction that the read image data is not to be stored inside MFP 10 (step S619: NO), CPU 11 erases the first and second image data, the different portions of the image data, and identification information, all of which have been temporarily stored in RAM 14 (step S606), and the process returns to the main routine (RETURN in FIG. 15 to END in FIG. 14). If CPU 11 receives instruction that the read image data is to be stored (step S619: YES) and if only color-changing toner has been used in the image of the original document (step S620: NO), the process advances to step S615. If CPU 11 receives instruction that the read image data is to be stored (step S619: YES) and if both normal toner and color-changing toner have been used in the image of the original document (step S620: NO), the process advances to step S616.

If the selected type of output is to be transferred to an external device (step S602: TRANSFER TO EXTERNAL DEVICE) and the transfer destination is another MFP 10 (step S617: MFP), CPU 11 checks another MFP 10 of the transfer destination whether the other MFP 10 is capable of printing with color-changing toner (step S621).

If CPU 11 receives a response that another MFP 10 is not capable of printing with color-changing toner (step S621: NO), the process advances to step S618. If CPU 11 receives a response that the other MFP 10 is capable of printing with color-changing toner (step S621: YES) and if only color-changing toner has been used in the image of the original document (step S622: NO), CPU 11 transfers the first image data, as the read image data of the original document, together with identification information to the other MFP 10 of the transfer destination (step S623). After the completion of the transfer, CPU 11 erases the first and second image data, the different portions of the image data, and identification information, all of which have been temporarily stored in RAM 14 (step S606), and the process returns to the main routine (RETURN in FIG. 15 to END in FIG. 14).

If CPU 11 receives a response that another MFP 10 is capable of printing with color-changing toner (step S621: YES) and if both normal toner and color-changing toner have been used in the image of the original document (step S622: YES), CPU 11 transfers the second image data and the different portions of the image data, as the read image data of the original document, together with identification information, the identification information which is linked with the different portions of the image data, to the other MFP 10 of the transfer destination (step S624). After the completion of transfer, CPU 11 erases the first and second image data, the different portions of the image data, and identification information, all of which have been temporarily stored in RAM 14 (step S606), and the process returns to the main routine (RETURN in FIG. 15 to END in FIG. 14).

In the case in which MFP 10 of the transfer destination receives one image data (the first image data) and identification information, MFP 10 of the transfer destination selects color-changing toner because of the existence of identification information, and prints out the received image on a recording medium with color-changing toner. In the case in which MFP 10 of the transfer destination receives two image data (the second image data and the different portions of the image data) and identification information, MFP 10 of the transfer destination prints out the image data which is not linked with identification information (that is, the second image data) with normal toner, and prints out the image data which is linked with identification information (that is, the different portions of the image data) with color-changing toner on a recording medium (namely, within one sheet of recording medium).

Figure 17:
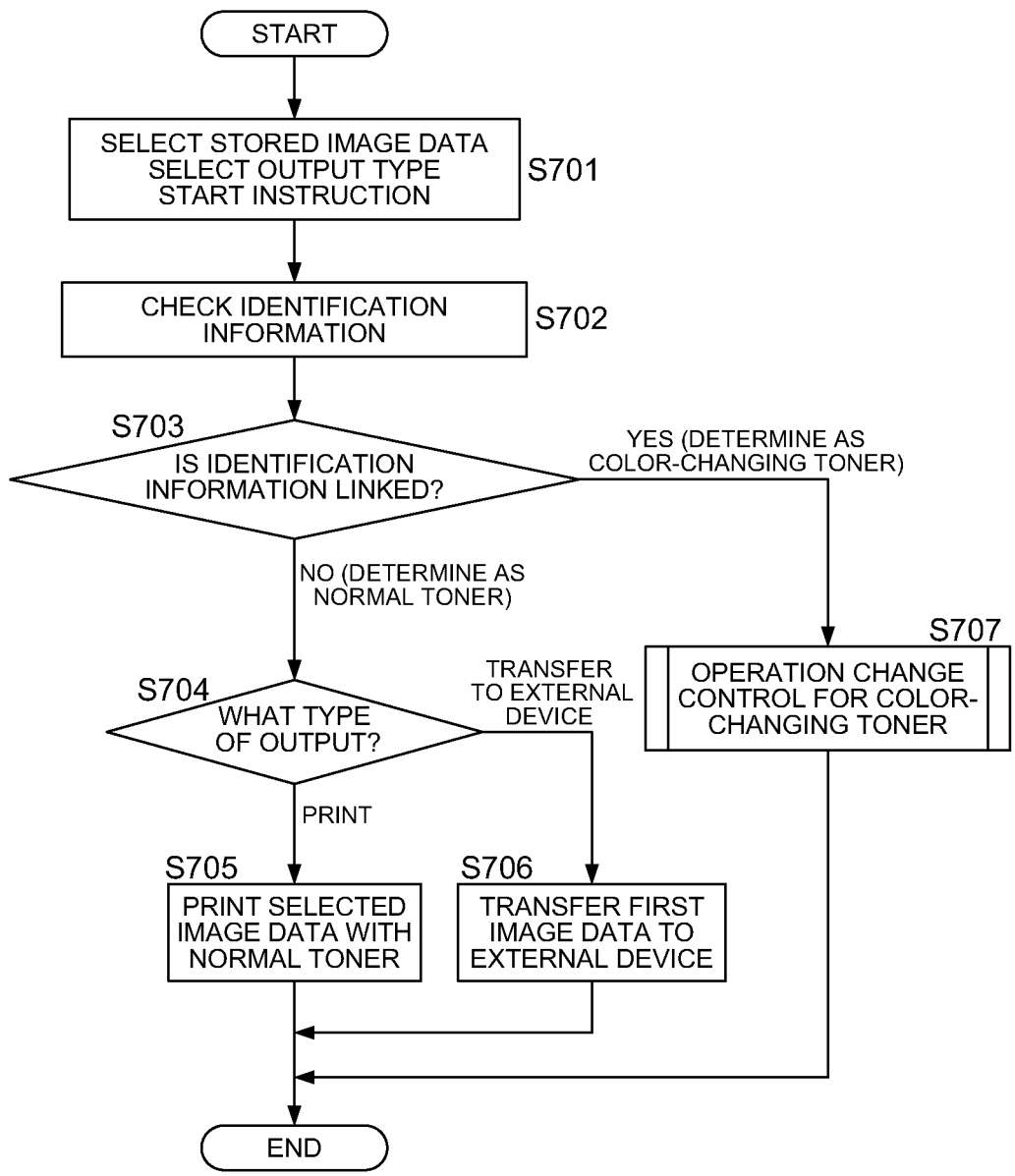
FIG. 17 is a flow chart showing an example of control when an image stored in the multi-function peripheral is outputted.
Figure 18:
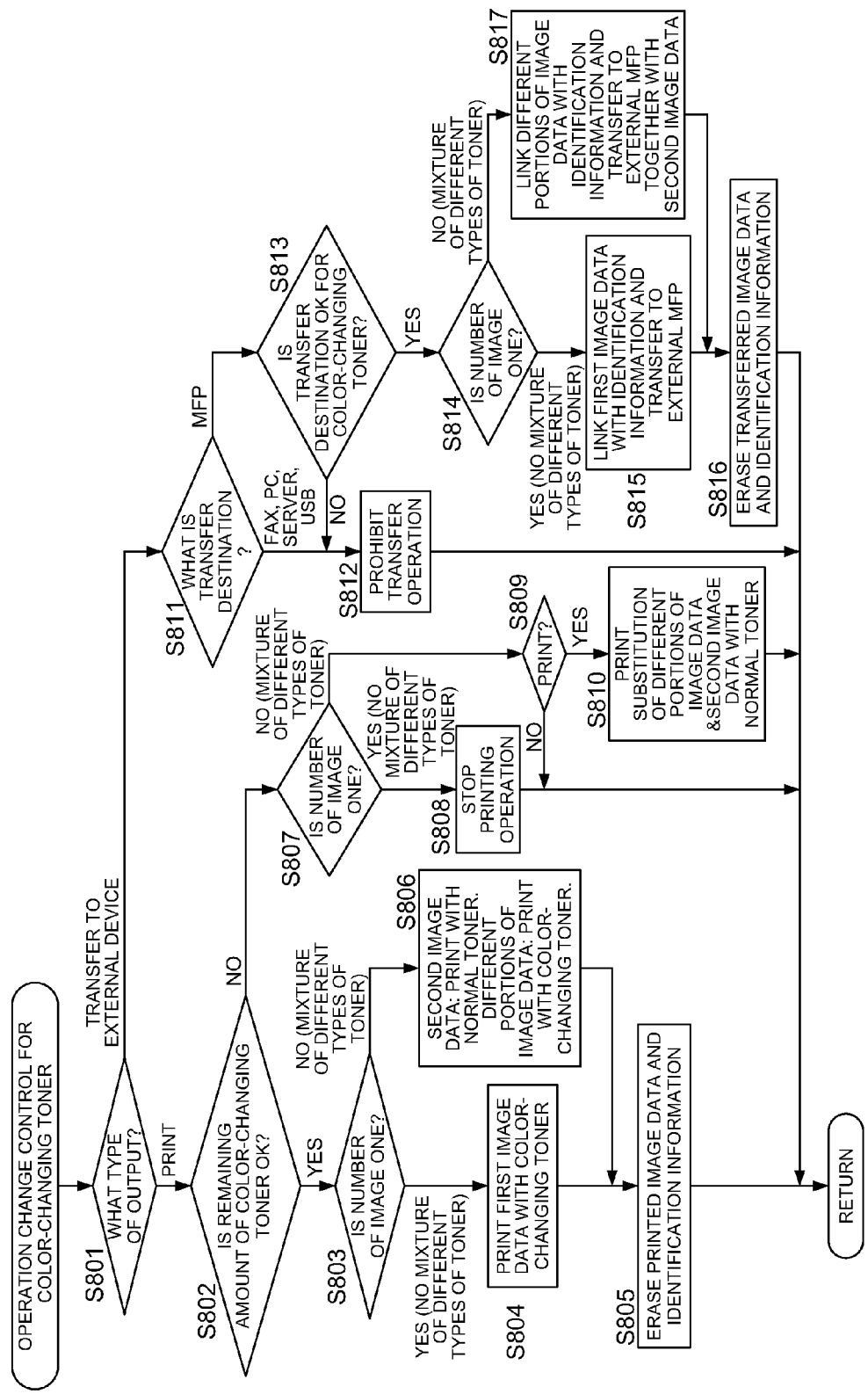
FIG. 18 is a flow chart showing an example of a second pattern of the subroutine for operation change control (Step S707) for color-changing toner in FIG. 17.

FIGS. 17 and 18 each of which is a flow chart showing an example of control when an image stored in MFP 10 is outputted. The control of outputting each image data which has been stored at step S210 in FIG. 10, step S412 in FIG. 12, step S508 in FIG. 14, and steps S615 and S616 in FIG. 15 is collectively shown in FIGS. 17 and 18, and the control will be explained collectively.

In MFP 10, when a stored image, which is to be printed, is selected, the type of output is selected, and CPU 11 receives start instructions (depression of START BUTTON) via display section 17 and operation section 18 (step S701), CPU 11 checks whether the stored image is linked with identification information (step S702). If identification information is not linked (step S703: NO (that is, it was determined during the reading operation of original document that normal toner has been used), CPU 11 carries out output operation according to the type of determined output.

If the selected type of output is to be printed (step S704: PRINT), the stored image data which has been selected is printed on a recording medium with normal toner via printer section 23 (step S705), and the output operations is completed (END). If the selected type of output is to transfer the stored image data to an external device (step S704: TRANSFER TO EXTERNAL DEVICE), CPU 11 transfers the stored image to the external device (step S706), and finishes the output operation for the stored image data (END).

In the case in which the stored image data is linked with identification information (step S703: YES (that is, it was determined during the reading operation that color-changing toner has been used)), CPU 11 carries out the operation change control in the subroutine for color-changing toner shown in FIG. 18 (step S707).

FIG. 18 is a flow chart showing an example of a second pattern of the subroutine for the operation change control (Step S707) for color-changing toner in FIG. 17.

If the selected type of output is to be printed (step S801: PRINT), CPU 11 checks the remaining amount of color-changing toner via color-changing toner remaining amount detection section 26 (step S802). If the remaining amount of color-changing toner is more than the prescribed amount (step S802: YES), CPU 11 carries out printing with color-changing toner.

In the case in which the stored image data is one image data (step S803: YES (no mixture of different types of toner, namely, it was determined during the reading operation that only color-changing toner has been used), CPU 11 prints out the stored image data which has been selected (the first image data as the read image data of the original document) with color-changing toner on a recording medium via printer section 23 (step S804). After the completion of the printing operation, CPU 11 erases the image data and identification information stored on hard disc device 16 (step S805), and the process returns to the main routine (RETURN in FIG. 18 to END in FIG. 17).

In the case in which the stored image data is two image data (step S803: NO (a mixture of different types of toner, namely, it was determined during the reading operation that both normal toner and color-changing toner have been used), CPU 11 prints out the stored image data which has been selected (the second image data and the different portions of the image data as the read image data of the original document), via printer section 23, with normal toner for the image data which is not linked with identification information (that is, the second image data), and with color-changing toner for the image data which is linked with identification information (that is, the different portions of the image data) on one recording medium (namely, within one sheet of recording medium) (step S806). After the completion of the printing operation, CPU 11 erases the two stored image data and identification information stored on hard disc device 16 (step S805), and the process returns to the main routine (RETURN in FIG. 18 to END in FIG. 17).

In the case in which the remaining amount of color-changing toner is not more than a prescribed amount (step S802: NO) and if the number of stored image data is one (step S807: YES (No mixture of different types of toner, that is, it was determined during the reading operation that only color-changing toner has been used)), CPU 11 prohibits the printing operation via printer section 23 (step S808), and the process returns to the main routine (RETURN in FIG. 18 to END in FIG. 17).

In a case in which the remaining amount of color-changing toner is not more than the prescribed amount (step S802: NO) and if the number of stored image data is two (step S807: NO (a mixture of different types of toner, that is, it was determined during the reading operation that both normal toner and color-changing toner have been used)), CPU 11 displays a print confirmation screen on display section 17 to confirm whether the user will print the stored image data (step S809). If CPU 11 receives instruction that the stored image data is not to be printed (step S809: NO), the process returns to the main routine (RETURN in FIG. 18 to END in FIG. 17). If CPU 11 receives instruction that the stored image data is to be printed out (step S809: YES), CPU 11 substitutes the different portions of the image data with the prescribed image data, and prints the prescribed image data and the second image data with normal toner on recording medium via printer section 23 (step S810), and the process returns to the main routine (RETURN in FIG. 18 to END in FIG. 17).

If the selected type of output is to transfer the image data to an external device (step S801: TRANSFER TO EXTERNAL DEVICE) and if the transfer destination is other than another MFP 10 (step S811: FAX or other devices), CPU 11 prohibits the transfer operation (step S812), and the process returns to the main routine (RETURN in FIG. 18 to END in FIG. 17).

If the selected type of output is to be transferred to an external device (step S801: TRANSFER TO EXTERNAL DEVICE) and the transfer destination is another MFP 10 (step S811: MFP), CPU 11 asks the other MFP 10 of the transfer destination whether the other MFP 10 is capable of printing with color-changing toner (step S813). If CPU 11 receives a response that the other MFP 10 is not capable of printing with color-changing toner (step S813: NO), CPU 11 prohibits the transfer operation (step S812), and the process returns to the main routine (RETURN in FIG. 18 to END in FIG. 17).

If CPU 11 receives a response that the other MFP 10 is capable of printing with color-changing toner (step S813: YES) and if the number of the stored image data is one (step S814: YES (No mixture of different types of toner, that is, it was determined during the reading operation that only color-changing toner has been used)), CPU 11 transfers the stored image data which has been selected (the first image data stored as the read image data of the original document) by linking together with identification information to the other MFP 10 of the transfer destination (step S815). After the completion of the transfer operation, CPU 11 erases the image data and identification information stored on hard disc device 16 (step S816), and the process returns to the main routine (RETURN in FIG. 18 to END in FIG. 17).

If CPU 11 receives a response that the other MFP 10 is capable of printing with color-changing toner (step S813: YES) and if the number of the stored image data is two (step S814: NO (a mixture of different types of toner, that is, it was determined during the reading operation that both normal toner and color-changing toner have been used)), CPU 11 links the different portions of the image data, which is one of the two selected stored image data (the second image data and the different portions of image data stored as the read image data of the original document) and the different portions of the image data has been originally linked with identification information, with that identification information, and transfers together with the second image data to the other MFP 10 of the transfer destination (step S817). After the completion of the transfer operation, CPU 11 erases the two image data and identification information stored on hard disc device 16 (step S816), and the process returns to the main routine (RETURN in FIG. 18 to END in FIG. 17). In this case, the other MFP 10 of the transfer destination carries out the printing operation which is illustrated in the flowchart in FIG. 15.

(Examples of Modification of Scanner Section)

Figure 19:
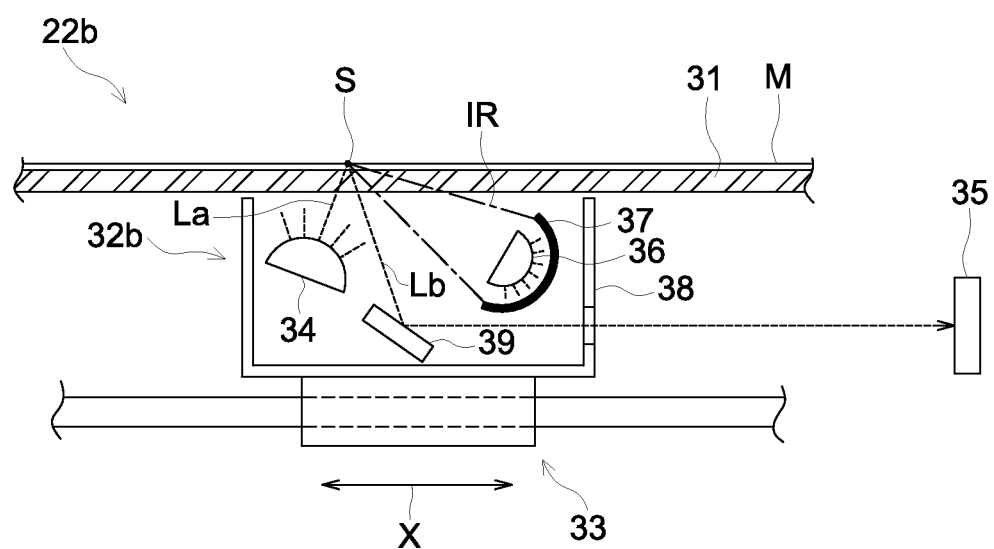
FIG. 19 is a diagram schematically showing an example of modification example 1 of the scanner section equipped in the multi-function peripheral.
Figure 20:
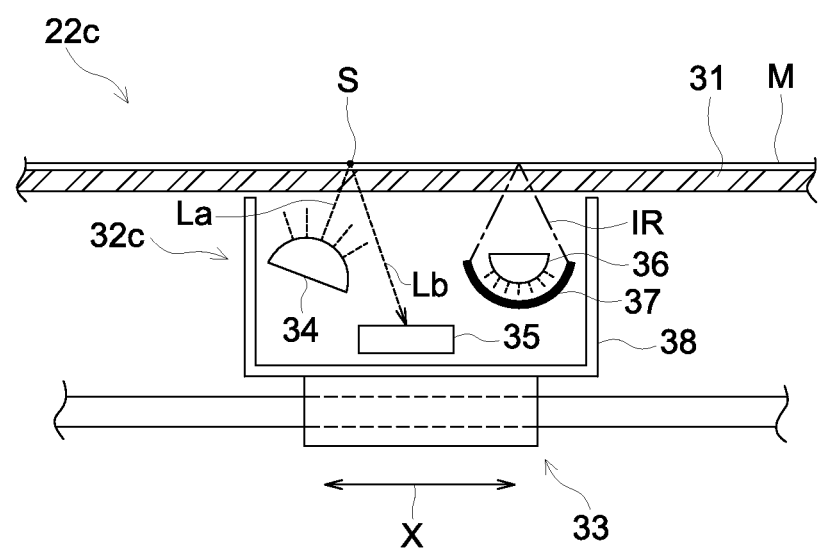
FIG. 20 is a diagram schematically showing an example of modification example 2 of the scanner section equipped in the multi-function peripheral.
Figure 21:
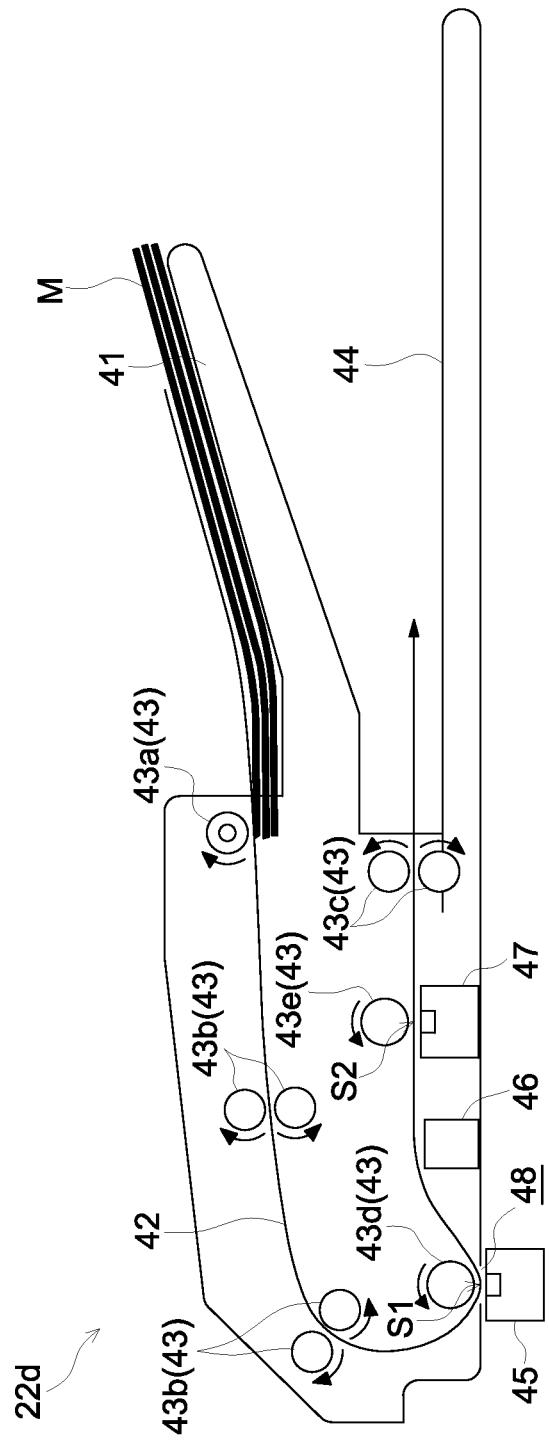
FIG. 21 is a diagram schematically showing an example of modification example 3 of the scanner section equipped in the multi-function peripheral.

3 modification examples of scanner section 22 of MFP 10 as illustrated in FIGS. 19 to 21.

Scanner section 22b, according to modification example 1 shown in FIG. 19, is different from scanner 22a illustrated in FIG. 2a in the configuration of reading section 32b. In reading section 32b in scanner section 22b, line image sensor 35 is placed laterally to holding member 38, not within holding member 38. Line image sensor 35 is fixed, for example, but is not limited to, to a frame, and the like, within scanner section 22b and placed laterally to holding member 38. In holding member 38, mirror 39, which brings reflected light Lb from original document M to line image sensor 35, is placed, replacing line image sensor 35.

Scanner section 22b according to modification example 1 is so configured, similar to scanner section 22a shown in FIG. 2a, that scanner section 22b is capable of applying illuminating light La and light IR of the specific wavelength onto reading area S to be read by line image sensor 35, without moving reading section 32a. Namely, light source 34 for reading and light source 36 for erasing, provided in reading section 32a, are so arranged that illuminating light La and light IR of the specific wavelength are irradiated onto the same scanning line on original document M set on platen 31. Furthermore, similar to scanner section 22a, scanner section 22b is so configured that scanner section 22b is capable of obtaining the first image data and the second image data of all the areas of original document M by either a one time scan-reading operation or a scan-reading operation divided into 2 times. MFP 10, which is provided with scanner section 22b, is capable of carrying out the same operation change control which MFP 10, provided with scanner section 22a, carries out (Refer to FIGS. 10 to 18).

Scanner section 22c, according to modification example 2 shown in FIG. 20, is different from scanner section 22a shown in FIG. 2a in placement of light source 36 for erasing and reflection plate 37 in reading section 32c. Reading section 32c in scanner section 22c is so configured that light IR of the specific wavelength from light source 36 for erasing is irradiated onto a different position from reading area S which is to be read by line image sensor 35. In the configuration according to this modification example, it is not necessary to adjust light source 36 for erasing so that the light from light source 36 irradiates onto reading area S, thus facilitating the component mounting accuracy at the time of assembly.

In MFP 10, equipped with scanner section 22c, the first and second image data are obtained by a two-time scan-reading operation by a reciprocated movement of reading section 32c. In the example shown in FIG. 20, the first image data is obtained via first scan-reading operation by turning on light source 34 for reading and moving the light source in the direction from right to left of the figure. Then, the second image data can be obtained via second scan-reading operation by turning on both light source 36 for erasing and light source 34 for reading, and moving scanner section 32c in the direction from left to right of the figure.

In the case in which the determination of whether color-changing toner has been used in the image of an original document is determined by a partial image area of the original document, the determination is made at the time when the second image data is obtained from the partial image area after initiating the second scan-reading operation, and the operation change control which is illustrated in FIGS. 10 to 12 can be carried out according to that determination. In the case in which the determination is made by all of the image areas of the original document, the determination is made by obtaining the second image data of all of the image areas via the second scan-reading operation, and the operation change control which is illustrated in FIGS. 14 and 15 can be carried out according to the determination. Also, for both cases described above, the output control according to the stored image data inside MFP 10, which is illustrated in FIGS. 16 and 17, can be carried out.

Scanner section 22d according to modification example 3 shown in FIG. 21 is configured as a so-called sheet-through type scanner (original document sheet conveyance type, ADF (auto document feeder) type) in which original document M is automatically conveyed and optically scanned to be read. Scanner section 22d consists of automatic document feeder 41 which is a feeding section of original document M, conveyance path 42 through which original document M is conveyed, conveyance mechanism 43 which conveys original document M through conveyance path 42, document exit tray 44 which is an exit section of original document M, and followings which are disposed in succession from the upstream side along the direction of document conveyance; first reading section 45, light source 46 for erasing, and second reading section 47. First and second reading sections consist of, for example, but are not limited to, a contact image sensor and the like, and equipped with a contact glass, a light source (light source for reading), and a line image sensor.

Conveyance mechanism 43 consists of, for example, but is not limited to, a plurality of rollers to convey original document M, a plurality of motors (not shown) to rotate each of the rollers. The rollers, more specifically, consist of feed-out roller 43a that contacts the upper-most surface of original document feeder Ms stacked on automatic document feeder 41 to feed out the upper-most original document M sheet by sheet by rotation, plural pairs of conveyance rollers 43b that are disposed upstream of first reading section 45 in conveyance path 42 and that the conveyance rollers convey original document M, which has been fed out by feed-out roller 43, by rotatably holding to the position downstream of conveyance path 42, a pair of exit rollers 43c that are disposed downstream of conveyance path 42 and that the exit rollers exit original document M, which has been conveyed by conveyance roller 43b, by rotatably holding onto exit tray 44, first image data reading roller 43d that is disposed in opposite to first reading section 45 and that brings the surface of original document M into close contact with contact lens, of first reading section 45, by rotationally contacting with the rear surface of original document M, second image data reading roller 43c that is disposed opposite to second reading section 47 and that brings the surface of original document M into close contact with contact lens, of second reading section 47, by rotationally contacting with the rear surface of original document M.

First reading section 45 is disposed in a prescribed position in conveyance path 42 and is fixed on the lower side of the bottom plate of scanner section 22d. In the prescribed position in which first reading section 45 is fixed, an opening shape of slit 48 elongating along the direction perpendicular to conveyance path 42 (namely, perpendicular to the conveyance direction of original document M) is formed. First reading section 45 irradiates illuminating light from a built-in light source onto reading area S1 (first image data reading area) of original document M, which is conveyed through conveyance path 42, through slit 48, and reads original document M line by line by receiving reflected light from reading area S1 of original document M via a built-in line image sensor.

Light source 46 for erasing irradiates the light of the specific wavelength (near-infrared) onto original document M which is conveyed through conveyance path 42 after passing through first reading section 45.

Second reading section 47 irradiates illuminating light from a built-in light source onto reading area S2 (second image data reading area) of original document M, which is conveyed through conveyance path 42 after passing through first reading section 45 and light source 46 for erasing, and reads original document M line by line by receiving reflected light from reading area S2 of original document M via a built-in line image sensor.

In MFP 10 equipped with scanner section 22d, the first image data is obtained by reading original document M via first reading section 45, then, original document M, which has passed through first reading section 45, is irradiated by the light of the specific wavelength from light source 46 for erasing, then, the second image data is obtained by reading original document M, which has passed through light source 46 for erasing, via second reading section 47, by the time until original document M, which was stacked on automatic document feeder 41 and conveyed along conveyance path 42 via conveyance mechanism 43, is ejected onto exit tray 44.

In the case in which the determination of whether color-changing toner has been used in an image of the original document is determined by a partial image area of the original document, the determination is made at the timing when original document M reaches second reading section 47 and the second image data is obtained from the partial image area of the original document, and the operation change control which is illustrated in FIGS. 10 to 12 can be carried out according to the determination. In the case in which the determination is made by all of the image areas of original document, the determination is made by passing original document M through second reading section 47, obtaining the second image data of all of the image areas, and completing the reading operation by exiting original document M onto exit tray 44. Then, the operation change control, which is illustrated in FIGS. 14 and 15, can be carried out according to the determination Also, for both cases described above, the output control according to the stored image data inside MFP 10, which is illustrated in FIGS. 16 and 17, can be carried out.

The configuration of scanner section 22 is not limited to the examples of the 4 types of scanner sections 22a to 22d. As an example, but is not limited to, scanner section 22 may be configured by installing reading section 32a, which is shown in FIG. 2, into scanner section 22d, which is a sheet-through type scanner shown in FIG. 21, or scanner section 22 may be configured by installing reading section 32b and corresponding line image sensor 35 into scanner section 22d. In these cases, the scanner section can be configured by replacing first reading section 45 with reading section 32a, or with reading section 32b and line image sensor 35, and deleting light source 46 for erasing and second reading section 47.

In case of the scanner section, a sheet-through type, according to the configuration described above, illuminating light La and light IR of the specific wavelength from reading section 32a (or reading section 32b) can be irradiated onto reading area S to be read by line image sensor 35, namely, onto the same scanning line of original document M which was conveyed through conveyance path 42. Also, the scanner section, a sheet-through type, according to the configuration described above, may be combined with scanner section 22a (or 22b) of a flat-bed type scanner shown in FIG. 2a (or FIG. 19).

As described, in the case of MFP 10, according to this embodiment, if it is determined that color-changing toner has been used in an image of the original document, the output operation is changed by prohibiting or limiting the output of the read image data, and such. If the determination is made by reading a partial area of the original document, the reading operation is also changed in addition to the change of the output operation. For example, the reading operation of original document is terminated and output is prohibited, or the reading operation for second image data, which is no longer necessary after the determination is made, is terminated and the reading operation for first image data of original document is completed and then output is limited, and such. If it is determined that color-changing toner has not been used after reading a partial area of the image of the original document, the irradiation of light IR of the specific wavelength and the reading operation for second image data, both of which are not necessary after the determination is made, are terminated, and the reading operation for first image data of original document is completed, and then output is carried out without any change (only the reading operation is changed).

In this way, MFP 10 is capable of preventing content of a document, which has been printed with color-changing toner, from being compromised. For a document which has been printed with color-changing toner in conjunction with normal toner, MFP 10 is capable of preventing information on a document from being compromised by printing out the area, which has been printed with color-changing toner, with color-changing toner, or with normal toner after replacing the image data of the area with the prescribed image data.

Specifically, according to this embodiment, if it is determined, during the reading operation, that color-changing toner has been used in an image of the original document, then the reading operation is terminated (refer to "Control 1a"), and if it is determined, during the reading operation, that normal toner has been used in an image of the original document, then the irradiation of light IR of the specific wavelength and the reading operation for second image data are terminated (refer to "Control 1b"), resulting in an increase of the speed of the original document reading. This, thus, improves productivity of the original document reading.

Also, if it is determined that color-changing toner has been used in an image of the original document, the image data (the read image), which is to be stored inside MFP 10 temporarily or continuously, is memorized together with identification information which indicates that color-changing toner has been used in the original image (refer to "Control 2a"). When the image data (the read image), which has been stored inside MFP 10 temporarily or continuously, is to be printed, output operation is controlled to be limited to an output printing operation of the image data by color-changing toner if the image data is linked with identification information (refer to "Control 2b"). More specifically, if the selected type of output is to be printed, the image data is printed out by color-changing toner compulsorily regardless of user setting. If the type of output operation is a transfer output to an external device, the capability of the other device of the transfer destination, to which the image data is transferred, is confirmed, and if the other device is capable of printing the image data with color-changing toner, then transfer operation is allowed, but if the other apparatus is not capable of printing the image data with color-changing toner, then the transfer operation is prohibited. In the case in which the type of output operation is a transfer output to an external memory device (such as USB memory, and the like), the transfer operation is prohibited. After the completion of a printing or transfer output operation, the stored image data (the read image data) and the identification information are erased (refer to "Control 2c").

In this way, the content information of original document, having been printed with color-changing toner, becomes a sole existence, regardless of whether the transfer destination (move destination) of the content information is a print medium or a memory medium, and more than one content information, having been printed with color-changing toner, cannot be generated. That is, if the transfer destination is a print medium, then the content information is simply moved from the original document at transfer source to the print medium of the transfer destination, namely, the content information is erased from the original document at transfer source, and is moved to the print medium at the transfer destination, and if the transfer destination is a memory medium, then the content information cannot be transferred. Thus, MFP 10 is capable of preventing information on a document from being compromised.

Also, MFP 10 prohibits an output operation if it is determined that color-changing toner has been used in an image of the original document (refer to "Control 3a"). In this way, duplication of a confidential document having been printed with color-changing toner is prohibited, resulting in an enhancement of security. If it is determined during the operation of original document reading that color-changing toner has been used in an image of the original document, MFP 10 terminates the reading operation and also prohibits output operation. In this way, unnecessary reading operation is terminated and duplication of a confidential document having been printed with color-changing toner is also prohibited, resulting in an enhancement of security.

In the case in which the remaining amount of color-changing toner is not more than a prescribed amount, the previously described prohibition control is carried out (refer to "Control 3c"). If printing on a recording medium, with color-changing toner, is carried out when the remaining amount of color-changing toner is not more than a prescribed amount, color-changing toner is not sufficient for the recording medium, and a print with a lower image quality having density unevenness and the like, is generated as the result, and therefore, the printing operation is prohibited according to the prohibition control described above. By preventing these prints of lower image quality from being generated, unnecessary consumption of various kinds of resources used for printing such as recording mediums, color-changing toner, thermal energy necessary for fixing (electrical power), and the like, can be suppressed, thus, providing effect of energy conservation. In case of terminating reading operation in mid-course (step S408 in FIG. 12), effects of energy conservation are further enhanced because electrical power used for the reading operation can be suppressed.

In case of duplication of an original document on which an image area having been printed with color-changing toner and an image area having been printed with normal toner are mixed, and if the remaining amount of color-changing toner is not more than a prescribed amount, the image area having been printed with color-changing toner is printed with normal toner after the image data of the image area is replaced by a prescribed image data (step S612 in FIG. 15). In this way, while preventing the deterioration of image quality (deterioration of appearance) of the image area, the deterioration which is caused by printing (duplicating) the image area of the original document, having been printed with color-changing toner, with color-changing toner under the condition that the remaining amount of the toner is low, the information of an image area, of the original document, having been printed with normal toner, can be provided to the user (the user of MFP 10) by printing out the information on a recording medium with normal toner.

In case of duplication of an original document having been printed with color-changing toner, printing (printing with color-changing toner) is initiated after the reading operation is completed. In this way, the original document having been printed with color-changing toner can be maintained, and duplicate of the content information cannot be generated.

In case of duplication of a recording medium which has been duplicated from an original document, having been printed with color-changing toner, and a dummy image has been printed with color-changing toner at the upper edge and lower edge of the recording medium (refer to FIG. 13), the determination of whether color-changing toner has been used is made, before reading the content of the recording medium, based on the first image data which was obtained by reading the dummy image, and the second image data which is changed from the first image data because the dummy image, printed with color-changing toner, has been erased. In this way, reading operation and output operation for the recording medium can be changed without erasing the content, and the information of the recording medium is protected from being compromised. Even if the dummy is hidden or erased, an accurate result of determination can be obtained by reading the content, and the information of the recording medium is surely protected from being compromised.

Second Embodiment

When an original document is read in the erase-reading mode via scanner section 22 (22*a*) of MFP 10, the image area, having been printed with color-changing toner, is erased after being irradiated with light IR of a specific wavelength. The original image data in the erased area cannot be obtained by reading the original document again. Therefore, it becomes important to obtain a good (normal) read image data via a single scanning because there is a possibility that image data of an original document, having been printed with color-changing toner, cannot be obtained again.

In case of scanner section 22*a* shown in FIG. 2*a*, if a positional misalignment of the original document on platen 31 has occurred during the reading operation in the erase-reading mode, drift in image data occurs. Also, if the original document is removed from platen 31 during the reading operation, the read image data is only partial image data up to the image area which has been scanned and read.

In this second embodiment, a technique which prevents an original document on platen 31 from being misaligned or removed during the reading operation.

Scanner section 22*a* (refer to FIG. 2*a*) of MFP 10 according to this second embodiment is provided with a holding section which is switchable between a first holding state in which original document M is removable, and a second holding state in which original document M is not removable. For example, the holding section consists of, but is not limited to, a platen cover and a locking section which locks and releases the platen cover.

Figure 28:
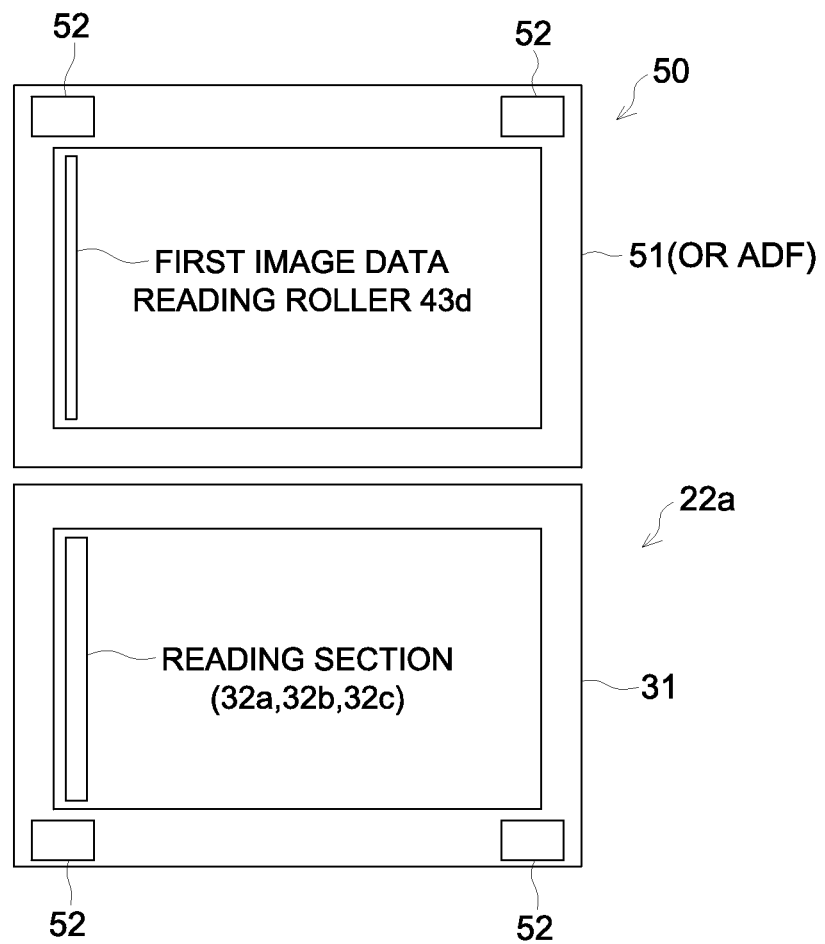
FIG. 28 is a diagram schematically showing an example of a holding section of the multi-function peripheral according to the second embodiment of the present invention.

FIG. 28 shows an example of the holding section. For example, but is not limited to, platen cover 51 of holding section 50 is so configured that one end portion of platen cover 51 is rotatably supported on a chassis, or the like, which constitutes the main-body of scanner 22*a* and switches the position between a lockup position to cover the upper surface of platen 31 and a released position to open the upper surface of platen 31. When platen cover 51 is open, original document M can be set onto platen 31 and can be removed from platen 31. When platen cover 51 is closed, after original document M is set onto platen 31, original document M on platen 31 is pressed down by platen cover 51.

Locking section 52 is configured so as to lock platen cover 51 in the lockup position to keep platen cover 51 in position, or to release platen cover 51 from that position. The configuration of locking section 52, shown in FIG. 28, is an example of using electromagnets as an electromagnetically-operated lock mechanism. As shown in FIG. 28, in this example, but is not limited to, two electromagnets are placed on platen cover 51 and platen 31, respectively, total four electromagnets as locking section 52. Those electromagnets, as locking section 52, are so placed that each of the electromagnets placed on platen cover 51 is to contact with each of the electromagnets placed on platen 31 when platen cover 51 is in the lockup position. The first holding state and the second holding state can be obtained by controlling the polarity of electromagnets placed on platen cover 51 and on platen 31. If each opposing electromagnet is energized so as to have the same polarity, or at lease one of the opposing electromagnets is turned off, then platen cover 31 is unlocked (the first holding state), and if each opposing electromagnet is energized so as to have a reverse polarity, then, platen cover 31 is locked (the second holding state). For this lock mechanism, an electrically-operated mechanical lock mechanism may be used. This locking section 52 is controlled by CPU 11 so as to lock or release platen cover 51 in the lockup position. When platen cover 31, in the lockup position which covers the upper surface of platen 31, is locked via locking section 52, the cover cannot be released from that position, and can only be released when the cover is unlocked.

In case of holding section 50, which is provided with platen cover 31 and locking section 52 described above, the state in which platen cover 31 in the lockup position is unlocked via locking section 52, is the first holding state in which original document M is removable, and the state in which platen cover 31 in the lockup position is locked via locking section 52, is the second holding state in which original document M is not removable.

Note that scanner section 22*b* shown in FIG. 19 and scanner section 22*c* shown in FIG. 20 are each a flat-bed type scanner, the same as scanner section 22*a*. The above described holding section, which is provided with a platen cover and locking section, may also be attached to scanner sections 22*b* and 22*c*. Also, for a scanner section in which auto document feeder (ADF) also serves the function of a platen cover, a holding section, which is provided with the auto document feeder and a locking section to lock or release the auto document feeder, may also be incorporated.

Next, the operation of platen cover lock of MFP 10, according to this second embodiment, will be described.

Figure 22:
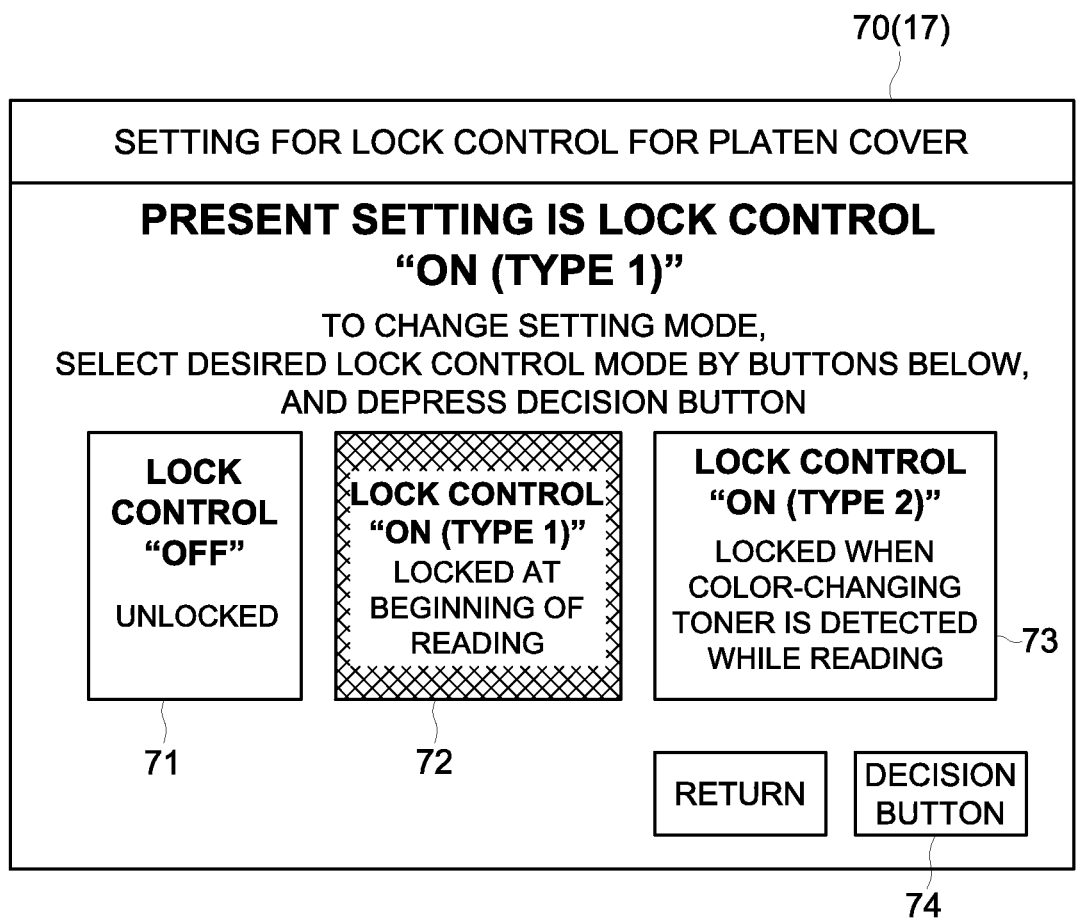
FIG. 22 is a diagram schematically showing an example of a screen for platen cover lock setting displayed on the display section of the multi-function peripheral according to a second embodiment in the present invention.

FIG. 22 is a diagram schematically showing an example of platen cover lock setting screen 70 displayed on display section 17 of MFP 10 according to this embodiment. This screen is displayed one of the administrator setting screens. Note that this screen may also be displayed as one of the user setting screens.

As lock control modes of the platen cover, MFP 10 is provided with lock control OFF mode, lock control ON (type 1) mode, and lock control ON (type 2) mode.

The lock control OFF mode is a lock control mode in which the platen cover, positioned in the lockup position, is not locked.

The lock control ON (type 1) mode is a lock control mode in which the platen cover, positioned in the lockup position, is locked at the time when the reading operation is initiated, and is unlocked at the time when the reading operation is completed. In this mode, the platen cover is also unlocked when the reading operation is terminated.

It is preferable to combine this lock control ON (type 1) mode with an operation in which existence or nonexistence of a mixture of the types of toner, having been used in an image of original document, is determined after reading all of the images of the original document (refer to FIG. 14).

The lock control ON (type 2) mode is a lock control mode in which the platen cover, positioned in the lockup position, is not locked at the time when the reading operation is initiated. This is a lock control mode in which the platen cover, positioned in the lockup position, is locked at the time when it is determined, during the reading operation, that color-changing toner has been used in the image of the original document and the reading operation is not to be terminated until the completion of the reading operation, and is unlocked at the time when the reading operation is completed.

This lock control ON (type 2) may be combined with an operation in which the type of toner, used in the image of the original document, is determined by reading a partial area of the image of the original document (refer to FIG. 10).

An administrator (or a user) of MFP 10 is capable of selecting either one of the lock control modes by depressing either one of lock control OFF selection button 71, lock control ON (type 1) selection button 71, or lock control ON (type 2) selection button 73, displayed on platen cover lock setting screen 70, and determining the setting for the selected lock control mode by depressing decision button 74. When the setting of lock control via platen cover lock setting screen 70 is carried out, the set value of lock control is stored into non-volatile memory 15. Note that the default of the setting is the lock control OFF mode.

Figure 23:
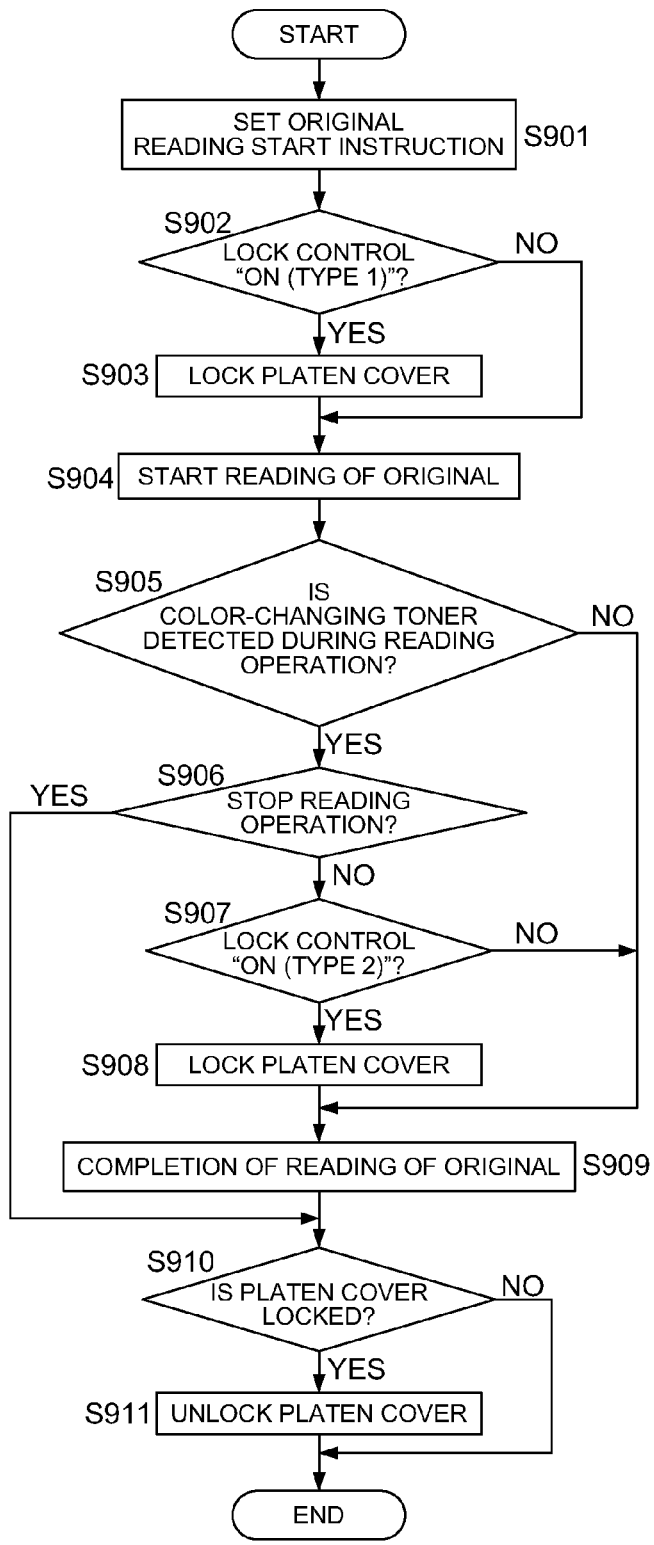
FIG. 23 is a flow chart showing an example of platen cover lock operation of the multi-function peripheral.

FIG. 23 is a flow chart showing an example of platen cover lock operation of MFP 10. In detail, this figure shows an extraction of major steps illustrated in FIGS. 10 to 12 and 14, which were described in the first embodiment of the present invention, combined with steps according to the platen cover lock operation. In the followings, each step and flow of operation will be described first, and then, the flow, which corresponds to major steps in the first embodiment, will be described.

In MFP 10, when an original document is set on platen 31 of scanner section 22 (or 22a) and CPU 11 receives start instruction of reading operation (depression of START BUTTON) after the platen cover is closed (step S901), CPU 11 checks the set value for lock control mode stored in non-volatile memory 15. If the set value is lock control ON (type 1) (step S902: YES), CPU 11 controls the locking section of scanner section 22 so as to lock the platen cover (step S903), and operates scanner section 22 so as to initiate the reading operation to read the original document (step S904). During the reading operation, CPU 11 maintains the locked state of the platen cover.

If the set value is not lock control ON (type 1), CPU 11 operates scanner section 22 so as to initiate the reading operation without locking the platen cover (step S904).

If CPU 11 determined during the reading operation that normal toner has been used in an image of the original document (step S905: NO), CPU 11 controls scanner section 22 so as to read all of the original document and completes the reading operation (step S909). If CPU 11 determined during the reading operation that color-changing toner has been used in an image of the original document (step S905: YES), CPU 11 controls scanner section 22 so as to terminate the reading operation, and the process advances to step S910.

If CPU 11 determines, during the reading operation, that color-changing toner has been used in an image of the original document (step S905: YES), and if the set value stored in non-volatile memory 15 is not lock control ON (type 2) mode (step S907: NO), CPU 11 controls scanner section 22 so as to read all of the original document and completes the reading operation (step S909). If the set value stored in non-volatile memory 15 is lock control ON (type 2) mode (step S907: YES), CPU 11 controls scanner section 22 so as to lock the platen cover (step S908) and maintain that locked state during the remaining of the reading operation. Then, CPU 11 controls scanner section 22 so as to read all of the original document, and completes the reading operation (step S909).

When the reading operation is completed (step S909) or the reading operation is terminated (S906: YES), if the platen cover is locked (step S910: YES), CPU 11 controls scanner section 22 so as to unlock the platen cover (step S911 to END). If the platen cover is not locked, then CPU 11 maintains the unlocked state (END).

Each step and the flow of the operation have been described. Step S901, shown in FIG. 23, corresponds to step S201 in FIG. 10 and step S501 in FIG. 14. Step S904 corresponds to step S202 in FIG. 10 and step S502 in FIG. 14. Therefore, step S901 and step S904 are to be carried out between step S201 and step S202 in FIG. 10, and to be carried out between step S501 and step S502 in FIG. 14.

The flow from step S905 (NO) directly to step S909 corresponds to the flow from step S203 to step S207 in FIG. 14. The flow from step S905 (NO) directly to step S909 also substantially corresponds to the flow from step S503 to step S504 (YES) in FIG. 14. This is the flow in which existence or nonexistence of a mixture of the types of toner, having been used to create an image of the original document, is determined after all of the images of the original document are read, and is the flow in which lock control of the platen cover is not carried out during the reading operation and the reading operation is not terminated in mid-course.

The flow from step S905 (YES) to step S906 (YES) corresponds to the flow from step S203 to step S212 via step S205 in FIG. 10, which leads to FIG. 11 (subroutine) to carry out operation change control (the first pattern) for color-changing toner. Also, the flow from step S905 (YES) to step S906 (YES) corresponds to the flow from step S212 in FIG. 10 to the flow from step S401 to step S408 and the flow from step S401 to step S414 in FIG. 12 (subroutine) to carry out operation change control (the second pattern) for color-changing toner.

The flow from step S906 (NO) to step S909 corresponds to the flow from step S401 to step S405 (YES), the flow from step S401 to step S411 (YES), and the flow from step S410 to step S418 (YES), in the operation change control for color-changing toner shown in FIG. 12. In this flow, step S907 and step S908 in case of step S907 (YES) may be carried out, for example, but is not limited to, that time before step S401.

Also, step S910 and step S911 in case of step S910 (YES) may be carried out, for example, but is not limited to: (1) after step S207 in case of FIG. 10; (2) in case of FIG. 11, after step S301; (3) in case of FIG. 12, after step S404, after step S408, after step S411, after step S414, and after step S418; and (4) in case of FIG. 14, after step S504.

Note that, in case of the operation shown in FIG. 14, lock control for platen cover is not carried out during reading operation because existence or nonexistence of a mixture of the types of toner, used in an image of an original document, is determined after reading all of the images of the original document. However, a mixture of the types of toner can be determined by an operation in which the process to determine the existence or nonexistence of a mixture of the types of toner each time after reading a partial area of the image of the original document, is repeated in series until all the areas of the image of the document are read. In this operation, lock control for platen cover (step S907 and step S908 in case of step S907 (YES)) can be carried out at the time when it is determined during the reading operation that color-changing toner has been used.

In this way, MFP 10, according to this embodiment, is provided with the lock control function to carry out locking and unlocking of platen cover. In case of the lock control ON (type 1) mode for platen cover, by locking the platen cover which covers and presses down an original document set on platen 31 of scanner section 22 (or 22a), the original document is held (in a non-removable state) on the platen, preventing the original document from being misaligned or removed during the reading operation, thus, it becomes capable of obtaining good image data via a single scanning In case of the lock control ON (type 2) mode, the reading operation is initiated without locking the platen cover which covers and presses down an original document set of platen 31 of scanner section 22 (or 22a). In case in which the necessity of holding the original in a non-removal state is low, it may not be necessary to change to the holding state.

Third Embodiment

As described above, if an original document, having been printed with color-changing toner, is read in the reading mode for erasing of MFP 10, the image of the original document is erased after being irradiated, by the light of the specific wavelength, during the reading operation. Also, as described in the explanations for step S203 in FIG. 10 and step S503 in FIG. 14 according to the first embodiment, the first and second image data of original document, which are read during the reading operation, are stored temporarily in RAM 14 (volatile memory).

In this case, if an unexpected power failure occurs in MFP 10, such as a blackout or pulling the plug, or the like, the read image data, which has been temporarily stored in RAM 14, disappears, and the read image data cannot be outputted even after MFP 10 is rebooted. This means that the image of the original document has been lost and no longer exists, because the image of the original document has already been erased after being irradiated by the light of the specific wavelength, and because the image data stored in RAM 14 inside MFP 10 has been lost. Also, in a case in which an original document, in which an image area having been printed with color-changing toner and other image areas having been printed with normal toner are mixed, is read, the image area having been printed with color-changing toner is erased by the light of the specific wavelength, and therefore, if an unexpected power failure occurs in MFP 10 before the read image data is printed out, then the read image data, which has been temporarily stored in RAM 14, also disappears, and the original image of the original document is lost.

In this third embodiment, a technique with which an original document, which has been read in the erase-reading mode and the mage area having been printed with color-changing toner has been erased, can be restored (reproduced) even if an unexpected power failure occurs in MFP 10 before the read image data is printed out. The outline of the technique is that loss of the read image data by a power failure is avoided by temporarily storing the read image data on hard disc device 16. Note that as a memory area (prescribed memory area) to temporarily retain the read image data on hard disc device 16, a virtual memory area assigned to hard disc device 16 may be used, for example, but is not limited thereto.

As previously described in the explanations for FIGS. 5 (basic operation), 10, and 14 according to the first embodiment, the determination of whether color-changing toner has been used to create an image of the original document is carried out by comparing the first image data, which is obtained via scanner section 22a, before irradiating the original document by the light of the specific wavelength, and the second image data, which is obtained after irradiating the original document by the light of the specific wavelength. After comparing, to see if both image data are identical, then it is determined that color-changing toner has not been used and normal toner has been used. If both image data are not identical, it is determined that color-changing toner has been used. It is preferable to compare a partial area of image of the original document if productivity has a higher priority as described in FIGS. 10 and 12. If it is to determine the mixture of normal toner and color-changing toner more definitely, it is preferable to compare all the areas of image of the original document as described in FIGS. 14 and 15.

The operation of the erase-reading mode, according to the third embodiment, will be separately explained for a case of an operation in which productivity has a higher priority, and for a case of an operation in which the mixture of normal toner and color-changing toner is to be determined more definitely. Generally, the access speed of a non-volatile memory (such as hard disc device 16 and non-volatile memory 15) is slower than the of volatile memory (such as RAM 14), and therefore, if the read image data of the original document is always temporarily stored on hard disc device 16, a longer time is necessary to store and retrieve the read image data compared to the case in which the read image data is temporarily stored in RAM 14, thus resulting in a likely decrease of processing speed (namely, likely decrease of productivity). In this embodiment, by taking this possible problem into consideration, an example in which processing speed has a higher priority, and an example in which security of the read image data (reproducibility of original document), against possible loss due to power failure, has a higher priority, will be described for each operation, the operation in which productivity has a higher priority, and the operation, in which a mixture of the types of toner is to be determined in detail.

(1) Productivity-oriented and processing speed-oriented
(2) Determination of mixture of toner types and processing speed-oriented
(3) Productivity-oriented and security-oriented
(4) Determination of mixture of toner types and security-oriented In a processing speed-oriented operation, the read image data of original document is temporarily stored in RAM 14 initially, and if it is determined that color-changing toner has been used in the image of the original document, the read image data, which is temporarily stored in RAM 14, is then moved to hard disc device 16 and stored thereon. If it is determined that color-changing toner has not been used in the image of the original document, then the read image data is kept temporarily stored in RAM 14.

In a security-oriented operation, the read image data of an original document is temporarily stored on hard disc device 16 initially, and if it is determined that color-changing toner has not been used in the image of the original document, the read image data, which has been temporarily stored on hard disc device 16, is then moved to RAM 14 and stored therein. If it is determined that color-changing toner has been used in the image of the original document, then the read image data is kept temporarily stored on hard disc device 16.

Each of the operations described above is shown in FIGS. 24 to 27 by, partially modifying FIG. 5 used in the first embodiment, and by adding a brief overview of the output operations (output processing). For each of the operations, described above and shown in FIGS. 24 to 27, explanations of common steps with steps in FIG. 5 will be simplified, and the modified and added steps will be explained in detail.

Also, there is a possibility in which the read image data of original document cannot be stored on hard disc device 16 if the amount of free space (remaining space) of hard disc device 16 is low. Therefore, in each of the operations described above, the amount of free space of hard disc device 16 is checked before the reading operation to read an original document is initiated. If the amount is less than a prescribed amount, the reading operation is prohibited.

(1) Productivity-oriented and Processing Speed-Oriented

Figure 24:
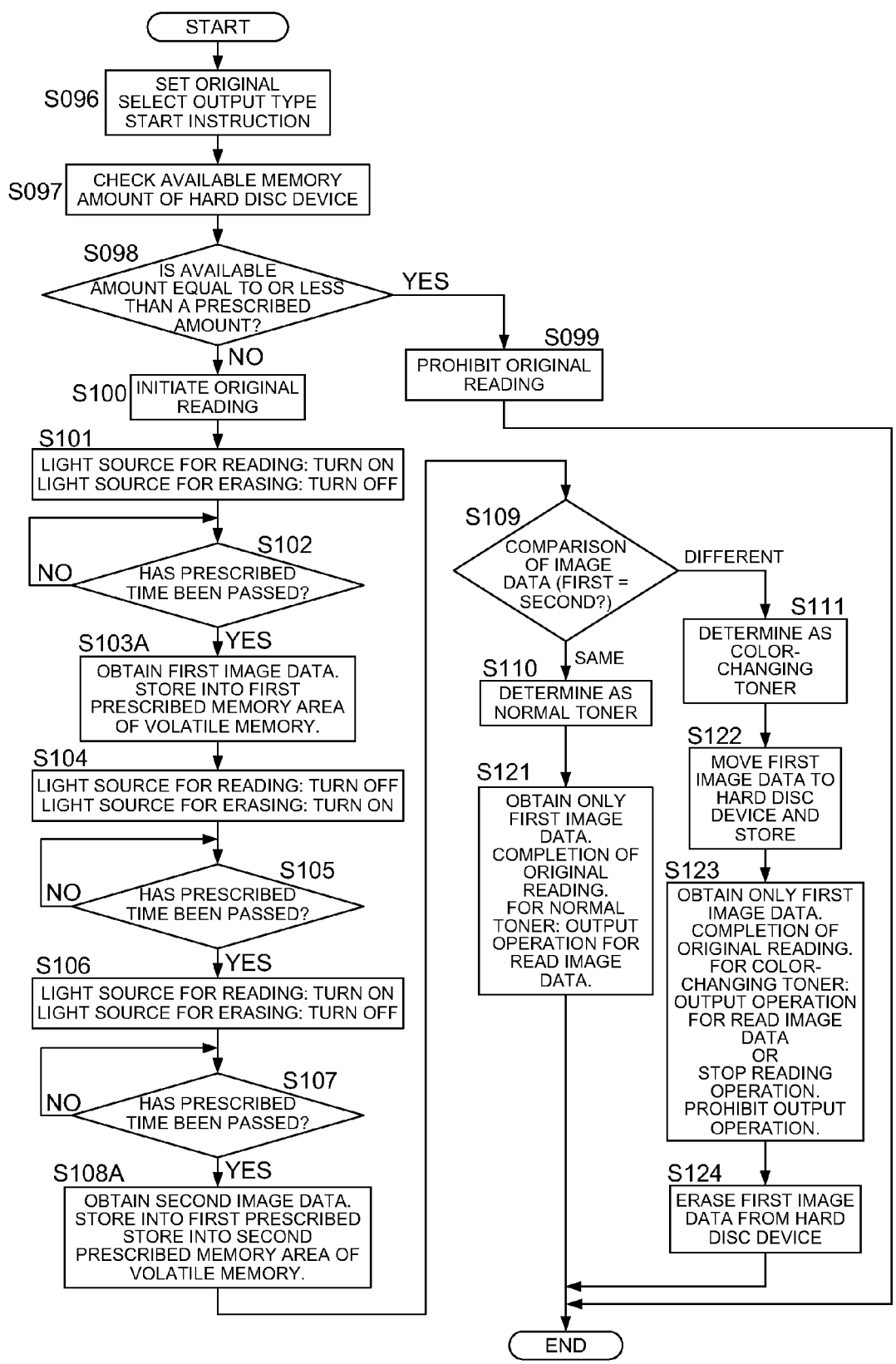
FIG. 24 is a flow chart showing an example of operation for productivity-oriented and processing speed-oriented operation in the erase-reading mode of the multi-function peripheral according to a third embodiment in the present invention.

FIG. 24 is a flow chart showing an example of operation for productivity-oriented and processing speed-oriented operations in the erase-reading mode of MFP 10.

In MFP 10, when an original document is set on scanner section 22, the type of output (printing/internal storage/transfer to external device) is selected on operation section 18, and CPU 11 receives start instruction (depression of START BUTTON) (step S096), CPU 11 checks the amount of free space on hard disc device 16 (step S097). If the amount of the free space on hard disc device 16 is less than the prescribed amount (step S098: YES), CPU 11 prohibits the reading operation (step S099), and the process is finished without reading the original document (END).

If the amount of the free space of hard disc device 16 is more than the prescribed amount (step S098: NO), CPU 11 operates scanner section 22 so as to initiate the reading operation to read the original document (step S100 (initiation of the reading operation).

As described in FIGS. 5 and 10 according to the first embodiment, CPU 11 carries out scanning and reading of original document via scanner section 22, and temporarily stores the first image data, which was obtained before being irradiated with the light of the specific wavelength, into the first prescribed memory area of RAM 14 (steps S101 to S103A), and temporarily stores the second image data, which was obtained after being irradiated with the light of the specific wavelength, into the second prescribed memory area of RAM 14 (steps S104 to S108A). Note that, as described in FIGS. 5 and 10, CPU 11 obtains the first and second image data of the prescribed area of original document (first line of the image of the original document, or a prescribed plural number of lines, from the first line, of the original document), and temporarily stores them in RAM 14.

If CPU 11 determined, as a result of comparison of the first and second image data, that both image data are identical (step S109: SAME), and that normal toner has been used in the image of the original document (step S110), CPU 11 changes the operation of scanning section 22 to the operation in which only the first image data of the original document is obtained and light source 36 for reading is not activated, and continues to scan and read the original document. Then, CPU 11 sequentially stores the first image data, which was obtained via line by line scanning (the first image data of the unit of line), in the first prescribed memory area of RAM 14 and completes the reading operation for all the areas of the original document. Then, CPU 11 carries out output processing for normal toner, for the first image data which has been stored in the first prescribed memory area of RAM 14 (step S121 (refer to steps S206 to S210 in FIG. 10 for more detail)), and completes the reading and output operation of the original document (END).

If CPU 11 determined, as a result of comparison of the first and second image data, that the image data are not identical (step S109: DIFFERENT), and that color-changing toner has been used in the image of the original document (step S111), CPU 11 moves the first image data, which has been temporarily stored in the first prescribed memory area of RAM 14 (first line of the image of the original document, or the prescribed plural number of lines, from the first line, of the original document), to hard disc device 16 and temporarily stores the first image data thereon (step S122). Then, the first image data, which has been temporarily stored in RAM 14, is erased after being moved to hard disc device 16. Also, the first image data, which has been temporarily stored on hard disc device 16, is memorized together with identification information (for detail, refer to step S401 in FIG. 12).

Note that the first image data may remain in RAM 14 by reading out the first image data from RAM 14 and storing them on hard disc device 16 (saved as a duplicate).

Next, CPU 11 changes the operation of scanning section 22 to the operation in which only the first image data of the original document is obtained, and after which light source 36 for reading is turned on to erase the image data, and continues to scan and read the original document. Then, CPU 11 sequentially stores the first image data, which was obtained via line by line scanning (the first image data of the unit of line), on hard disc device 16, and completes the reading operation for all the areas of the original document. Then, CPU 11 carries out output processing for color-changing toner, for the first image data which has been stored on hard disc device 16, or terminates the reading operation to read the original document via scanner section and prohibits the output operation (step S123).

The detailed explanations of step S123 are, as described in the explanations for steps S420 to S426 and steps S408 to S419 in FIG. 12, that, in a case in which the output operation is to be carried out, the first image data is printed out according to the selected output type (refer to step S406), or the first image data is stored in the prescribed memory area (such as BOX, or the like) on hard disc device 16 (refer to step S412), or the first image data is transferred to another MFP 10 (refer to step S419). In case in which the output operation is prohibited (refer to step S409), printing of the first image data is prohibited (refer to step S409), or transfer of the first image data is prohibited (refer to step S415).

After CPU 11 completes the output operation, or prohibits the output operation, CPU 11 erases the first image data and identification information which have been temporarily stored on hard disc device 16 (step S124 (which corresponds to step S407 in FIG. 12)), and completes the reading and output operation of the original document (END).

(2) Determination of Mixture of Toner Types and Processing Speed-Oriented

Figure 25:
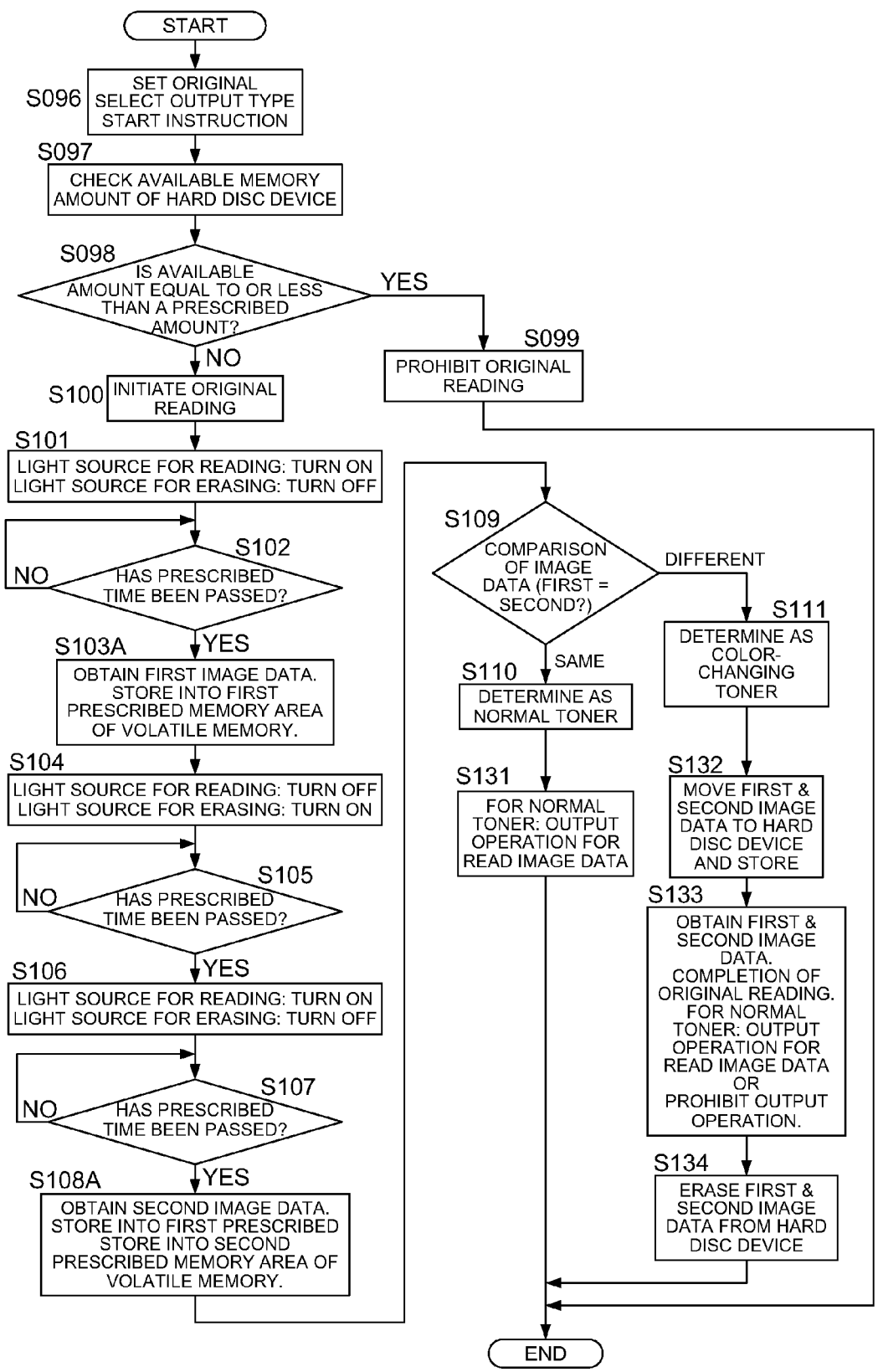
FIG. 25 is a flow chart showing an example of operation for determination of mixture of toner types and processing speed-oriented operation in the erase-reading mode of the multi-function peripheral according to the third embodiment in the present invention.

FIG. 25 is a flow chart showing an example of operation for determination of mixture of toner types and processing speed-oriented operation in the erase-reading mode of MFP 10.

As descried in FIGS. 9*a* to 9*d* according to the first embodiment, the determination on the mixture of normal toner and color-changing toner and determination of each toner area is carried out by extracting the difference between the first image data and second image data which were obtained by reading all of the image areas of the original document and comparing the different portions of the read image data. Here, the mixture of the types of toner is determined by the operation in which the process to determine the existence or non-existence of a mixture of the types of toner each time after reading a partial area of the image of the original document, is repeated in series until all areas of the image of the document are read. The way to determine a mixture of the types of toner after reading all of the image areas of the original document, as described in FIG. 14, is not used here.

Steps S096 to S100 in FIG. 25 are the same as steps S096 to S100 in FIG. 24, and therefore, the explanations are skipped.

CPU 11 carries out scanning and reading of original document via scanner section 22, and stores the first image data, which was obtained before irradiating the light of the specific wavelength, into the first prescribed memory area of RAM 14 temporarily (steps S101 to S103A), and temporarily stores the second image data, which was obtained after irradiating the light, into the second prescribed memory area of RAM 14 (steps S104 to S108A). Note that, as described above, CPU 11 obtains the first and second image data of the prescribed area of original document (first line of the image of the original document, or the prescribed plural number of lines, from the first line, of the original document), and temporarily stores the data in RAM 14.

If CPU 11 determined, as a result of comparison of the first and second image data of the partial area, that both image data are identical, CPU 11 continues to scan and read the original document, and obtains the first and second image data of the next partial area and temporarily stores that data in RAM 14. If CPU 11 determined, as a result of comparison of the first and second image data of the next partial area, that both image data are identical, CPU 11 temporarily stores the data in RAM 14, and CPU 11 continues the comparison operation.

If CPU 11 determined, as a result of comparison of the first and second image data of all the partial areas (all image areas of original document), that both image data are the same (step S109: SAME), and that normal toner has been used in all of the image areas of the original document (step S110), and then, CPU 11 carries out output processing for normal toner, for the first image data (the read image data of original document) which has been temporarily stored in the first prescribed memory area of RAM 14 (step S131 (refer to steps S507 to S510 in FIG. 14 for more detail)), and completes the reading and output operation of the original document (END). Note that, in this case, the second image data, which is identical to the first image data, may be outputted in place of the first image data, as described in FIG. 14.

On the other hand, if CPU 11 determined, as a result of comparison of the first and second image data of the partial area, that both image data are different (step S109: DIFFERENT), and that color-changing toner has been used in the image area of the original document (step S111), and then, CPU 11 moves the first image data (obtained the first image data of the partial area before now), which has been temporarily stored in the first prescribed memory area of RAM 14, to the first prescribed memory area of hard disc device 16 and temporarily stores them therein, and CPU 11 also moves the second image data (obtained the second image data of the partial area before now), which has been temporarily stored in the second prescribed memory area of RAM 14, to the second prescribed memory area of hard disc device 16 and temporarily stores the data thereon (step S132). Then, the first and second image data, which have been temporarily stored in RAM 14, are erased after being moved to hard disc device 16. Note that the first and second image data may remain in RAM 14 by reading out the first and second image data from RAM 14 and storing the data on hard disc device 16 (saved as a duplicate).

CPU 11 continues to scan and read the original document, and sequentially stores the first image data, which was obtained via line by line scanning (the first image data of the unit of line), on the first prescribed memory area of hard disc device 16 and also sequentially stores the second image data, which was obtained via line by line scanning (the second image data of the unit of line), in the second prescribed memory area of hard disc device 16, and completes the reading operation for all the areas of the original document. Note that, because CPU 11 has already determined that color-changing toner has been used in the image area of the original document, a comparison of the first and second image data which were obtained from then on is not carried out.

Next, CPU 11 extracts the difference between the first image data and second image data both of which have been temporarily stored on hard disc device 16 (which corresponds to step S505 in FIG. 14), and stores the different portions of the image data in a third prescribed memory area of hard disc device 16. Further, CPU 11 links the first and second image data and the different portions of the first and second image data with identification information and stores them in the third prescribed memory area of hard disc device 16 (which corresponds to step S601 in FIG. 15). Then, CPU 11 carries out output processing for color-changing toner, for the first and second image data and the different portions of the first and second image data all of which have been temporarily stored on hard disc device 16, or prohibits the output operation (step S133). Specifically, CPU 11 carries out output processing, which was described in explanations for steps S602 to S605 and steps S607 to S627 in FIG. 15, or prohibits the output operation.

When CPU 11 completes the output processing, or prohibits the output operation, CPU 11 erases the first and second image data, the different portions of the image data, and identification information all of which have been temporarily stored on hard disc device 16 (step S134 (which corresponds to step S606 in FIG. 15), and completes the reading and output operation of the original document (END).

(3) Productivity-oriented and Security-Oriented

Figure 26:
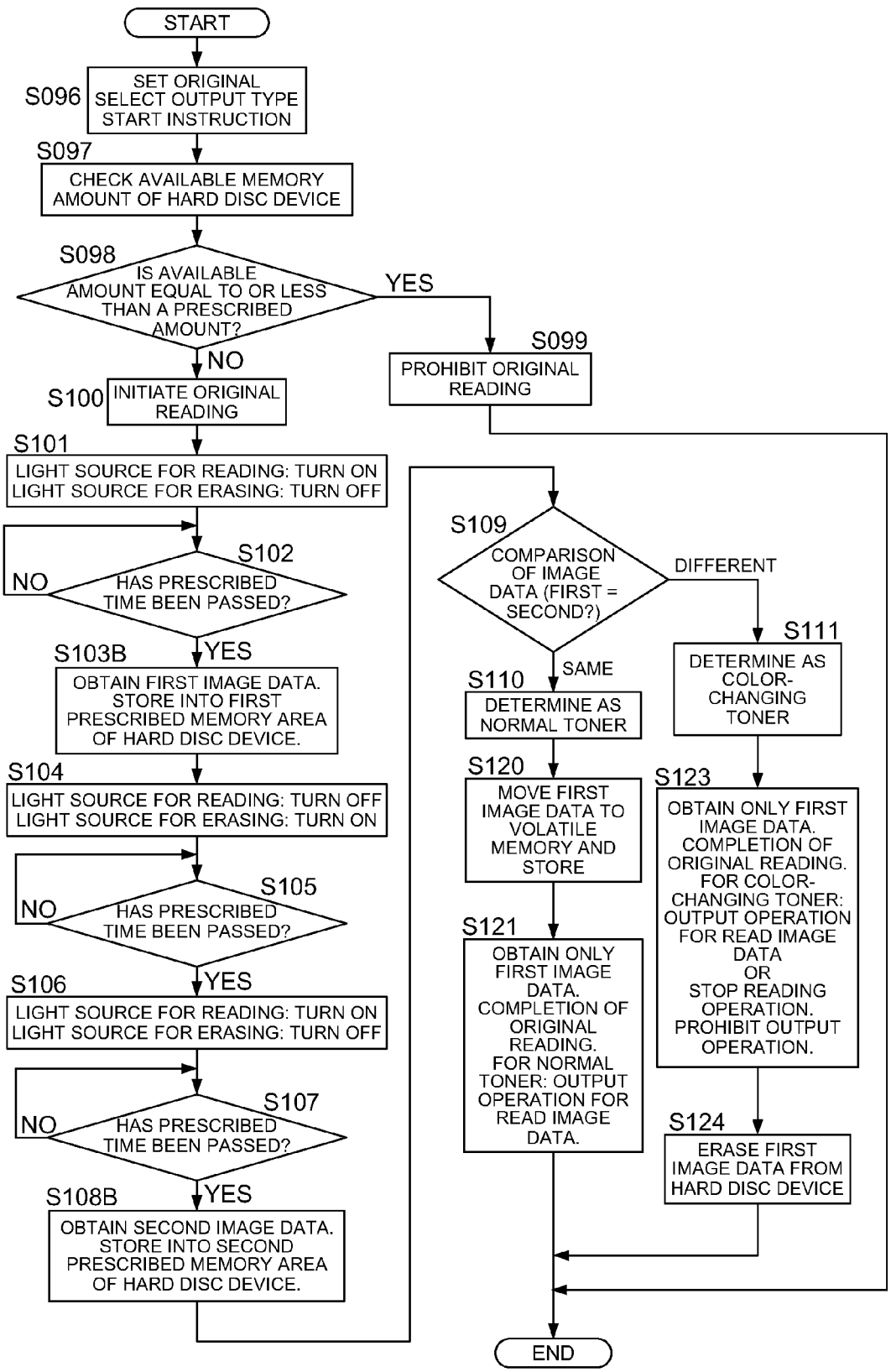
FIG. 26 is a flow chart showing an example of operation for productivity-oriented and security-oriented operation in the erase-reading mode of the multi-function peripheral according to the third embodiment in the present invention.

FIG. 26 is a flow chart showing an example of operation for productivity-oriented and security-oriented operations in the erase-reading mode of MFP 10.

Steps S096 to S100 in FIG. 26 are the same as steps S096 to S100 in FIG. 24, and therefore, the explanations are skipped.

CPU 11 carries out scanning and reading of original document via scanner section 22, and temporarily stores the first image data, which was obtained before irradiating the light of the specific wavelength, into the first prescribed memory area of RAM 14 (steps S101 to S103B), and temporarily stores the second image data, which was obtained after irradiating the light of the specific wavelength, into the second prescribed memory area of RAM 14 (steps S104 to S108B).

In FIG. 24 for the processing speed-oriented operation, the obtained first and second image data are initially stored in RAM 14. In an operation which is processing speed-oriented, however, the obtained first and second image data are initially stored on hard disc device 16. Also, in this operation, CPU 11 obtains the first and second image data of the prescribed area of original document (first line of the image of the original document, or the prescribed plural number of lines, from the first line, of the original document), and temporarily stores them on hard disc device 16.

If CPU 11 determined, as a result of comparison of the first and second image data, that both image data are identical (step S109: SAME), and that normal toner has been used in the image of the original document (step S110), CPU 11 moves the first image data, which has been temporarily stored on the first prescribed memory area of hard disc device 16 (first line of the image of the original document, or the prescribed plural number of lines, from the first line, of the original document), to RAM 14 and temporarily stores the data therein (step S120). Then, the first image data, which has been temporarily stored on hard disc device 16, is erased after being moved to RAM 14.

Note that the first image data may remain on hard disc device 16 by reading out the first image data from hard disc device 16 and storing them in RAM 14 (saved as a duplicate). However, it is preferable to move the first image data from hard disc device 16 to RAM 14 in order to increase the memory area of hard disc device 16.

Next, CPU 11 changes the operation of scanning section 22 to the operation in which only the first image data of the original document is obtained and light source 36 for reading is not activated, and continues to scan and read the original document Then, CPU 11 sequentially stores the first image data, which was obtained via line by line scanning (the first image data of the unit of line), in RAM 14 and completes the reading operation for all the areas of the original document Then, CPU 11 carries out output processing for normal toner, of the first image data which has been stored in RAM 14 (step S121 (refer to steps S206 to S210 in FIG. 10 for more detail)), and completes the reading and output operation of the original document (END).

If CPU 11 determined, as a result of comparison of the first and second image data, that both image data are not identical (step S109: DIFFERENT), and that color-changing toner has been used in the image of the original document (step S111), CPU 11 links the first image data, which has been temporarily stored on hard disc device 16, with identification information (which corresponds to step S401 in FIG. 12).

Next, CPU 11 changes the operation of scanning section 22 to the operation in which only the first image data of the original document is obtained and light source 36 for reading is turned on to erase the image data, and continues to scan and read the original document Then, CPU 11 sequentially stores the first image data, which was obtained via line by line scanning (the first image data of the unit of line), in the first prescribed memory area of hard disc device 16, and completes the reading operation for all the areas of the original document Then, CPU 11 carries out output processing for color-changing toner, for the first image data which has been stored in the first prescribed memory area of non-volatile memory 15 (step S123). The content of step S123, more specifically, is the same as the same step S123 in FIG. 24 (for more detail, refer to steps S402 to S406, and steps S408 to S419 in FIG. 12).

After CPU 11 completes the output operation, or prohibits the output operation, CPU 11 erases the first image data and identification information which have been temporarily stored on hard disc device 16 (step S124 (which corresponds to step S407 in FIG. 12)), and completes the reading and output operation of the original document (END).

(4) Determination of Mixture of Toner Types and Security-Oriented

Figure 27:
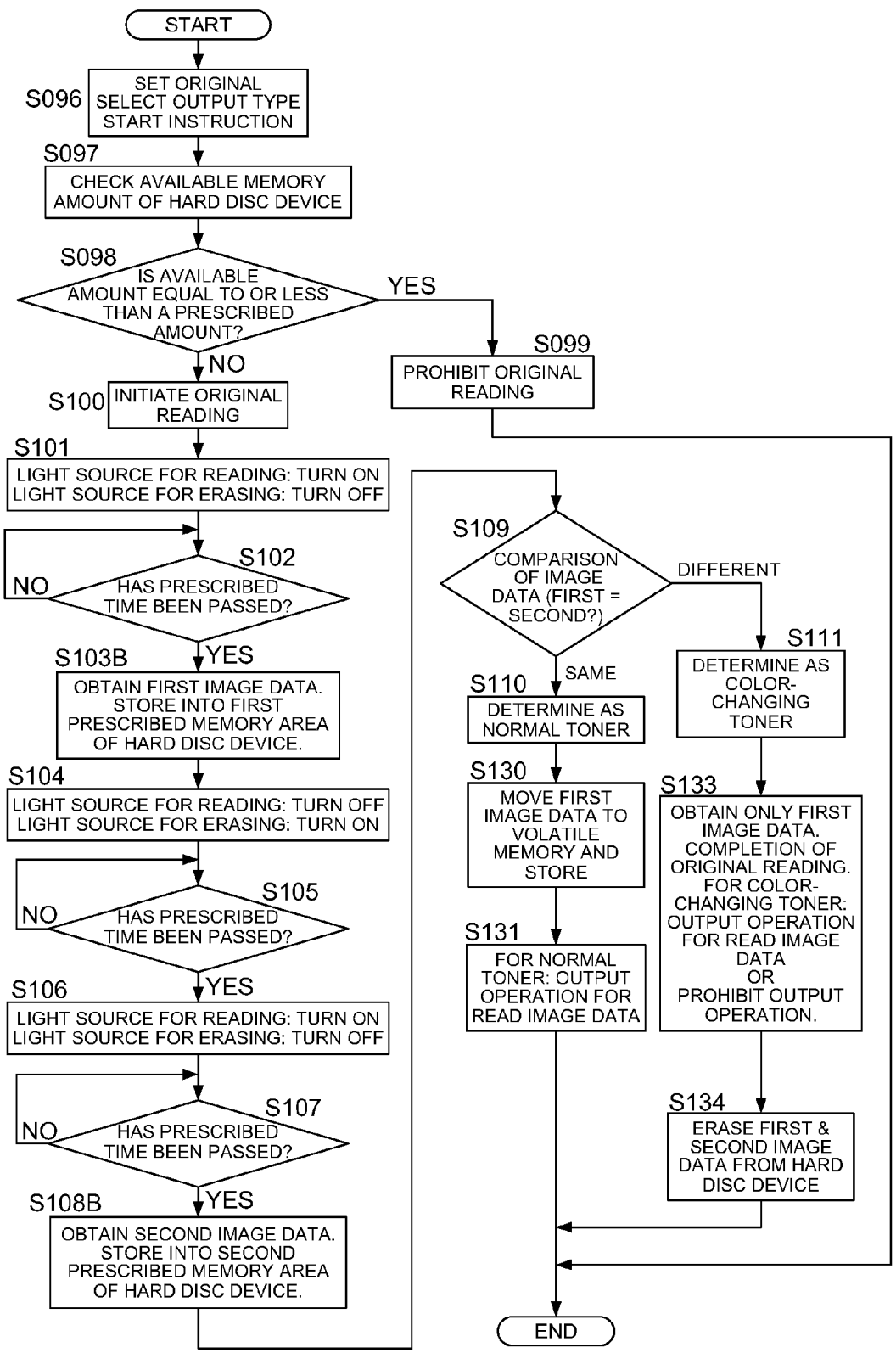
FIG. 27 is a flow chart showing an example of operation for determination of mixture of toner types and security-oriented operation in the erase-reading mode of the multi-function peripheral according to the third embodiment in the present invention.

FIG. 27 is a flow chart showing an example of the operation for determination of mixture of toner types and security-oriented operation in the erase-reading mode of MFP 10.

Steps S096 to S100 in FIG. 27 are the same as steps S096 to S100 in FIG. 24, and therefore, all explanations are skipped.

CPU 11 carries out scanning and reading of original document via scanner section 22, and temporarily stores the first image data, which was obtained before irradiating the light of the specific wavelength, into the first prescribed memory area of hard disc device 16 (steps S101 to S103B), and temporarily stores the second image data, which was obtained after irradiating the light the specific wavelength, into the second prescribed memory area of hard disc device 16 (steps S104 to S108B).

In FIG. 25 for the processing speed-oriented operation, the obtained first and second image data are initially stored in RAM 14. In an operation which is processing speed-oriented, however, the obtained first and second image data are initially stored on hard disc device 16. Also, in this operation, CPU 11 obtains the first and second image data of the partial area (the prescribed area) of original document, and temporarily stores the data on hard disc device 16.

If CPU 11 determined, as a result of comparison of the first and second image data of the partial area, that both image data are identical, CPU 11 continues to scan and read the original document, and obtains the first and second image data of the next partial area, and temporarily stores the data on hard disc device 16. If CPU 11 determined, as a result of comparison of the first and second image data of the next partial area, that both image data are identical, CPU 11 temporarily stores the data on hard disc device 16, and CPU 11 continues the comparison operation.

If CPU 11 determined, as a result of comparison of the first and second image data of all the partial areas (all image areas of original document), that both image data are the same (step S109: SAME), that normal toner has been used in all of the image areas of the original document (step S110), and then, CPU 11 moves the first image data (the first image data of all of the image areas of the original) to RAM 14 and temporarily stores the data therein (step S130). Then, the first image data, which has been temporarily stored on hard disc device 16, is erased after being moved to RAM 14.

Note that the first image data may remain on hard disc device 16 by reading out the first image data from non-volatile memory 15 and storing the data in RAM 14 (saved as a duplicate). However, it is preferable to erase the first image data on hard disc device 16 by moving the image data from hard disc device 16 to RAM 14 in order to increase the memory area of hard disc device 16. Also, the second image data, which is identical to the first image data, may be moved from hard disc device 16 to RAM 14 and stored therein (or saved as a duplicate). Further, both the first and second image data may be moved from hard disc device 16 to RAM 14 and stored therein (or saved as a duplicate). In a case in which either one of the first image data or the second image data is moved from hard disc device 16 to RAM 14, it is preferable to erase the image data, which has not been moved to RAM 14 and remained on hard disc device 16, in order to increase the memory area of hard disc device 16.

Then, CPU 11 carries out output processing for normal toner, for the first image data (or the second image data) which has been stored in RAM 14 (step S131 (refer to steps S507 to S50 in FIG. 14 for more detail)), and completes the reading and output operation of the original document (END).

On the other hand, if CPU 11 determined, as a result of comparison of the first and second image data of the partial area, that both image data are different (step S109: DIFFERENT), that color-changing toner has been used in the image area of the original document (step S111). CPU 11 continues to scan and read the original document, and sequentially stores the first image data, which was obtained via line by line scanning (the first image data of the unit of line), in the first prescribed memory area of hard disc device 16 and also sequentially stores the second image data, which was obtained per one line scanning (the second image data of the unit of line), into the second prescribed memory area of hard disc device 16, and completes the reading operation for all the areas of the original document. Note that because CPU 11 has already determined that color-changing toner has been used in the image area of the original document, comparison of the first and second image data which were obtained from then on is not carried out.

CPU 11 carries out steps S133 and S134, the same steps in FIG. 25, and completes the reading and output operation of the original document (END).

In this way, in the erase-reading mode according to this embodiment, even if an unexpected power failure occurs in MFP 10, the read image data stored on hard disc device 16 does not disappear and is preserved. By this, MFP 10 is capable of reproducing an original document, which has been read in the erase-reading mode and the mage area of the original document, having been printed with color-changing toner, has been erased, even if an unexpected power failure occurs in MFP 10 before the read image data is printed by rebooting MFP 10 and using the read image data stored (preserved) on hard disc device 16 without disappearing.

Also, as shown in FIGS. 24 and 25, in the case in which the read image data of original document (the first and second image data) is initially stored in RAM 14, the read image data stored in RAM 14 (first image data only in case of FIG. 24, and both first and second image data in case of FIG. 25) are moved to hard disc device 16 and stored therein at the time when it is determined that color-changing toner has been used in an image of the original document, a decrease in processing speed can be suppressed because the read image data is stored in RAM 14, which has faster access speed than hard disc device 16, by the time when it is determined that color-changing toner has been used. Also, even in a case in which it is finally determined that color-changing toner has been used in an image of the original document, a decrease in processing speed can also be suppressed because output is carried out by accessing the read image data stored in RAM 14.

Also, as shown in FIGS. 26 and 27, in the case in which the read image data of original document (the first and second image data) is initially stored on hard disc device 16, the security (reproducibility of original document) against loss of the read image data, due to an unexpected power failure in MFP 10, can be enhanced. Also, because the read image data (at least either one of the first image data or second image data) has been moved and stored in RAM 14 at the time when it was determined that color-changing toner has been used, a decrease of processing speed can be suppressed compared to the case in which output is carried out by accessing the read image data stored on hard disc device 16.

Also, as shown in FIGS. 25 and 27, in case if an unexpected power failure occurs in MFP 10 during the operation for determining a mixture of the types of toner, because both of the first and second image data are stored on hard disc device 16, both image data can be protected from being lost. After MFP 10 is rebooted, by using these first and second image data, duplicated original document, which is the same as the original document with image areas of both normal and color-changing toners, can be reproduced.

Further, by checking the amount of free space of hard disc device 16 before initiating the reading operation to read an original document and by prohibiting the reading operation if the amount of free space is less than or equal to the prescribe amount, a situation can be avoided in which the read image data of original document cannot be stored on hard disc device 16, due to lack of amount of free space on hard disc device 16.

Further, in the operation of copying original document in the erase-reading mode according to this embodiment, for an original having been printed with color-changing toner, the read image data, which has been temporarily stored on hard disc device 16, may be erased after a detection section (not shown) such as a sensor, or the like, detects that the duplicate of the original document has been ejected onto an exit tray (not shown) of MFP 10. In this case, even if the duplicate of the original document happens to become jammed in the conveyance path toward the exit tray and damaged or torn due to the jam, a duplicate of the original can be reproduced by using again the read image data which has been stored on hard disc device 16. Even in a case in which re-output is carried out due to a paper jam, because the read image data, which has been temporarily stored on hard disc device 16, is configured to be erased when the detection section detects that the duplicate of the original document has been ejected onto the exit tray, the number of duplicates is limited to one.

While the preferred embodiments of the present invention have been described using specific terms, such description is for illustrative purpose only, and it is to be understood that changes and variations may be made without departing from the spirit and scope of the appended claims.

The irradiation timing of the illuminating light from the light source for reading and the light of the specific wavelength from the light source for erasing is not limited to that way (the light sources are activated alternately) as illustrated in FIG. 6. As shown in FIG. 2a and FIG. 19, for example, but is not limited to, as long as the illuminating light and the light of the specific wavelength are configured so as to irradiate the reading area of a line shape to be read via line image sensor (reading section), the irradiating duration of the two types of lights onto the same scanning line may be partially overlapped, or the light of the specific wavelength may be intermittently irradiated while the illuminating light is continuously irradiated.

In case of duplication of an original document having been printed with color-changing toner, the number of duplicates to be printed may be limited to one, regardless of user setting.

In case of duplication of an original document, having been printed with color-changing toner, an example in which a dummy image is printed with color-changing toner as a duplicate was explained. However, whether this dummy image is to be printed or not may be configured to be selectable in a case in which a document is to be printed with color-changing toner which is designated and requested to be used by an external apparatus.

As a color-changing printing agent, a color-changing toner has been described as an example by using an electrophotographic-type image processing apparatus (multi-function peripheral). However, the color-changing printing agent may be a color-changing ink, having the characteristic that the agent usually exhibits a specific color and is changed to become colorless or transparent after being irradiated with a light of a specific wavelength, for example, but is not limited to, to be used in an ink-jet type printer.

Further, an image reading apparatus may be constituted of a control section which determines whether a color-changing toner has been used in an image of an original document based on the first and second image data which has been read via scanner section 22 and reading section (line image sensor 35, and other components) of MFP 10 described in the preferred embodiments, and outputs a result of the determination.

With an image reading apparatus of this configuration, it is capable of accurately determining whether or not color-changing toner has been used in a printed image of an original document while reading the original document, and capable of outputting an accurate result of the determination. For example, image data output apparatuses, such as printers, facsimiles, print servers, and the like, is capable of changing output operation, by receiving read image data combined with a result of determination from the image reading apparatus. Or, the user is capable of changing the output operation according to the result of determination, or changing the reading operation to read the original document or an output operation for the read image data of the original document by checking a display showing the result of the determination. Also, for example, if it has been determined that color-changing toner has been used in an image of an original document, the user may manually terminate the reading operation, or manually change the output operation of the read image data. Further, for example, the user is capable of manually terminating or prohibiting output of the read image data to a printer, a facsimile, an external memory device, a terminal device, a server, or the like. In this way, it is capable of preventing the content of an original document, having been printed with color-changing toner, from being compromised.

As memory to temporarily store the first and second image data, the different portions of the image data, and identification information, non-volatile memory 15 may be used in addition to RAM 14 and hard disc device 16.

Also, although RAM 14 (volatile memory) is used as memory for temporary storage for the read image data and different portions of the image data in the first embodiment, a combination of RAM 14 and non-volatile memory (such as non-volatile memory 15, virtual memory area on hard disc device 16, and the like) may be applied. In the combination of RAM 14 and a non-volatile memory, the memory for temporary storage may be changed from RAM 14 to the non-volatile memory, or changed from the non-volatile memory to RAM 14, according to the usage of memory amount of RAM 14.

The image processing apparatus according to the present invention is not limited to a multi-function peripheral described in the preferred embodiments of the present invention, and it is to be understood that the present invention is applicable to any of copying machines, facsimiles, scanners, and the like.

What is claimed is:

1. An image processing apparatus comprising:
  a light source for reading, configured to apply an illuminating light onto a surface of an original document in order to read the original document;
  a light source for erasing, configured to apply a light of a specific wavelength onto the surface of the original document, wherein the light of the specific wavelength decolorizes a color-changing printing agent having the characteristic that the agent usually exhibits a specific color and is changed to become colorless or transparent after being irradiated with the light of the specific wavelength;
  a reading section, configured to receive a reflected light from the original document onto which the illuminating light is applied by the light source for reading;
  an output section configured to output a read image data of the original document by the reading section; and
  a control section;
  wherein the control section is configured: (1) to obtain a first image data from the reading section, by applying the illuminating light from the light source for reading to an area of the surface of the original document; (2) to apply the light of the specific wavelength from the light source for erasing onto the area of the surface of the original document onto which the illuminating light from the light source for reading has been irradiated to obtain the first image data; (3) to obtain a second image data from the reading section, by applying the illuminating light, from the light source for reading, onto the area of the surface of the original document where it is presumed that any image formed by the color-changing printing agent is expected to have been changed to become colorless or transparent after being irradiated with the light of the specific wavelength; (4) to determine whether or not the-color-changing printing agent has been used in an image of the original document based on the first image data and the second image data; and (5) to change at least one of (a) a reading operation of the reading section to read the original document, and (b) an output operation of the output section to output the image data having been read, of the original document, based on the result of the determination; and
  wherein, in a case in which the control section determines, while the reading operation is activated to read the original document, that the color-changing printing agent has been used in an image of the original document, the control section is configured to deactivate the reading operation.

2. The image processing apparatus of claim 1, wherein:
  the reading section is configured to read a partial area by partial area, successively, of an original document, in a reading area of a prescribed size;
  the light source for reading and the light source for erasing are configured to apply the lights onto the partial area, of the original document, in the reading area of the prescribed size;
  the image processing apparatus further comprises a moving section configured to move the light source for reading and the light source for erasing relatively, both applying the lights onto the partial area, of the original document, in the reading area of the prescribed size; and
  the control section is configured: (1) to obtain a first image data of the partial area of the original document from the reading section, by applying the illuminating light from the light source for reading onto the original document disposed in the reading area; (2) to apply the light of the specific wavelength from the light source for erasing onto the partial area onto which the illuminating light from the light source for reading has been irradiated; and (3) to obtain a second image data from the reading section, by applying the illuminating light, from the light source for reading, onto the partial area where it is presumed that any image formed by the color-changing printing agent is expected to have been changed to become colorless or transparent after being irradiated with the light of the specific wavelength.

3. The image processing apparatus of claim 1, further comprising:
  a platen on which an original document to be read by the reading section is set; and
  a holding section which is switchable between a first holding state in which the original document is removable, and a second holding state in which the original document is not removable,
  wherein the control section is configured to switch to the second holding state in a reading operation to read the original document, and switch to the first holding state when the reading operation is completed.

4. The image processing apparatus of claim 1, further comprising:

a platen on which a original document to be read by the reading section is set; and a holding section which is switchable between a first holding state in which the original document is removable, and a second holding state in which the original document is not removable, wherein the control section is configured to control: (1) to initiate a reading operation to read the original document in the first holding state; (2) to switch to the second holding state when the control section determines that the color-changing printing agent has been used in an image of the original document; and (3) to switch to the first holding state when the reading operation is completed.

5. The image processing apparatus of claim 1, further comprising a non-volatile storage unit, wherein the control section is configured to store the first image data into the non-volatile storage unit.

6. The image processing apparatus of claim 5, wherein the control section is configured to control to store the second image data into the non-volatile storage unit.

7. The image processing apparatus of claim 5, further comprising a volatile memory device, wherein the control section is configured to store a read image data into the volatile memory device until the control section determines that the color-changing printing agent has been used in the image of the original document, and when the control section determines that the color-changing printing agent has been used in the image of the original document, then the control section stores the read image data, which has been stored in the volatile memory device, in the non-volatile storage unit.

8. The image processing apparatus of claim 5, further comprising a volatile memory device, wherein, when the control section determines that no color-changing printing agent has been used in the image of the original document, the control section is configured to control to store the read image data, which has been stored in the non-volatile storage unit, in the volatile memory device.

9. The image processing apparatus of claim 5, wherein, the control section is configured to check an amount of available memory of the non-volatile storage unit, and if the amount is not more than a prescribed amount, then the control section prohibits reading operations.

10. The image processing apparatus of claim 1, wherein the control section is configured to control to output the result of the determination.

11. An image processing apparatus comprising:
a light source for reading, configured to apply an illuminating light onto a surface of an original document in order to read the original document;
a light source for erasing, configured to apply a light of a specific wavelength onto the surface of the original document, wherein the light of the specific wavelength decolorizes a color-changing printing agent having the characteristic that the agent usually exhibits a specific color and is changed to become colorless or transparent after being irradiated with the light of the specific wavelength;
a reading section, configured to receive a reflected light from the original document onto which the illuminating light is applied by the light source for reading;
an output section configured to output a read image data of the original document by the reading section; and
a control section;
wherein the control section is configured: (1) to obtain a first image data from the reading section, by applying the illuminating light from the light source for reading to an area of the surface of the original document; (2) to apply the light of the specific wavelength from the light source for erasing onto the area of the surface of the original document onto which the illuminating light from the light source for reading has been irradiated to obtain the first image data; (3) to obtain a second image data from the reading section, by applying the illuminating light, from the light source for reading, onto the area of the surface of the original document where it is presumed that any image formed by the color-changing printing agent is expected to have been changed to become colorless or transparent after being irradiated with the light of the specific wavelength; (4) to determine whether or not the-color-changing printing agent has been used in an image of the original document based on the first image data and the second image data; and (5) to change at least one of (a) a reading operation of the reading section to read the original document, and (b) an output operation of the output section to output the image data having been read, of the original document, based on the result of the determination; and wherein, in a case in which the control section determines, while the reading operation is activated to read the original document, that the color-changing printing agent has been used in an image of the original document, the control section is configured to control to deactivate the reading operation for the second image data and continue the reading operation for the first image data and application of the light of the specific wavelength, from the light source for erasing until the completion of the reading operation.

12. The image processing apparatus of claim 11, wherein, in a case in which the control section determines that the color-changing printing agent has been used in an image of the original document, the control section is configured to prohibit an output operation.

13. The image processing apparatus of claim 11, wherein:
the output operation comprises a printing operation to print an image onto a recoding medium with a printing agent;
the printing agent comprises the color-changing printing agent and a non-color-changing printing agent; and
in a case in which the control section determines that the color-changing printing agent has been used in an image of the original document, the control section is configured to limit the output operation for a read image data of the original document to a limited output operation of printing the read image data onto a recording medium with the color-changing printing agent.

14. The image processing apparatus of claim 13, wherein the control section is configured to control the output section to limit a print quantity to one set in the limited output operation.

15. The image processing apparatus of claim 13, wherein the control section is configured to control to initiate a print operation after the reading operation is completed in a case in which the limited output operation is carried out.

16. The image processing apparatus of claim 13, wherein the control section is configured to control the output section to print a dummy image with the color-changing printing agent on at least one of an upper edge and a lower edge of a recording medium in the limited output operation.

17. The image processing apparatus of claim 13, further comprising a detection section which detects a remaining amount of the color-changing printing agent to be used for the printing operation, wherein the control section is configured to control the output section to deactivate the limited output operation when the remaining amount of the color-changing printing agent is not more than a prescribed amount.

18. The image processing apparatus of claim 13, wherein the output operation further comprises a transfer operation to transfer a read image data to an external device, and the control section is configured to allow the transfer operation only to an external device which is capable of carrying out the limited output operation in a case in which a read image data of an original document, which the control section has determined has the color-changing printing agent used therein, is to be transferred.

19. The image processing apparatus of claim 13, wherein, in a case in which a read image data of an original document, which the control section has determined has the color-changing printing agent used therein, is to be stored inside the image processing apparatus, the control section is configured to store the read image data by linking with identification information which indicates that the color-changing printing agent has been used in an original image of an original document from which the read image data has been obtained, and, in a case in which the read image data, which is stored with the identification information being linked, is to be printed, the control section is configured to allow carrying out of only the limited output operation.

20. The image processing apparatus of claim 19, wherein, in a case in which a read image data, which has been stored being linked with the identification information, is printed by the limited output operation, the control section is configured to erase the read image data and the identification information, which have been stored, after the limited output operation.

21. The image processing apparatus of claim 11, wherein, in a case in which the control section determines that the color-changing printing agent has not been used in an image of the original document, the control section is configured to control the output section, in case a printing operation is to be carried out as an output operation of a read image data of the original document, to print the read image data onto a recording medium with the non-color-changing printing agent.

22. The image processing apparatus of claim 11, wherein the control section is configured to control to output the result of the determination.

23. An image processing apparatus comprising:
a light source for reading, configured to apply an illuminating light onto a surface of an original document in order to read the original document;
a light source for erasing, configured to apply a light of a specific wavelength onto the surface of the original document, wherein the light of the specific wavelength decolorizes a color-changing printing agent having the characteristic that the agent usually exhibits a specific color and is changed to become colorless or transparent after being irradiated with the light of the specific wavelength;
a reading section, configured to receive a reflected light from the original document onto which the illuminating light is applied by the light source for reading;
an output section configured to output a read image data of the original document by the reading section; and
a control section;
wherein the control section is configured: (1) to obtain a first image data from the reading section, by applying the illuminating light from the light source for reading to an area of the surface of the original document; (2) to apply the light of the specific wavelength from the light source for erasing onto the area of the surface of the original document onto which the illuminating light from the light source for reading has been irradiated to obtain the first image data; (3) to obtain a second image data from the reading section, by applying the illuminating light, from the light source for reading, onto the area of the surface of the original document where it is presumed that any image formed by the color-changing printing agent is expected to have been changed to become colorless or transparent after being irradiated with the light of the specific wavelength; (4) to determine whether or not the-color-changing printing agent has been used in an image of the original document based on the first image data and the second image data; and (5) to change at least one of (a) a reading operation of the reading section to read the original document, and (b) an output operation of the output section to output the image data having been read, of the original document, based on the result of the determination; and
wherein, in a case in which the control section determines, while the reading operation is activated to read the original document, that the color-changing printing agent has been used in an image of the original document, or the control section determines that the color-changing printing agent has not been used in an image of the original document, the control section is configured to deactivate the reading operation for the second image data and application of the light of the specific wavelength, by the light source for erasing, and continue the reading operation for the first image data until the completion of the reading operation.

24. The image processing apparatus of claim 23, wherein the control section is configured to control to output the result of the determination.

25. A method of controlling an image processing apparatus comprising (i) a light source for reading, configured to apply an illuminating light onto a surface of an original document in order to read the original document, (ii) a light source for erasing, configured to apply a light of a specific wavelength onto the surface of the original document, wherein the light of the specific wavelength decolorizes a color-changing printing agent having the characteristic that the agent usually exhibits a specific color and is changed to become colorless or transparent after being irradiated with the light of the specific wavelength, (iii) a reading section, configured to receive a reflected light from the original document onto which the illuminating light is applied by the light source for reading, and (iv) an output section configured to output a read image data of the original document by the reading section, the method comprising:
obtaining a first image data from the reading section, by applying the illuminating light from the light source for reading to an area of the surface of the original document;
applying the light of the specific wavelength from the light source for erasing onto the area of the surface of the original document onto which the illuminating light from the light source for reading has been irradiated to obtain the first image data;
obtaining a second image data from the reading section, by applying the illuminating light, from the light source for reading, onto the area of the surface of the original document where it is presumed that any image formed by the color-changing printing agent is expected to have been changed to become colorless or transparent after being irradiated with the light of the specific wavelength;

determining whether or not the-color-changing printing agent has been used in an image of the original document based on the first image data and the second image data; and changing at least one of (a) a reading operation of the reading section to read the original document, and (b) an output operation of the output section to output the image data having been read, of the original document, based on the result of the determination;

wherein, in a case in which it is determined, while the reading operation is activated to read the original document, that the color-changing printing agent has been used in an image of the original document, control is performed to deactivate the reading operation.

26. The method of claim 25, wherein:

the reading section is configured to read a partial area by partial area, successively, of an original document, in a reading area of a prescribed size;

the light source for reading and the light source for erasing are configured to apply the lights onto the partial area, of the original document, in the reading area of the prescribed size;

the image processing apparatus further comprises a moving section configured to move the light source for reading and the light source for erasing relatively, both applying the lights onto the partial area, of the original document, in the reading area of the prescribed size;

a first image data is obtained of the partial area of the original document from the reading section, by applying the illuminating light from the light source for reading onto the original document disposed in the reading area, the light of the specific wavelength is applied from the light source for erasing onto the partial area onto which the illuminating light from the light source for reading has been irradiated, and a second image data is obtained from the reading section, by applying the illuminating light, from the light source for reading, onto the partial area where it is presumed that any image formed by the color-changing printing agent is expected to have been changed to become colorless or transparent after being irradiated with the light of the specific wavelength.

27. A method of controlling an image processing apparatus comprising (i) a light source for reading, configured to apply an illuminating light onto a surface of an original document in order to read the original document, (ii) a light source for erasing, configured to apply a light of a specific wavelength onto the surface of the original document, wherein the light of the specific wavelength decolorizes a color-changing printing agent having the characteristic that the agent usually exhibits a specific color and is changed to become colorless or transparent after being irradiated with the light of the specific wavelength, (iii) a reading section, configured to receive a reflected light from the original document onto which the illuminating light is applied by the light source for reading, and (iv) an output section configured to output a read image data of the original document by the reading section, the method comprising:

obtaining a first image data from the reading section, by applying the illuminating light from the light source for reading to an area of the surface of the original document;

applying the light of the specific wavelength from the light source for erasing onto the area of the surface of the original document onto which the illuminating light from the light source for reading has been irradiated to obtain the first image data;

obtaining a second image data from the reading section, by applying the illuminating light, from the light source for reading, onto the area of the surface of the original document where it is presumed that any image formed by the color-changing printing agent is expected to have been changed to become colorless or transparent after being irradiated with the light of the specific wavelength;

determining whether or not the-color-changing printing agent has been used in an image of the original document based on the first image data and the second image data; and changing at least one of (a) a reading operation of the reading section to read the original document, and (b) an output operation of the output section to output the image data having been read, of the original document, based on the result of the determination;

wherein, in a case in which it is determined, while the reading operation is activated to read the original document, that the color-changing printing agent has been used in an image of the original document, control is performed to deactivate the reading operation for the second image data and continue the reading operation for the first image data and application of the light of the specific wavelength, from the light source for erasing until the completion of the reading operation.

28. A method of controlling an image processing apparatus comprising (i) a light source for reading, configured to apply an illuminating light onto a surface of an original document in order to read the original document, (ii) a light source for erasing, configured to apply a light of a specific wavelength onto the surface of the original document, wherein the light of the specific wavelength decolorizes a color-changing printing agent having the characteristic that the agent usually exhibits a specific color and is changed to become colorless or transparent after being irradiated with the light of the specific wavelength, (iii) a reading section, configured to receive a reflected light from the original document onto which the illuminating light is applied by the light source for reading, and (iv) an output section configured to output a read image data of the original document by the reading section, the method comprising:

obtaining a first image data from the reading section, by applying the illuminating light from the light source for reading to an area of the surface of the original document;

applying the light of the specific wavelength from the light source for erasing onto the area of the surface of the original document onto which the illuminating light from the light source for reading has been irradiated to obtain the first image data;

obtaining a second image data from the reading section, by applying the illuminating light, from the light source for reading, onto the area of the surface of the original document where it is presumed that any image formed by the color-changing printing agent is expected to have been changed to become colorless or transparent after being irradiated with the light of the specific wavelength;

determining whether or not the-color-changing printing agent has been used in an image of the original document based on the first image data and the second image data; and changing at least one of (a) a reading operation of the reading section to read the original document, and (b) an output operation of the output section to output the image data having been read, of the original document, based on the result of the determination;

wherein, in a case in which it is determined, while the reading operation is activated to read the original document, that the color-changing printing agent has been used in an image of the original document, or it is determined that the color-changing printing agent has not been used in an image of the original document, control is performed to deactivate the reading operation for the second image data and application of the light of the specific wavelength, by the light source for erasing, and continue the reading operation for the first image data until the completion of the reading operation.

* * * * *